(12) United States Patent
Qiu et al.

(10) Patent No.: US 6,803,109 B2
(45) Date of Patent: Oct. 12, 2004

(54) WATER-AND OIL-REPELLENCY IMPARTING URETHANE OLIGOMERS COMPRISING PERFLUOROALKYL MOIETIES

(75) Inventors: Zai-Ming Qiu, Woodbury, MN (US); John C. Clark, White Bear Lake, MN (US); Wayne W. Fan, Cottage Grove, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 157 days.

(21) Appl. No.: 09/803,702

(22) Filed: Mar. 9, 2001

(65) Prior Publication Data

US 2003/0026997 A1 Feb. 6, 2003

(51) Int. Cl.[7] .......................... C08F 8/30; B32B 27/40; C07C 261/00
(52) U.S. Cl. ..................... 428/423.1; 525/123; 560/158
(58) Field of Search .................................. 525/123, 199, 525/276; 428/423.1, 411.1, 357, 289, 290, 365, 391, 395, 231.1; 560/158; 526/243, 248, 242, 245; 523/200; 524/539, 168, 462; 528/45, 70; 427/176, 389.4; 252/8.75, 8.8, 8.62; 556/421; 564/38; 546/292; 548/305, 306

(56) References Cited

U.S. PATENT DOCUMENTS

| | | |
|---|---|---|
| 2,803,615 A | 8/1957 | Ahlbrecht et al. |
| 2,803,656 A | 8/1957 | Ahlbrecht et al. |
| 3,068,187 A | 12/1962 | Bolstad et al. |
| 3,094,547 A | 6/1963 | Heine |
| 3,102,103 A | 8/1963 | Ahlbrecht et al. |
| 3,341,497 A | 9/1967 | Sherman et al. |
| 3,478,116 A | 11/1969 | Smeltz |
| 3,547,894 A | 12/1970 | Smeltz et al. |
| 3,574,791 A | 4/1971 | Sherman et al. |
| 3,671,493 A | 6/1972 | Lo Monaco et al. |
| 3,734,962 A | 5/1973 | Niederprüm et al. |
| 3,759,874 A | 9/1973 | Gresham |
| 3,787,351 A | 1/1974 | Olson |
| 3,872,058 A | 3/1975 | Gresham |
| 3,916,053 A | 10/1975 | Sherman et al. |
| 3,968,066 A | 7/1976 | Mueller |
| 3,987,182 A | 10/1976 | Gold |
| 3,987,227 A | 10/1976 | Schultz et al. |
| 4,160,777 A | 7/1979 | Loudas |
| 4,215,205 A | 7/1980 | Landucci |
| 4,247,656 A | 1/1981 | Janssen |
| 4,289,892 A | 9/1981 | Soch |
| 4,426,466 A | 1/1984 | Schwartz |
| 4,468,527 A | 8/1984 | Patel |
| 4,504,401 A | 3/1985 | Matsuo et al. |
| 4,508,916 A | 4/1985 | Newell et al. |
| 4,529,658 A | 7/1985 | Schwartz et al. |
| 4,533,713 A | 8/1985 | Howells |
| 4,540,497 A | 9/1985 | Chang et al. |
| 4,540,765 A | 9/1985 | Koemm et al. |
| 4,566,981 A | 1/1986 | Howells |
| 4,606,737 A | 8/1986 | Stern |
| 4,668,406 A | 5/1987 | Chang |
| 4,958,039 A | 9/1990 | Pechhold |
| 5,025,052 A | 6/1991 | Crater et al. |
| 5,115,013 A | 5/1992 | Röttger et al. |

(List continued on next page.)

FOREIGN PATENT DOCUMENTS

| | | |
|---|---|---|
| DE | 3611302 A1 | 10/1987 |
| GB | 858671 | 11/1961 |
| WO | WO93/01349 | * 1/1993 |

OTHER PUBLICATIONS

Van A. Wente, Superfine Thermoplastic Fibers, Industrial and Engineering Chemistry, vol. 48, No. 8, pp. 1342–1346, Aug. (1956).

Murray Hauptschein[1a] and Robert A. Braun[1b], The Reaction of Ethyl Perfluorobutyrate with Sodium. An Improved Synthesis of Perfluoroheptan–4–One, JACS, vol. 77, pp. 4930–4931, (1955).

E. T. McBee, W.F. Marzluff and O. R. Pierce, The Ionization Constants of Some Fluorine–Containing Alcohols[1,2], Journal of American Chemistry Society, vol. 74, pp. 444–446, (1952).

J. L. Zollinger, J. R. Throckmorton, S. T. Ting, and R. A. Mitsch, Preparation and Curing of Poly (Perfluoroalkylene Oxides), J. Macromol. Sci.–Chem., A3(7), pp. 1443–1464, Nov. (1969).

Technical Manual & Yearbook of the American Association of Textile Chemists & Colorists (AATCC), AATCC Test Method 22, pp. 70–71, (1985).

U.S.S.N. 09/592,105, Jariwala et al., filed Jun. 12, 2000, "Water– and Oil–Repellent Composition", pp. 1–91.

U.S.S.N. 09/803,708, Qiu, filed Mar. 9, 2001, Water–and Oil–Repellency Imparting Ester Oligomers Comprising Perfluoroalkyl Moieties.

Banks, Ed., Organofluorine Chemicals and Their Industrial Applications, Ellis Horwood Ltd., Chichester, England, pp. 226–234, (1979).

Roger W. Phillips[1] and Robert H. Dettre[2], Application of ESCA and Contact Angle Measurements to Studies of Surface Activity in a Fluoropolymer Mixture, Journal of Colloid and Interface Science, vol. 56, No. 2, Aug. (1976).

*Primary Examiner*—Ba K. Trinh
*Assistant Examiner*—Taylor Victor Oh
(74) *Attorney, Agent, or Firm*—Kent S. Kokko

(57) ABSTRACT

Fluorochemical urethane compositions comprising one or more compounds or oligomers having at least on fluorine-containing repeatable unit and at least one fluorine-containing terminal group are described. The compositions are useful as coatings or incorporated as melt additives. The fluorochemical compositions impart oil and water repellency to the substrate. In other aspects, this invention relates to processes for imparting oil and water repellency characteristics to substrates and articles.

29 Claims, No Drawings

U.S. PATENT DOCUMENTS

| | | |
|---|---|---|
| 5,145,727 A | 9/1992 | Potts et al. |
| 5,149,576 A | 9/1992 | Potts et al. |
| 5,204,441 A | 4/1993 | Baum et al. |
| 5,216,097 A | 6/1993 | Allewaert et al. |
| 5,276,175 A | 1/1994 | Dams et al. |
| 5,414,102 A | 5/1995 | Pohmer et al. |
| 5,424,474 A | 6/1995 | Pohmer et al. |
| 5,451,622 A | 9/1995 | Boardman et al. |
| 5,637,772 A | 6/1997 | Malik et al. |
| 5,674,951 A | 10/1997 | Hargis et al. |
| 5,688,884 A | 11/1997 | Baker et al. |
| 5,725,789 A | 3/1998 | Huber et al. |
| 6,037,429 A | 3/2000 | Linert et al. |

\* cited by examiner

WATER- AND OIL-REPELLENCY IMPARTING URETHANE OLIGOMERS COMPRISING PERFLUOROALKYL MOIETIES

FIELD OF THE INVENTION

This invention relates to fluorochemical urethane compositions comprising one or more compounds or oligomers having at least one fluorine-containing repeatable unit and at least one fluorine-containing terminal group. This invention also relates to articles comprising a substrate and the fluorochemical composition, which may be applied as coatings or incorporated as melt additives the fluorochemical compositions impart oil and water repellency to the substrate. In other aspects, this invention relates to processes for imparting oil and water repellency characteristics to substrates and articles.

BACKGROUND OF THE INVENTION

The use of certain fluorochemical compositions on fibers and fibrous substrates, such as textiles, paper, and leather, to impart oil- and water-repellency and soil- and stain-resistance is well known in the art. See, for example, Banks, Ed., Organofluorine Chemicals and Their Industrial Applications, Ellis Horwood Ltd., Chichester, England, 1979, pp. 226–234. Such fluorochemical compositions include, for example, fluorochemical guanidines (U.S. Pat. No. 4,540,497, Chang et al.), compositions of cationic and non-cationic fluorochemicals (U.S. Pat. No. 4,566,981, Howells), compositions containing fluorochemical carboxylic acid and epoxidic cationic resin (U.S. Pat. No. 4,426,466, Schwartz), fluoroaliphatic carbodiimides (U.S. Pat. No. 4,215,205, Landucci), fluoroaliphatic alcohols (U.S. Pat. No. 4,468,527, Patel), fluorine-containing addition polymers, copolymers, and macromers (U.S. Pat. Nos. 2,803,615; 3,068,187; 3,102,103; 3,341,497; 3,574,791; 3,916,053; 4,529,658; 5,216,097; 5,276,175; 5,725,789; 6,037,429), fluorine-containing phosphate esters (U.S. Pat. Nos. 3,094,547; 5,414,102; 5,424,474), fluorine-containing urethanes (U.S. Pat. Nos. 3,987,182; 3,987,227; 4,504,401; 4,958,039), fluorochemical allophanates (U.S. Pat. No. 4,606,737) fluorochemical biurets (U.S. Pat. No. 4,668,406), fluorochemical oxazolidinones (U.S. Pat. No. 5,025,052), and fluorochemical piperazines (U.S. Pat. No. 5,451,622).

It has long since been well documented that the fluorochemical segment, $F(CF_2)_n$—, of essentially any oil- and water-repellency imparting compound, oligomer, or polymer must have six or more carbon atoms; that is n must be equal to or greater than 6 (Philips, R. W. and Dettre, R. H., J. Col. and Interface Sci., 56 (2), (1976)). However, the use of such prior art fluorochemical compositions having fluorochemical segments with n>6, has been cited as a potential concern. Many previously known oil- and water-repellency imparting compounds or oligomers contain perfluorooctyl moieties. These surfactants ultimately degrade to perfluorooctyl-containing compounds. It has been reported that certain perfluorooctyl-containing compounds may tend to bio-accumulate in living organisms; this tendency has been cited as a potential concern regarding some fluorochemical compounds. For example, see U.S. Pat. No. 5,688,884 (Baker et al.). As a result, there is a desire for fluorine-containing compositions which are effective in providing desired oil and water repellency, and/or stain-release or stain resistance properties, and which eliminate more effectively from the body (including the tendency of the composition and its degradation products).

SUMMARY OF THE INVENTION

In one aspect, this invention relates to chemical compositions comprising one or more compounds or oligomers and mixtures thereof having at least one fluorine-containing repeatable unit and at least one fluorine-containing terminal group. These compounds or oligomers comprise the condensation reaction product of (a) one or more fluorinated polyols; (b) one or more polyisocyanates; and (c) one or more monofunctional fluorine-containing compounds comprising a functional group that is reactive with the hydroxyl group of said polyol (a) or with the isocyanate group of the polyisocyanate (b), The fluorinated portion of the fluorinated polyol(s) generally comprise at least one fluorine-containing group selected from the group consisting of perfluoroalkyl, perfluoroheteroalkyl, and perfluoroheteroalkylene. Optionally, the fluorochemical compositions further comprise water-solubilizing groups and/or polymerizable groups.

As used herein, the term "oligomer" means a polymer molecule consisting of only a few, i.e. up to an average of 10, but preferably up to an average of 5, repeating (polymerized) or repeatable units. Each repeating unit comprises a urethane group that is derived from the reaction of at least one polyol and polyisocyanate, wherein at least a portion of the polyol(s) further comprises a fluorine-containing moiety, selected from the group consisting of perfluoroalkyl, perfluoroalkylene, perfluoroheteroalkyl, and perfluoroheteroalkylene. In addition to the fluorinated polyol, the oligomer may further comprise a non-fluorinated polyol. The oligomer is terminated with one or more perfluoroalkyl groups, one or more perfluoroheteroalkyl groups, or mixtures thereof.

Certain preferred embodiments of the fluorochemical compositions of the present invention include those compositions comprising terminal and pendant fluorinated groups having from one to twelve, preferably one to six carbons, most preferably from three to five carbons. Even with $R_f$ groups that are relatively short (i.e. a carbon chain length of less than eight carbon atoms), these fluorochemical compositions, surprisingly, impart excellent oil and water repellency and stain release or stain resistance and exhibit high dynamic water and hexadecane contact angles. Although compositions comprising low fluorine content are less expensive, $R_f$ groups shorter than eight carbons typically have been overlooked by those of skill in the art because they have been believed to impart inferior oil and water repellency and stain resistance.

When the compounds further comprise water solubilizing groups, the fluorochemical compositions of the present invention exhibit water solubility or water dispersability, while at the same time providing surprisingly good water-repellency and stain-release properties. These embodiments include, for example, those chemical compositions comprising a urethane oligomer containing one or more solubilizing groups. The solubilizing groups include carboxylate, sulfate, sulfonate, phosphate, phosphonate, ammonium, quaternary ammonium, and the like, and mixtures thereof. These embodiments are particularly well suited for uniform topical treatments on a variety of substrates where the use of organic solvents is undesirable.

When the compounds further comprise polymerizable groups, the fluorochemical compositions of the present invention exhibit increased durability. That is the repellency and stain-resistant properties remain even after abrasion, scrubbing, washing, exposure to wear, and the like.

Another embodiment of the present invention relates to a coating composition comprising a solution comprising the fluorochemical composition of the present invention and a solvent. In this embodiment, the fluorochemical composition is dissolved or dispersed in the solvent. When applied to a substrate, this coating composition provides a uniform distribution of the chemical composition on the substrate without altering the appearance of the substrate. This invention further relates to a method for imparting water- and oil-repellency, stain-release, or stain-resistance characteristics to a substrate, comprised of one or more surfaces, comprising the steps of:

(a) applying the coating composition of the present invention onto one or more surfaces of the substrate wherein the coating composition comprises:
   (i) at least one solvent; and
   (ii) the fluorochemical composition of the invention; and
(b) curing the coating composition.

The fluorochemical compositions of the present invention can be applied as coatings to a wide variety of substrates, for example, by topical application, to impart oil- and water-repellency, stain-release, and stain-resistant properties to the substrates. In testing substrates coated with the fluorochemical compositions of the present invention, unexpectedly high dynamic water and hexadecane contact angles have been observed.

When applied as a coating, the coating compositions of the present invention can provide a uniform film. Applied as a coating, the compositions of the present invention do not change the appearance of the substrate to which they are applied. In addition, with certain compositions of the present invention, there is no need for high temperature curing; they can be cured (i.e., dried) at ambient temperature. Some compositions require higher temperature, i.e. up to about 130° C.

The fluorochemical compositions of the present invention may also be incorporated with a substrate as a polymer melt blend. The polymer composition comprises one or more thermoplastic or thermoset polymers and the fluorochemical composition of the invention. The present invention also relates to a process for preparing a repellent composition comprising the steps of (a) combining the fluorochemical composition of the invention; and at least one thermoplastic polymer; and
(b) melt processing the resulting combination.

The present invention further relates to a process for preparing a repellent composition comprising the steps of (a) combining the fluorochemical composition of the invention; and at least one thermosetting polymer or ceramer or the reactive precursors of said polymer or ceramer; and
(b) curing the resulting combination.

This invention also provides an article comprising a substrate coated or blended with the fluorochemical composition of the invention. After application and curing of the fluorochemical composition on the substrate or melt blending the fluorochemical composition with the substrate, the substrate displays surprisingly high water and hexadecane contact angles which are normally correlated to water- and oil-repellency, stain-release, or stain-resistance properties.

Still further, this invention relates to a method for imparting water- and oil-repellency, stain-release, or stain-resistance characteristics to an article comprising the steps of:

(a) melt blending a fluorochemical composition of the present invention with one or more thermoplastic polymers and
(b) forming the melt blend into an article;

Definitions

Unless otherwise stated, the following terms used in the specification and claims have the meanings given below:

"Alkoxy" means a radical —OR where R is an alkyl group as defined below, e.g., methoxy, ethoxy, propoxy, butoxy, and the like.

"Alkyl" means a linear saturated monovalent hydrocarbon radical having from one to about twelve carbon atoms or a branched saturated monovalent hydrocarbon radical having from three to about twelve carbon atoms, e.g., methyl, ethyl, 1-propyl, 2-propyl, pentyl, and the like.

"Alkylene" means a linear saturated divalent hydrocarbon radical having from one to about twelve carbon atoms or a branched saturated divalent hydrocarbon radical having from three to about twelve carbon atoms, e.g., methylene, ethylene, propylene, 2-methylpropylene, pentylene, hexylene, and the like.

"Aralkylene" means an alkylene radical defined above with an aromatic group attached to the alkylene radical, e.g., benzyl, pyridylmethyl, 1-naphthylethyl, and the like.

"Cured chemical composition" means that the chemical composition is dried or solvent has evaporated from the chemical composition from ambient temperature or higher until dryness, up to approximately 24 hours.

"Fibrous substrate" means materials comprised of synthetic or inorganic fibers such as wovens, knits, nonwovens, carpets, and other textiles; and materials comprised of natural fibers such as cotton, paper, and leather.

"Fluorocarbon monoalcohol" means a compound having one hydroxyl group and a perfluoroalkyl or a perfluoroheteralkyl group, e.g. $C_4F_9SO_2N(CH_3)CH_2CH_2OH$, $C_4F_9CH_2CH_2OH$, $C_2F_5O(C_2F_4O)_3CF_2CONHC_2H_4OH$, c-$C_6F_{11}CH_2OH$, and the like.

"Hard substrate" means any rigid material that maintains its shape, e.g., glass, ceramic, concrete, natural stone, wood, metals, plastics, and the like.

"Heteroacyloxy" has essentially the meaning given above for acyloxy except that one or more heteroatoms (i.e. oxygen, sulfur, and/or nitrogen) may be present in the R group and the total number of carbon atoms present may be up to 50, e.g., $CH_3CH_2OCH_2CH_2C(O)O—$, $C_4H_9OCH_2CH_2OCH_2CH_2C(O)O—$, $CH_3O(CH_2CH_2O)_nCH_2CH_2C(O)O—$, and the like.

"Heteroalkoxy" has essentially the meaning given above for alkoxy except that one or more heteroatoms (i.e. oxygen, sulfur, and/or nitrogen) may be present in the alkyl chain and the total number of carbon atoms present may be up to 50, e.g. $CH_3CH_2OCH_2CH_2O—$, $C_4H_9OCH_2CH_2OCH_2CH_2O—$, $CH_3O(CH_2CH_2O)_nH$, and the like.

"Heteroalkyl" has essentially the meaning given above for alkyl except that one or more heteroatoms (i.e. oxygen, sulfur, and/or nitrogen) may be present in the alkyl chain, these heteroatoms being separated from each other by at least one carbon, e.g., $CH_3CH_2OCH_2CH_2—$, $CH_3CH_2OCH_2CH_2OCH(CH_3)CH_2—$, $C_4F_9CH_2SCH_2CH_2—$, and the like. like.

"Heteroalkylene" has essentially the meaning given above for alkylene except that one or more heteroatoms (i.e. oxygen, sulfur, and/or nitrogen) may be present in the alkylene chain, these heteroatoms being separated from each other by at least one carbon, e.g., $—CH_2OCH_2O—$, $—CH_2CH_2OCH_2CH_2—$, $—CH_2CH_2N(CH_3)CH_2CH_2—$, $—CH_2CH_2SCH_2CH_2—$, and the like.

"Heteroaralkylene" means an aralkylene radical defined above except that catenated oxygen, sulfur, and/or nitrogen atoms may be present, e.g., phenyleneoxymethyl, phenyleneoxyethyl, benzyleneoxymethyl, and the like.

"Halo" means fluoro, chloro, bromo, or iodo, preferably fluoro and chloro.

"Long-chain hydrocarbon monoalcohol" means a compound having one hydroxyl group and a long chain hydrocarbon group having 10 to 22 carbons which may be saturated, unsaturated, or aromatic, and may optionally be substituted with one or more chlorine, bromine, trifluoromethyl, or phenyl groups, e.g. $CH_3(CH_2)_{10}CH_2OH$, $CH_3(CH_2)_{14}CH_2OH$, and the like.

"Perfluoroalkyl" has essentially the meaning given above for "alkyl" except that all or essentially all of the hydrogen atoms of the alkyl radical are replaced by fluorine atoms and the number of carbon atoms is from 1 to about 12, e.g. perfluoropropyl, perfluorobutyl, perfluorooctyl, and the like.

"Perfluoroalkylene" has essentially the meaning given above for "alkylene" except that all or essentially all of the hydrogen atoms of the alkylene radical are replaced by fluorine atoms, e.g., perfluoropropylene, perfluorobutylene, perfluorooctylene, and the like "Perfluoroheteroalkyl" has essentially the meaning given above for "heteroalkyl" except that all or essentially all of the hydrogen atoms of the heteroalkyl radical are replaced by fluorine atoms and the number of carbon atoms is from 3 to about 100, e.g. $CF_3CF_2OCF_2CF_2$—, $CF_3CF_2O(CF_2CF_2O)_3CF_2CF_2$—, $C_3F_7O(CF_3)CF_2O)_mCF(CF_3)CF_2$—, where m is from about 10 to about 30, and the like.

"Perfluoroheteroalkylene" has essentially the meaning given above for "heteroalkylene" except that all or essentially all of the hydrogen atoms of the heteroalkylene radical are replaced by fluorine atoms, and the number of carbon atoms is from 3 to about 100, e.g., —$CF_2OCF_2$—, —$CF_2O(CF_2O)_n(CF_2CF_2O)_mCF_2$—, "Perfluorinated group" means an organic group wherein all or essentially all of the carbon bonded hydrogen atoms are replaced with fluorine atoms, e.g. perfluoroalkyl, perfluoroheteroalkyl, and the like.

"Polyfunctional isocyanate compound" or "polyisocyanate" means a compound containing an average of greater than one, preferably two or more isocyanate groups, —NCO, attached to a multivalent organic group, e.g. hexamethylene diisocyanate, the biuret and isocyanurate of hexamethylene diisocyanate, and the like.

"Polyol" means an organic compound or polymer with an average of greater than one, preferably two or more primary or secondary hydroxyl groups per molecule, e.g. ethylene glycol, propylene glycol, 1,6-hexanediol, and the like.

"Porous" means capable of imbibing a liquid.

DETAILED DESCRIPTION OF THE ILLUSTRATIVE EMBODIMENTS OF THE INVENTION

The fluorochemical compositions of the present invention comprise one or more compounds or oligomers having at least one fluorine-containing repeatable unit and at least one fluorine-containing terminal group. These compounds or oligomers comprise the condensation reaction product of (a) one or more fluorinated polyols; (b) one or more polyisocyanates; and (c) one or more monofunctional fluorine-containing compounds comprising a functional group that is reactive with the hydroxyl group of said polyol (a) or with the isocyanate group of the polyisocyanate (b). The fluorinated polyol compounds comprise at least one fluorine-containing group selected from the group consisting of perfluoroalkyl, perfluoroheteroalkyl, and perfluoroheteroalkylene. The urethane oligomers may further comprise one or more non-fluorinated polyols.

Optionally the compounds may further comprise one or more water-solubilizing groups by the further reaction product of a compound comprising one or more water solubilizing groups selected from the group consisting of carboxylate, sulfate, sulfonate, phosphonate, ammonium, and quaternary ammonium groups, and at least one electrophilic or nucleophilic moiety reactive with a hydroxyl group or an isocyanate group.

Optionally the compounds may further comprise one or more polymerizable groups by the further reaction product of a compound comprising one or more polymerizable groups and at least one electrophilic or nucleophilic moiety reactive with a hydroxyl group or an isocyanate group.

The compound or oligomer comprises at least one repeatable or repeating polymerized unit. Each repeatable or repeating unit comprises one or more pendant or in-chain fluorine-containing groups selected from the group consisting of perfluoroalkyl, perfluoroalkylene, perfluoroheteroalkyl, and perfluoroheteroalkylene, and a urethane group that is formed from the reaction between a polyol and an polyisocyanate. The compound or oligomer is terminated with (i) one or more perfluoroalkyl groups, one or more perfluoroheteroalkyl groups, or a mixture thereof. For brevity "oligomer" shall be inclusive of compounds and oligomers.

In one preferred embodiment, the fluorochemical composition of the present invention comprises a mixture of urethane oligomers from the reaction product of (a) one or more polyisocyanate compounds, (b) one or more polyols comprising at least one fluorine-containing group selected from the group consisting of perfluoroalkyl, perfluoroheteroalkyl, and perfluoroalkylene, (c) one or more non-fluorinated polyols and (d) one or more fluorochemical monofunctional compounds. The mixture of urethane oligomers preferably comprises urethane oligomers having a varying number of repeating or repeatable units, including zero, one, two, and more repeating units. This mixture of urethane molecules comprising a varying number of repeating units allows simple blending of the above components in preparing the fluorochemical composition.

The urethane compounds and oligomers may be represented by the following formula (I):

$R_fQ(OR^2O)_o(—CONH—R^1—NHCO—OR^2O—)_n(CONH—R^1—NHCO)_m—Z$  (I)

wherein:

n is a number from 1 to 10 inclusive;

m is a number from 0 to 1 inclusive;

o is a number from 0 to 1 inclusive;

$R_f$ is a perfluoroalkyl group having 1 to 12, preferably 1 to 6, most preferably 3 to 5 carbon atoms, or a perfluoroheteroalkyl group having 3 to about 50 carbon atoms with all perfluorocarbon chains present having 1 to 6, preferably 1 to 4 carbon atoms;

Q is a divalent linking;

$R^1$ is a polyvalent organic group that is a residue of the polyisocyanate, that is a straight or branched chain alkylene, cycloalkylene, or heteroalkylene group of 1 to 14 carbon atoms, preferably 1 to 8 carbon atoms, more preferably 1 to 4 carbon atoms, and most preferably two carbon atoms, or an arylene group of 6 to 12 carbon atoms;

$R^2$ is a polyvalent organic group which is a residue of the polyol, that is a straight or branched chain alkylene, cycloalkylene, arylene or heteroalkylene group of 1 to 14 carbon atoms, preferably 1 to 8 carbon atoms, more preferably 1 to 4 carbon atoms, and most preferably two carbon atoms, or an arylene group of 6 to 12 carbon atoms; at least a portion of $R^2$ groups are substituted with or contain one perfluoroalkyl group, perfluoroheteroalkyl group, perfluoroheteroalkylene group, or mixtures thereof. Optionally, $R^2$ may further comprise a water-solubilizing group.

Z is $R_fQ$—, a water-solubilizing group or a polymerizable group.

With respect to the above-described $R_f$ groups, it is preferred that the $R_f$ group have 6 or fewer carbon atoms. It is believed that the shorter-chain $R_f$ groups have a reduced tendency to bioaccumulate as described in U.S. Pat. No. 5,688,884.

With respect to the above-described $R^1$ groups, it will be understood that the $R^1$ group may further be substituted with a pendant isocyanate group or blocked isocyanate group, as would be the case if the polyisocyanate were a triisocyanate. The "third" isocyanate group, pendant from $R^1$, may serve as a point of attachment of a polymerizable compound, or a water-solubilizing compound. Similarly, the $R^2$ groups may be further substituted with a hydroxy group, as would be the case if the polyol were a triol.

It will be understood that mixtures of compounds corresponding to the general formula may be represented, in addition to single compounds, and that m and n may be represented by non-integral values.

Suitable linking groups Q include the following structures in addition to a covalent bond. For the purposes of this list, each k is independently an integer from 0 to about 20, $R_1'$ is hydrogen, phenyl, or alkyl of 1 to about 4 carbon atoms, and $R_2'$ is alkyl of 1 to about 20 carbon atoms. Each structure is non-directional, i.e. —$(CH_2)_kC(O)O$— is equivalent to —$O(O)C(CH_2)_k$—.

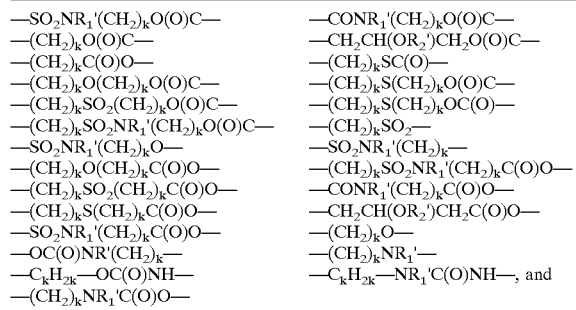

Polyisocyanate compounds useful in preparing the fluorochemical oligomers of the present invention comprise isocyanate radicals attached to the multivalent organic group that can comprise a multivalent aliphatic, alicyclic, or aromatic moiety ($R^1$); or a multivalent aliphatic, alicyclic or aromatic moiety attached to a biuret, an isocyanurate, or a uretdione, or mixtures thereof. Preferred polyfunctional isocyanate compounds contain an average of two isocyanate (—NCO) radicals. Compounds containing two —NCO radicals are preferably comprised of divalent aliphatic, alicyclic, araliphatic, or aromatic groups to which the —NCO radicals are attached. Linear aliphatic divalent groups are preferred.

Representative examples of suitable polyisocyanate compounds include isocyanate functional derivatives of the polyisocyanate compounds as defined herein. Examples of derivatives include, but are not limited to, those selected from the group consisting of ureas, biurets, allophanates, dimers and trimers (such as uretdiones and isocyanurates) of isocyanate compounds, and mixtures thereof. Any suitable organic polyisocyanate, such as an aliphatic, alicyclic, araliphatic, or aromatic polyisocyanate, may be used either singly or in mixtures of two or more. The aliphatic polyisocyanate compounds generally provide better light stability than the aromatic compounds. Aromatic polyisocyanate compounds, on the other hand, are generally more economical and reactive toward polyols than are aliphatic polyisocyanate compounds. Suitable aromatic polyisocyanate compounds include, but are not limited to, those selected from the group consisting of 2,4-toluene diisocyanate (TDI), 2,6-toluene diisocyanate, an adduct of TDI with trimethylolpropane (available as Desmodur™ CB from Bayer Corporation, Pittsburgh, Pa.), the isocyanurate trimer of TDI (available as Desmodur™ IL from Bayer Corporation, Pittsburgh, Pa.), diphenylmethane 4,4'-diisocyanate (MDI), diphenylmethane 2,4'-diisocyanate, 1,5-diisocyanatonaphthalene, 1,4-phenylene diisocyanate, 1,3-phenylene diisocyanate, 1-methyoxy-2,4-phenylene diisocyanate, 1-chlorophenyl-2,4-diisocyanate, and mixtures thereof.

Examples of useful alicyclic polyisocyanate compounds include, but are not limited to, those selected from the group consisting of dicyclohexylmethane diisocyanate ($H_{12}$MDI, commercially available as Desmodur™, available from Bayer Corporation, Pittsburgh, Pa.), 4,4'-isopropyl-bis (cyclohexylisocyanate), isophorone diisocyanate (IPDI), cyclobutane-1,3-diisocyanate, cyclohexane 1,3-diisocyanate, cyclohexane 1,4-diisocyanate (CHDI), 1,4-cyclohexanebis(methylene isocyanate) (BDI), dimmer acid diisocyanate (available from Bayer),1,3-bis (isocyanatomethyl)cyclohexane ($H_6$XDI), 3-isocyanatomethyl-3,5,5-trimethylcyclohexyl isocyanate, and mixtures thereof.

Examples of useful aliphatic polyfunctional isocyanate compounds include, but are not limited to, those selected from the group consisting of tetramethylene 1,4-diisocyanate, hexamethylene 1,4-diisocyanate, hexamethylene 1,6-diisocyanate (HDI), octamethylene 1,8-diisocyanate, 1,12-diisocyanatododecane, 2,2,4-trimethylhexamethylene diisocyanate (TMDI), 2-methyl-1,5-pentamethylene diisocyanate, dimer diisocyanate, the urea of hexamethylene diisocyanate, the biuret of hexamethylene 1,6-diisocyanate (HDI) (Desmodur™ N-100 and N-3200 from Bayer Corporation, Pittsburgh, Pa.), the isocyanurate of HDI (available as Desmodur™ N-3300 and Desmodur™ N-3600 from Bayer Corporation, Pittsburgh, Pa.), a blend of the isocyanurate of HDI and the uretdione of HDI (available as Desmodure™ N-3400 available from Bayer Corporation, Pittsburgh, Pa.), and mixtures thereof.

Examples of useful aralphatic polyisocyanates include, but are not limited to, those selected from the group consisting of m-tetramethyl xylylene diisocyanate (m-TMXDI), p-tetramethyl xylylene diisocyanate (p-TMXDI), 1,4-xylylene diisocyanate (XDI), 1,3-xylylene diisocyanate, p-(1-isocyanatoethyl)phenyl isocyanate, m-(3-isocyanatobutyl)phenyl isocyanate, 4-(2-isocyanatocyclohexyl-methyl)phenyl isocyanate, and mixtures thereof.

Preferred polyisocyanates, in general, include those selected from the group consisting of tetramethylene 1,4-diisocyanate, hexamethylene 1,4-diisocyanate, hexamethylene 1,6-diisocyanate (HDI), octamethylene 1,8-diisocyanate, 1,12-diisocyanatododecane, and the like, and mixtures thereof. Fluorochemical compositions of the present invention comprising compounds or oligomers made with preferred polyisocyanates impart both high water and hexadecane receding dynamic contact angles. High water receding dynamic contact angle together with high hexadecane receding dynamic contact angle is typically predictive of good water-repellency and oil-repellency properties.

Polyols, suitable for use in preparing the fluorochemical compositions of the present invention, include those organic polyols that have an average hydroxyl functionality of greater than 1 (preferably about 2 to 3; most preferably, about 2, as diols are most preferred). The hydroxyl groups can be primary or secondary, with primary hydroxyl groups being preferred for their greater reactivity.

Suitable polyols include those that comprise at least one aliphatic, heteroaliphatic, alicyclic, heteroalicyclic, aromatic, heteroaromatic, or polymeric moiety. Preferred polyols are aliphatic or polymeric polyols that contain hydroxyl groups as terminal groups.

At least a portion of the polyols are also comprised of at least one fluorine-containing group selected from the group consisting of perfluoroalkyl, perfluoroheteroalkyl, and perfluoroalkylene moieties. All of the perfluorocarbon chains, comprising these perfluoro moieties, are preferably six or fewer carbon atoms. Perfluoroalkyl moieties are preferred, with perfluoroalkyl moieties having from 1 to 12, preferably 1 to 6, most preferably 3–5 carbon atoms. Perfluoroheteroalkyl moieties may have 6 to 50 carbon atoms. Perfluoroheteroalkylene groups may have from about 3 to about 100 carbon atoms. Perfluoroheteroalkyl and alkylene moieties are preferably perfluoropolyethers with no perfluorocarbon chain of more than six carbon atoms.

Mixtures of fluorinated and non-fluorinated polyols may be advantageously utilized in preparing certain of the fluorochemical compositions of the instant invention. For example, inclusion of a non-fluorinated polyol can alter the melt temperature of the fluorochemical composition, making it more effective at the processing temperatures normally used in a given application. Increased cost effectiveness is also achieved by replacing a portion of the more expensive fluorinated polyol(s) with the less expensive non-fluorinated polyol(s). The selection of the non-fluorinated polyol(s) and the amount to use is determined by the performance requirements, for example melt temperature and repellency. A useful range of ratios of non-fluorinated polyol(s) to fluorinated polyols is about 1:1 to about 1:100.

Thus, the fluorochemical urethane oligomer may comprise the condensation reaction products of one or more fluorinated polyols, one or more non-fluorinated polyols, one or more polyisocyanates and one or more monofunctional fluorine-containing compounds.

Polyols useful in the present invention may optionally be substituted with or contain other groups, including water solubilizing groups and polymerizable groups. Solubilizing groups include carboxylate, sulfate, sulfonate, phosphate, phosphonate, ammonium, quaternary ammonium, and the like. Polymerizable groups include acrylate, methacrylate, vinyl, allyl, glycidyl, and the like. Both the fluorinated and non-fluorinated polyols may further comprise a water-solubilizing or polymerizable group.

Representative examples of suitable fluorinated polyols include $R_fSO_2N(CH_2CH_2OH)_2$ such as N-bis(2-hydroxyethyl)perfluorobutylsulfonamide; $R_fOC_6H_4SO_2N(CH_2CH_2OH)_2$; $R_fSO_2N(R')CH_2CH(OH)CH_2OH$ such as $C_6F_{13}SO_2N(C_3H_7)CH_2CH(OH)CH_2OH$; $R_fCH_2CON(CH_2CH_2OH)_2$;
$R_fCON(CH_2CH_2OH)_2$; $CF_3CF_2(OCF_2CF_2)_3OCF_2CON(CH3)CH2CH(OH) CH2OH$;
$R_fOCH_2CH(OH)CH_2OH$ such as $C_4F_9OCH_2CH(OH)CH_2OH$;
$R_fCH_2CH_2SC_3H_6OCH_2CH(OH)CH_2OH$; $R_fCH_2CH_2SC_3H_6CH(CH_2OH)CH_2$;
$R_fCH_2CH_2SCH_2CH(OH)CH_2OH$; $R_fCH_2CH_2SCH(CH_2OH)CH_2OH$;
$R_fH_2CH_2CH_2SCH_2CH(OH)CH_2OH$ such as $C_5F_{11}(CH_2)_3SCH_2CH(OH)CH_2O$
$R_fCH_2CH_2CH_2OCH_2CH(OH)CH_2OH$ such as $C_5F_{11}(CH_2)_3OCH_2CH(OH)CH_2$
$R_fCH_2CH_2CH_2OC_2H_4OCH_2CH(OH)CH_2OH$; $R_fCH_2CH_2(CH_3)OCH_2CH(OH)CH_2OH$;
$R_f(CH_2)_4SC_3H_6CH(CH_2OH)CH_2OH$; $R_f(CH_2)_4SCH_2CH(CH_2OH)_2$;
$R_f(CH_2)_4SC_3H_6OCH_2CH(OH)CH_2OH$; $R_fCH_2CH(C_4H_9)SCH_2CH(OH) CH_2OH$;
$R_fCH_2OCH_2CH(OH)CH_2OH$; $R_fCH2CH(OH)CH_2SCH_2CH_2OH$;
$R_fCH_2CH(OH)CH_2SCH_2CH_2OH$; $R_fCH_2CH(OH)CH_2OCH_2CH_2OH$;
$R_fCH_2CH(OH)CH_2OH$; $R_fR''SCH(R'''OH)CH(R'''OH)SR''R_f$;
$(R_fCH_2CH_2SCH_2CH_2SCH_2)_2C(CH_2OH)_2$; $((CF_3)_2CFO(CF_2)_2(CH_2)_2SCH_2)_2C(CH_2OH)_2$;
$(R_fR''SCH_2)_2C(CH_2OH)_2$; 1,4-bis(1-hydroxy-1,1-dihydroperfluoroethoxyethoxy)perfluoro-n-butan $(HOCH_2CF_2OC_2F_4O(CF_2)_4OC_2F_4OCF_2CH_2OH)$; 1,4-bis(1-hydroxy-1,1-dihydroperfluoropropoxy)perfluoro-n-butane $(HOCH_2CF_2CF_2O(CF_2)_4OCF_2CF_2CH_2OH)$; fluorinated oxetane polyols made by the ring-opening polymerization of fluorinated oxetane such as Poly-3-Fox™ (available from Omnova Solutions, Inc., Akron Ohio); polyetheralcohols prepared by ring opening addition polymerization of a fluorinated organic group substituted epoxide with a compound containing at least two hydroxyl groups as described in U.S. Pat. No. 4,508,916 (Newell et al); and perfluoropolyether diols such as Fomblin™ ZDOL $(HOCH_2CF_2O(CF_2O)_{8-12}(CF_2CF_2O)_{8-12}CF_2CH_2OH$, available from Ausimont); wherein $R_f$ is a perfluoroalkyl group having 1 to 12 carbon atoms, or a perfluoroheteroalkyl group having 3 to about 50 carbon atoms with all perfluorocarbon chains present having 6 or fewer carbon atoms, or mixtures thereof; R' is alkyl of 1 to 4 carbon atoms; R" is branched or straight chain alkylene of 1 to 12 carbon atoms, alkylenethio-alkylene of 2 to 12 carbon atoms, alkylene-oxyalkylene of 2 to 12 carbon atoms, or alkylene iminoalkylene of 2 to 12 carbon atoms, where the nitrogen atom contains as a third substituent hydrogen or alkyl of 1 to 6 carbon atoms; and R'" is a straight or branched chain alkylene of 1 to 12 carbon atoms or an alkylene-polyoxyalkylene of formula $C_rH_{2r}(OC_sH_{2s})n$ where r is 1–12, s is 2–6, and t is 1–40.

Preferred fluorinated polyols include N-bis(2-hydroxyethyl) perfluorobutylsulfonamide; fluorinated oxetane polyols made by the ring-opening polymerization of fluorinated oxetane such as Poly-3-Fox™ (available from Omnova Solutions, Inc., Akron Ohio); polyetheralcohols prepared by ring opening addition polymerization of a fluorinated organic group substituted epoxide with a compound containing at least two hydroxyl groups as described in U.S. Pat. No. 4,508,916 (Newell et al); perfluoropolyether diols such as Fomblin™ ZDOL $(HOCH_2CF_2O(CF_2O)_{8-12}(CF_2CF_2O)_{8-12}CF_2CH_2OH$, available from Ausimont); 1,4-bis(1-hydroxy-1,1-dihydroperfluoroethoxyethoxy) perfluoro-n-butane $(HOCH_2CF_2OC_2F_4O(CF_2)_4OC_2F_4OCF_2CH_2OH)$; and 1,4-bis(1-hydroxy-1,1-dihydroperfluoropropoxy)perfluoro-n-butane $(HOCH_2CF_2CF_2O(CF_2)_4OCF_2CF_2CH_2OH)$.

More preferred polyols comprised of at least one fluorine-containing group include N-bis(2-hydroxyethyl) perfluorobutylsulfonamide; 1,4-bis(1-hydroxy-1,1- dihydroperfluoropropoxy)perfluoro-n-butane ($HOCH_2CF_2CF_2O(CF_2)_4OCF_2CF_2CH_2OH$).

Representative examples of suitable non-fluorinated polyols include alkylene glycols, polyhydroxyalkanes, and other polyhydroxy compounds. The alkylene glycols include, for example, 1,2-ethanediol; 1,2-propanediol; 3-chloro-1,2-propanediol; 1,3-propanediol; 1,3-butanediol; 1,4-butanediol; 2-methyl-1,3-propanediol; 2,2-dimethyl-1,3-propanediol (neopentylglycol); 2-ethyl-1,3-propanediol; 2,2-diethyl-1,3-propanediol; 1,5-pentanediol; 2-ethyl-1,3-pentanediol; 2,2,4-trimethyl-1,3-pentanediol; 3-methyl-1,5-pentanediol; 1,2-, 1,5-, and 1,6-hexanediol; 2-ethyl-1,6-hexanediol; bis(hydroxymethyl)cyclohexane; 1,8-octanediol; bicyclo-octanediol; 1,10-decanediol; tricyclodecanediol; norbornanediol; and 1,18-dihydroxyoctadecane. The polyhydroxyalkanes include, for example, glycerine; trimethylolethane; trimethylolpropane; 2-ethyl-2-(hydroxymethyl)-1,3-propanediol; 1,2,6-hexanetriol; pentaerythritol; quinitol; mannitol; and sorbitol. The other polyhydroxy compounds include, for example, polyols such as di(ethylene glycol); tri(ethylene glycol); tetra(ethylene glycol); tetramethylene glycol; dipropylene glycol; diisopropylene glycol; tripropylene glycol; bis(hydroxymethyl) propionic acid; N,N-bis(2-hydroxyethyl)-3-aminopropyltriethoxysilane; bicine; 1,11-(3,6-dioxaundecane)diol; 1,14-(3,6,9,12-tetraoxatetradecane)diol; 1,8-(3,6-dioxa-2,5,8-trimethyloctane)diol; 1,14-(5,10-dioxatetradecane)diol; castor oil; 2-butyne-1,4-diol; N,N-bis(hydroxyethyl)benzamide; 4,4'-bis(hydroxymethyl)diphenylsulfone; 1,4-benzenedimethanol; 1,3-bis(2-hydroxyethyoxy)benzene; 1,2-dihydroxybenzene; resorcinol; 1,4-dihydroxybenzene; 3,5-, 2,6-, 2,5-, and 2,4-dihydroxybenzoic acid; 1,6-, 2,6-, 2,5-, and 2,7-dihydroxynaphthalene; 2,2'- and 4,4'-biphenol; 1,8-dihydroxybiphenyl; 2,4-dihydroxy-6-methyl-pyrimidine; 4,6-dihydroxypyrimidine; 3,6-dihydroxypyridazine; bisphenol A; 4,4'-ethylidenebisphenol; 4,4'-isopropylidenebis(2,6-dimethylphenol); bis(4-hydroxyphenyl)methane; 1,1-bis(4-hydroxyphenyl)-1-phenylethane (bisphenol C); 1,4-bis(2-hydroxyethyl)piperazine; bis(4-hydroxyphenyl) ether; as well as other aliphatic, heteroaliphatic, saturated alicyclic, aromatic, saturated heteroalicyclic, and heteroaromatic polyols; and the like, and mixtures thereof.

Representative examples of useful polymeric non-fluorinated polyols include polyoxyethylene, polyoxypropylene, and ethylene oxide-terminated polypropylene glycols and triols of molecular weights from about 200 to about 2000, corresponding to equivalent weights of about 100 to about 1000 for the diols or about 70 to about 700 for triols; polytetramethylene glycols of varying molecular weight; polydialkylsiloxane diols of varying molecular weight; hydroxy-terminated polyesters and hydroxy-terminated polylactones (e.g., polycaprolactone polyols); hydroxy-terminated polyalkadienes (e.g., hydroxyl-terminated polybutadienes); and the like. Mixtures of polymeric polyols can be used if desired.

Useful commercially available non-fluorinated polymeric polyols include Carbowax™ poly(ethylene glycol) materials in the number average molecular weight ($M_n$) range of from about 200 to about 2000 (available from Union Carbide Corp.); poly(propylene glycol) materials such as PPG-425 (available from Lyondell Chemicals); block copolymers of poly(ethylene glycol) and poly(propylene glycol) such as Pluronic™ L31 (available from BASF Corporation); Bisphenol A ethoxylate, Bisphenol A propyloxylate, and Bisphenol A propoxylate/ethoxylate (available from Sigma-Aldrich); polytetramethylene ether glycols such as Polymeg™ 650 and 1000 (available from Quaker Oats Company) and the Terathane™ polyols (available from DuPont); hydroxyl-terminated polybutadiene resins such as the Poly bd™ materials (available from Elf Atochem); the "PeP" series (available from Wyandotte Chemicals Corporation) of polyoxyalkylene tetrols having secondary hydroxyl groups, for example, "PeP" 450, 550, and 650; polycaprolactone polyols with Mn in the range of about 200 to about 2000 such as Tone™ 0201, 0210, 0301, and 0310 (available from Union Carbide); "Paraplex™ U-148" (available from Rohm and Haas), an aliphatic polyester diol; polyester polyols such as the Multron™ poly (ethyleneadipate)polyols (available from Mobay Chemical Co.); polycarbonate diols such as Duracarb™ 120, a hexanediol carbonate with $M_n$=900 (available from PPG Industries Inc.); and the like; and mixtures thereof.

Preferred non-fluorinated polyols include 1,2-ethanediol; 1,2- and 1,3-propanediol; 1,3- and 1,4-butanediol; neopentylglycol; 1,5-pentanediol; 3-methyl-1,5-pentanediol; 1,2-, 1,5-, and 1,6-hexanediol; bis(hydroxymethyl)cyclohexane; 1,8-octanediol; 1,10-decanediol; di(ethylene glycol); tri (ethylene glycol); tetra(ethylene glycol); di(propylene glycol); di(isopropylene glycol); tri(propylene glycol); poly (ethylene glycol) diols (number average molecular weight of about 200 to about 1500); poly(di(ethylene glycol) phthalate) diol (having number average molecular weights of, for example, about 350 or about 575); poly(propylene glycols) diols (number average molecular weight of about 200 to about 500); block copolymers of poly(ethylene glycol) and poly(propylene glycol) such as Pluronic™ L31 (available from BASF Corporation); polydimethylsiloxane diol; polycaprolactone diols (number average molecular weight of about 200 to about 600); resorcinol; hydroquinone; 1,6-, 2,5-, 2,6-, and 2,7-dihydroxynaphthalene; 4,4'-biphenol; bisphenol A; bis(4-hydroxyphenyl)methane; and the like; and mixtures thereof.

More preferred non-fluorinated polyols include 1,2-ethanediol; 1,2- and 1,3-propanediol; 1,4-butanediol; neopentylglycol; 1,2- and 1,6-hexanediol; di(ethylene glycol); tri(ethylene glycol); poly(di(ethylene glycol) phthalate) diol (having number average molecular weights of, for example, about 350 or about 575); poly(ethylene glycol) diols (having number average molecular weights of, for example, about 200, 300, 400); polydimethylsiloxane diol; polypropylene glycol (having a number average molecular weight of, for example, about 425); dimer diol; polycaprolactone diol (having a number average molecular weight of, for example, about 530); 3,5-dihydroxybenzene; bisphenol A; resorcinol; hydroquinone; and mixtures thereof.

Fluorochemical monofunctional compounds, useful in preparing the fluorochemical compositions of the present invention, include those that comprise at least one $R_f$ group. The $R_f$ groups can contain straight chain, branched chain, or cyclic fluorinated alkylene groups or any combination thereof. The $R_f$ groups can optionally contain one or more heteroatoms (i.e. oxygen, sulfur, and/or nitrogen) in the carbon-carbon chain so as to form a carbon-heteroatom-carbon chain (i.e. a heteroalkylene group). Fully-fluorinated groups are generally preferred, but hydrogen or chlorine atoms can also be present as substituents, provided that no more than one atom of either is present for every two carbon atoms. It is additionally preferred that any $R_f$ group contain at least about 40% fluorine by weight, more preferably at least about 50% fluorine by weight. The terminal portion of the group is generally fully-fluorinated, preferably containing at least three fluorine atoms, e.g., $CF_3O-$, $CF_3CF_2-$, $CF_3CF_2CF_2-$, $(CF_3)_2N-$, $(CF_3)_2N-$,$(CF_3)_2CF-$, SF$_5$CF$_2$—. Perfluorinated aliphatic groups (i.e., those of the formula C$_n$F$_{2n+1}$—) wherein n is 1 to 12 inclusive are the preferred R$_f$ groups, with n=3 to 5 being more preferred and with n=4 being the most preferred. Further, it is preferred that the fluorochemical monofunctional compounds have a melting point above room temperature. It has been found that the oligomers derived from solid fluorochemical monofunctional compounds exhibit higher contact angle performance than lower melting compounds.

Useful fluorochemical monofunctional compounds include those of the following formula II:

$$R_f—Q' \quad\quad (II)$$

wherein:

R$_f$ is a a perfluoroalkyl group having 1 to 12 carbon atoms, or a perfluoroheteroalkyl group having 3 to about 50 carbon atoms with all perfluorocarbon chains present having 6 or fewer carbon atoms;

Q' is a moiety comprising a functional group that is reactive toward the terminal isocyanate (of the polyisocyanate) or hydroxy groups (of the polyol).

It will be understood with reference to Formula I that the compound R$_f$Q' reacts with the polyol or isocyanate compounds to provide the terminal moiety R$_f$Q—

Examples of useful reactive functional groups Q' include hydroxyl, secondary amino, oxazolinyl, oxazolonyl, acetyl, acetonyl, carboxyl, isocyanato, epoxy, aziridinyl, and acyl halide groups. Where the pendent reactive functional group is an isocyanato functional group (from the polyisocyanate), the co-reactive functional group preferably comprises a secondary amino, carboxyl, or hydroxyl group. Where pendent reactive functional group comprises a hydroxyl group (from the polyol), the co-reactive functional group prefer-ably comprises a carboxyl, isocyanato, epoxy, anhydride, or oxazolinyl group. Preferred functional groups on Q' are hydroxyl groups and carboxylic acid derivatives such as esters or acid halides.

R$_f$Q' may comprise fluorine-containing monoalcohols including the following:

R$_f$SO$_2$N(CH$_3$)CH$_2$CH$_2$OH, CF$_3$(CF$_2$)$_3$SO$_2$N(CH$_3$)CH$_2$CH$_2$OH,
CF$_3$(CF$_2$)$_3$SO$_2$N(CH$_3$)CH(CH$_3$)CH$_2$OH, CF$_3$(CF$_2$)$_3$SO$_2$N(CH$_3$)CH$_2$CH(CH$_3$)OH,
R$_f$SO$_2$N(H)(CH$_2$)$_2$OH,
R$_f$SO$_2$N(CH$_3$)(CH$_2$)$_4$OH, C$_4$F$_9$SO$_2$N(CH$_3$)(CH$_2$)$_4$OH
C$_6$F$_{13}$SO$_2$N(CH$_3$)(CH$_2$)$_4$OH, R$_f$SO$_2$N(CH$_3$)(CH$_2$)$_{11}$OH,
R$_f$SO$_2$N(C$_2$H$_5$)CH$_2$CH$_2$OH, CF$_3$(CF$_2$)$_3$SO$_2$N(C$_2$H$_5$)CH$_2$CH$_2$OH,
C$_6$F$_{13}$SO$_2$N(C$_2$H$_5$)CH$_2$CH$_2$OH R$_f$SO$_2$N(C$_2$H$_5$)(CH$_2$)$_6$OH,
R$_f$SO$_2$N(C$_2$H$_5$)(CH$_2$)$_{11}$OH, R$_f$SO$_2$N(C$_3$H$_7$)CH$_2$OCH$_2$CH$_2$OH,
R$_f$SO$_2$N(CH$_2$CH$_2$CH$_3$)CH$_2$CH$_2$OH, R$_f$SO$_2$N(C$_4$H$_9$)(CH$_2$)$_4$OH,
R$_f$SO$_2$N(C$_4$H$_9$)CH$_2$CH$_2$OH, C$_3$F$_7$CONHCH$_2$CH$_2$OH,
2-(N-methyl-2-(4-perfluoro-(2,6-diethylmorpholinyl))perfluoroethylsulfonamido)ethanol, R$_f$CON(CH$_3$)CH$_2$CH$_2$OH, R$_f$CON(C$_2$H$_5$)CH$_2$CH$_2$OH,
R$_f$CON(CH$_3$)(CH$_2$)$_{11}$OH, R$_f$CON(H)CH$_2$CH$_2$OH
C$_2$F$_5$O(C$_2$F$_4$O)$_3$CF$_2$CONHC$_2$H$_4$OH, CF$_3$O(CF(CF$_3$)CF$_2$O)$_{1-36}$CF(CF$_3$)CH$_2$OH,
C$_2$F$_5$O(CF(CF$_3$)CF$_2$O)$_{1-36}$CF(CF$_3$)CH$_2$OH, C$_3$F$_7$O(CF(CF$_3$)CF$_2$O)$_{1-36}$CF(CF$_3$)CH$_2$OH,
C$_4$F$_9$O(CF(CF$_3$)CF$_2$O)$_{1-36}$CF(CF$_3$)CH$_2$OH, C$_3$F$_7$O(CF(CF$_3$)CF$_2$O)$_{12}$CF(CF$_3$)CH$_2$OH,
CF$_3$O(CF$_2$CF$_2$O)$_{1-36}$CF$_2$CH$_2$OH, C$_2$F$_5$O(CF$_2$CF$_2$O)$_{1-36}$CF$_2$CH$_2$OH,
C$_3$F$_7$O(CF$_2$CF$_2$O)$_{1-36}$CF$_2$CH$_2$OH, C$_4$F$_9$O(CF$_2$CF$_2$O)$_{1-36}$CF$_2$CH$_2$OH,
n-C$_4$F$_9$OC$_2$F$_4$OCF$_2$CH$_2$OCH$_2$CH$_2$OH CF$_3$O(CF$_2$CF$_2$O)$_{11}$CF$_2$CH$_2$OH,
R$_f$SO$_2$CH$_2$CH$_2$OH, R$_f$COOCH$_2$CH$_2$CH(CH$_3$)OH
R$_f$COOCH$_2$CH$_2$OH, C$_5$F$_{11}$COOCH$_2$CH$_2$OH,
R$_f$(CH$_2$)$_{11}$N(C$_2$H$_5$)CH$_2$CH$_2$OH, R$_f$CH$_2$OH,
C$_3$F$_7$CH$_2$OH, Perfluoro(cyclohexyl)methanol
C$_4$F$_9$CH$_2$CH$_2$OH, CF$_3$(CF$_2$)$_5$CH$_2$CH$_2$OH
R$_f$CH$_2$CH$_2$SO$_2$N(CH$_3$)CH$_2$CH$_2$OH, CF$_3$(CF$_2$)$_5$CH$_2$CH$_2$SO$_2$N(CH$_3$)CH$_2$CH$_2$OH,
CF$_3$(CF$_2$)$_3$CH$_2$CH$_2$SO$_2$N(CH$_3$)CH$_2$CH$_2$OH, R$_f$CH$_2$CH$_2$CH$_2$OH,
R$_f$(CH$_2$)$_2$OH, R$_f$(CH$_2$)$_2$S(CH$_2$)$_2$OH,
C$_4$F$_9$(CH$_2$)$_2$S(CH$_2$)$_2$OH, R$_f$(CH$_2$)$_4$S(CH$_2$)$_2$OH,
R$_f$(CH$_2$)$_2$S(CH$_2$)$_3$OH, R$_f$(CH$_2$)$_2$SCH(CH$_3$)CH$_2$OH,
R$_f$(CH$_2$)$_4$SCH(CH$_3$)CH$_2$OH, R$_f$CH$_2$CH(CH$_3$)S(CH$_2$)$_2$OH,
R$_f$(CH$_2$)$_2$S(CH$_2$)$_{11}$OH, R$_f$(CH$_2$)$_2$S(CH$_2$)$_3$O(CH$_2$)$_2$OH,
R$_f$(CH$_2$)$_3$O(CH$_2$)$_2$OH, R$_f$(CH$_2$)$_3$SCH(CH$_3$)CH$_2$OH, and
R$_f$SO$_2$N(H)(C$_2$H$_4$)O—C(O)(CH$_2$)$_5$—OH and the like, and mixtures thereof, wherein R$_f$ is a a perfluoroalkyl group having 1 to 12 carbon atoms, or a perfluoroheteroalkyl group having 3 to about 50 carbon atoms with all perfluorocarbon chains present having 6 or fewer carbon atoms. If desired, rather than using such alcohols, similar thiols can be utilized.

Preferred fluorine-containing monoalcohols include 2-(N-methylperfluorobutanesulfonamido)ethanol; 2-(N-ethylperfluorobutanesulfonamido)ethanol; 2-(N-methylperfluorobutanesulfonamido)propanol; N-methyl-N-(4-hydroxybutyl)perfluorohexanesulfonamide; 1,1,2,2-tetrahydroperfluorooctanol; 1,1-dihydroperfluorooctanol; C$_6$F$_{13}$CF(CF$_3$)CO$_2$C$_2$H$_4$CH(CH$_3$)OH; n-C$_6$F$_{13}$CF(CF$_3$) CON(H)CH$_2$CH$_2$OH; C$_4$F$_9$OC$_2$F$_4$OCF$_2$CH$_2$OCH$_2$CH$_2$OH; C$_3$F$_7$CON(H)CH$_2$CH$_2$OH; 1,1,2,2,3,3-hexahydroperfluorodecanol; C$_3$F$_7$O(CF(CF$_3$)CF$_2$O)$_{1-36}$CF (CF$_3$)CH$_2$OH; CF$_3$O(CF$_2$CF$_2$O)$_{1-36}$CF$_2$CH$_2$OH; and the like; and mixtures thereof.

R$_f$Q' may comprise derivatives (such as esters or acid halides) of fluorine-containing monocarboxylic acids include (1) those having the formula R$_f$(CH$_2$)$_n$(X)$_p$(CH$_2$)$_m$ COOH, wherein R$_f$ is as defined above, n and m are independently integers of 0 to 14 (preferably 0–8, more preferably 0–4), X is divalent oxygen or sulfur, and p is an integer of 0 or 1, and (2) those having the formula R$_f$QR'COOH, wherein R$_f$ is as defined above, R' is a divalent alkyl (straight chain or branched) or cycloalkyl radical having from 1 to about 12 carbon atoms (preferably from 1 to about 8 carbon atoms, more preferably from 1 to about 4 carbon atoms), and the divalent linking group Q is —SO$_2$N(R")— or —CON(R")— wherein R" is a monovalent alkyl (straight chain or branched), cycloalkyl, or aryl radical having from 1 to about 12 carbon atoms (preferably from 1 to about 8 carbon atoms, more preferably from 1 to about 4 carbon atoms).

Representative examples of useful derivatives of fluorine-containing monocarboxylic acids include perfluorobutanoic (C$_3$F$_7$COOH), perfluoroisobutanoic ((CF$_3$)$_2$CFCOOH), hydroperfluorobutanoic (C$_3$F$_6$HCOOH), perfluoropentanoic (C$_4$F$_9$COOH), hydroperfluoropentanoic (C$_4$F$_8$HCOOH), perfluorohexanoic (C$_5$F$_{11}$COOH), hydroperfluorohexanoic (C$_5$F$_{10}$HCOOH), perfluorcyclohexanyl carboxylic (C$_6$F$_{11}$COOH), perfluoroheptanoic (C$_6$F$_{13}$COOH), perfluoro(3-ethoxypropionic), perfluoro(3-propoxypropionic), perfluoro(3-butoxypropionic), perfluoro(3-pentoxypropionic), R$_f$[OCF(CF$_3$)CF$_2$]$_{1-6}$ OCF(CF$_3$)COOH where R$_f$ is a perfluroalkyl group of 1–12 carbon atoms, 4-(4-perfluoroisopropoxyperfluorobutyl)butanoic, 4-(bis(perfluoroisopropyl)fluoromethoxy) perfluorobutanoic, 12-(2-perfluoroisopropoxyperfluoroethyl)dodecanoic, 6-(2-perfluorocyclobutoxyperfluoroethyl)hexanoic, 4-(bis(perfluoroisopropyl)fluoromethoxy)perfluorobutanoic, 4-(2-bis(perfluoroisopropyl)fluoromethoxyperfluoroethyl) butanoic, 2-(N-(ethyl)perfluorobutanesulfonamido)acetic, and 2-(N-(methyl)perfluorobutanesulfonamido)acetic, and the like, and mixtures thereof.

Preferred fluorine-containing monocarboxylic acids include 2-(N-(ethyl)perfluorobutanesulfonamido)acetic, 2-(N-(methyl)perfluorobutanesulfonamido)acetic, and the like, and mixtures thereof.

It will be understood, with respect to the above lists, that the terminal hydroxyl or carboxyl groups may be replaced with other functional groups Q' that are reactive with terminal isocyanate (of the polyisocyanate) or hydroxyl groups (of the polyol) to form the linking group Q of Formula I.

Fluorine-containing monofunctional compounds suitable for use include those that comprise at least one of the above-described R$_f$ groups. The R$_f$ groups can contain straight chain, branched chain, or cyclic fluorinated alkylene groups or any combination thereof. The R$_f$ groups can be catenated with heteroatoms (that is, heteroatoms bonded to carbon atoms in the carbon-carbon chain so as to form a carbon-heteroatom-carbon chain) such as oxygen, divalent or hexavalent sulfur, or nitrogen. Fully-fluorinated groups are generally preferred, but hydrogen or chlorine atoms can also be present as substituents, provided that no more than one atom of either is present for every two carbon atoms. It is additionally preferred that any R$_f$ group contain at least about 40% fluorine by weight, more preferably at least about 50% fluorine by weight. The terminal portion of the group is generally fully-fluorinated, preferably containing at least 7 fluorine atoms, e.g., CF$_3$CF$_2$CF$_2$—, (CF$_3$)$_2$CF—, SF$_5$CF$_2$—. Perfluorinated aliphatic groups (i.e., those of the formula C$_n$F$_{2n+1}$—) are the most preferred R$_f$ groups. When high temperatures are encountered in processing or use, preferably, the fluorine-containing monoalcohols and monocarboxylic acids comprise at least one sulfonamido group, as this group appears to enhance the thermal stability of the resulting fluorochemical composition.

If desired, non-fluorinated monofunctional compounds can be utilized in addition to the fluorinated monofunctional compound(s) as a portion of the total monofunctional charge (for example, in amounts up to about 50 mole percent of the total).

The most preferred urethane oligomers comprises the condensation reaction product of one or more fluorinated polyols, an excess amount (relative to the polyol) of one ore more linear alkylene diisocyanates, and sufficient fluorinated monoalcohols to react with the terminal isocyanate groups. Such most preferred oligomers correspond to the Formula

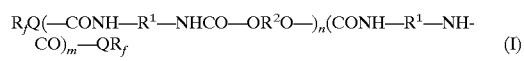

wherein:

n is a number from 1 to 10 inclusive;

m is 1;

R$_f$ is a perfluoroalkyl group having 1 to 2, preferably 1 to 8, most preferably 3 to 5 carbon atoms, or a perfluoroheteroalkyl group having 3 to about 50 carbon atoms with all perfluorocarbon chains present having 1 to 6, preferably 1 to 4 carbon atoms;

Q is a connecting group derived from the reaction between a nucleophilic functional group such as hydroxyl or amino, and an isocyanate group, e.g —C$_n$H$_{2n}$OC(O)NH— or —C$_n$H$_{2n}$NRC(O)NH—, R=H or lower alkyl;

R$^1$ is a straight chain alkylene, of 1 to 14 carbon atoms;

R$^2$ is a polyvalent organic group which is a residue of the polyol, that is a straight or branched chain alkylene, cycloalkylene, arylene or heteroalkylene group of 1 to 14 carbon atoms, preferably 1 to 8 carbon atoms, more preferably 1 to 4 carbon atoms, and most preferably two carbon atoms, or an arylene group of 6 to 12 carbon atoms; at least a portion of R$^2$ groups are substituted with or contain one perfluoroalkyl group, perfluoroheteroalkyl group, perfluoroheteroalkylene group, or mixtures thereof.

Optionally, R$^2$ may further comprise a water-solubilizing group or a polymerizable group.

It has been found that linear diisocyanates, corresponding to R$^1$, provide generally the best contact angle performance, with branched or cyclic groups leading to generally lower contact angle performance.

The fluorochemical oligomers may further comprise, in addition to the polyol(s), polyisocyanate(s) and monofunctional compound(s), the reaction product of water-solubilizing compounds comprising one or more water-solubilizing groups and at least one isocyanate-reactive hydrogen containing group.

The water-solubilizing groups of the water solubilizing compounds improve the aqueous solubility or dispersability and include, for example, carboxylate, sulfate, sulfonate, phosphate, phosphonate, ammonium, and quaternary ammonium groups. Such groups may be represented as —CO$_2$M, —OSO$_3$M, —SO$_3$M, —PO(OM)$_2$, —P(OM)$_3$, —NR$_2$HX, —NR$_3$X, —NRH$_2$X, and —NH$_3$X, respectively, wherein M is H or one equivalent of a monovalent or divalent soluble cation such as sodium, potassium, calcium, and NR$_3$H$^+$; X is a soluble anion such as those selected from the group consisting of halide, hydroxide, carboxylate, sulfonates, and the like; and R is selected from the group consisting of a phenyl group, a cycloaliphatic group, or a straight or branched aliphatic group having from about 1 to about 12 carbon atoms. Preferably, R is a lower alkyl group having from 1 to 4 carbon atoms. The group —NR$_3$X is a salt of a water-soluble acid, for example trimethyl ammonium chloride, pyridinium sulfate, etc. or an ammonium substituent. The group —NR$_2$HX is the salt of a water-soluble acid, such as dimethyl ammonium acetate or propionate. The group —NRH$_2$X is the salt of a water-soluble acid, such as methyl ammonium acetate or propionate. The group —NH$_3$X is the salt of a water-soluble acid, such as ammonium acetate or propionate. The salt form can be made by simple neutralization of the acid group with a base such as an amine, a quaternary ammonium hydroxide, an alkali metal carbonate or hydroxide, or the like; or alternatively by simple reaction of the amino group with a carboxylic acid, a sulfonic acid, a halo acid, or the like.

The water solubilizing group may be incorporated into the fluorochemical urethane oligomers by means of an isocyanate-reactive group and may selected from the group consisting of —OH, —SH, $NH_2$, and NRH wherein R is selected from the group consisting of a phenyl group, a cycloaliphatic group, or a straight or branched aliphatic group having from about 1 to about 12 carbon atoms, and is preferably a lower alkyl group having from 1 to 4 carbon atoms. The water-solublizing group is preferably a substituent of the polyol(s), such as a diol with a water-solublizing group. A representative suitable diol with a solubilizing group is 1,1-bis(hydroxymethyl)propionic acid and its salts such as its ammonium salt. A representative suitable monoalcohol with a solubilizing group is glycolic acid ($HOCH_2COOH$) and its salts. The amount of water-solubilizing group should be sufficient to solubilize or allow dispersion of the fluorochemical composition. Typically, the isocyanate:solubilizing group ratio should be from about 3:1 to about 16:1, preferably from about 5:1 to about 11:1, prior to reaction of the components. Alternatively, the isocyanate:solubilizing group ratio should be from about 1:1, relatively to the amount of free isocyanate groups. Similarly, the water-solubilizing group may be incorporated into the fluorochemical urethane oligomers by means of a hydroxyl-reactive group, such as electrophilic functional groups, as known in the art.

Illustrative water-solubilizing compounds having suitable water-solubilizing groups include, but are not limited to, those independently selected from the group consisting of $HOCH_2COOH$; $HSCH_2COOH$; $(HOCH_2CH_2)_2NCH_2COOH$; $HOC(CO_2H)(CH_2CO_2H)_2$; $(H_2N(CH_2)_nCH_2)_2NCH_3$ wherein n is an integer of 1 to 3; $(HOCH_2)_2C(CH_3)COOH$; $(HO(CH_2)_nCH_2)_2NCH_3$ wherein n is an integer of 1 to 3; $HOCH_2CH(OH)CO_2Na$; N-(2-hydroxyethyl) iminodiacetic acid $(HOCH_2CH_2N(CH_2COOH)_2)$; L-glutamic acid $(H_2NCH(COOH)(CH_2CH_2COOH))$; aspartic acid $(H_2NCH(COOH)(CH_2COOH))$; glycine $(H_2NCH_2COOH)$; 1,3-diamino-2-propanol-N,N,N',N'-tetraacetic acid $(HOCH(CH_2N(CH_2COOH)_2)_2)$; iminodiacetic acid $(HN(CH_2COOH)_2)$; mercaptosuccinic acid $(HSCH(COOH)(CH_2COOH))$; $H_2N(CH_2)_4CH(COOH)N(CH_2COOH)_2$; $HOCH(COOH)CH(COOH)CH_2COOH$; $(HOCH_2)_2CHCH_2COO)^-(NH(CH_3)_3)^+$; $CH_3(CH_2)_2CH(OH)CH(OH)(CH_2)_3CO_2K$; $H_2NCH_2CH_2OSO_3Na$; $H_2NC_2H_4NHC_2H_4SO_3H$; $H_2NC_3H_6NH(CH_3)_{C3}H_6SO_3H$; $(HOC_2H_4)_2NC_3H_6OSO_3Na$; $(HOCH_2CH_2)_2NC_6H_4OCH_2CH_2OSO_2OH$; N-methyl-4-(2,3-dihydroxypropoxy)pyridinium chloride, $((H_2N)_2C_6H_3SO_3)^-(NH(C_2H_5)_3)^+$; dihydroxybenzoic acid; 3,4-dihydroxybenzylic acid; 3-(3,5-dihydroxyphenyl)propionic acid; salts of the above amines, carboxylic acids, and sulfonic acids; diol-amines of the general formula R—N$[(CH_2CH_2O)_xH[(CH_2CH_2O)y]H$, where x+y=2, 5, 10, 15 and 50triol-amines of the general formula R—N$[(CH_2CH_2O)xH—CH_2CH_2CH_2—N[(CH_2CH_2O)y]H[CH_2CH_2O)_2H]$, where x+y+z=3, 10, 15 and 50,and ammonium salts of the indicated triol- and diol-amines (where R is an alkyl, available from Akzo Chemical; and mixtures thereof. An example of a water-solubilizing compound having a hydroxy-reactive functional group is Br—$(CH_2)_n$—$CO_2H$.

The fluorochemical oligomers may further comprise, in addition to the polyol(s), polyisocyanate(s) and monofunctional compound(s), the reaction product of polymerizable compounds comprising one or more polymerizable groups and at least one isocyanate-reactive hydrogen containing group. The polymerizable group may be incorporated into the fluorochemical urethane oligomers by means of a reactive functional group, as previously described. Examples of useful polymerizable groups include but are not limited to acrylate, methacrylate, vinyl, allyl, and glycidyl. Representative useful compounds having polymerizable groups include hydroxyethyl acrylate, hydroxyethyl methacrylate, pentaerythriol triacrylate, glycidol, allyl alcohol, $C_2H_5(CH_3)C=N$—OH, $CH_2=CHO(CH_2)_4OH$ and glycidyl methacrylate.

The fluorochemical compositions of the present invention comprising a mixture of urethane oligomers can be made by simple blending of the polyol(s), monofunctional fluorine-containing compound(s), polyisocyanate compound(s) and optionally (d) one or more water-solubilizing compounds or (e) one or more polymerizable compounds. As one skilled in the art would understand, the order of blending or the ordering of the steps is non-limiting and can be modified so as to produce a desired fluorochemical composition. In the synthesis, for example, the polyisocyanate compound(s), the polyol(s), the fluorine-containing monofunctional compound ($R_fQ'$), and optionally (d) one or more water-solubilizing compounds or (e) one or more polymerizable compounds and a solvent are charged to a dry reaction vessel in immediate succession or as pre-made mixtures. When a homogeneous mixture or solution is obtained a catalyst is typically added, and the reaction mixture is heated at approximately 40 to 80° C., preferably approximately 60 to 70° C., one-half to five hours, preferably two to four hours.

When a fluorine-containing monofunctional compound ($R_fQ'$) is used to prepare fluorine-containing urethane oligomers of Formula I above, the molar ratio of monofunctional compound to polyisocyanate can be in the range of about 1:1 to 1:10 (preferably, about 1:1 to 1:7; more preferably, about 1:1 to 1:2; and most preferably, about 1:1 to 1:1.5). The molar ratio of polyisocyanate to polyol can then be in the range of about 2:1 to 1:2. Preferably, the ratio of the total number of equivalents of hydroxyl groups to the total number of equivalents of isocyanate groups is about 1:1.

Depending on reaction conditions (e.g., reaction temperature and/or polyisocyanate used), a catalyst level of up to about 0.5 percent by weight of the polyisocyanate/polyol/monoalcohol mixture may be used, but typically about 0.00005 to about 0.5 percent by weight is required, 0.02 to 0.1 percent by weight being preferred.

Suitable catalysts include, but are not limited to, tertiary amine and tin compounds. Examples of useful tin compounds include tin II and tin IV salts such as stannous octoate, dibutyltin dilaurate, dibutyltin diacetate, dibutyltin di-2-ethylhexanoate, and dibutyltinoxide. Examples of useful tertiary amine compounds include triethylamine, tributylamine, triethylenediamine, tripropylamine, bis (dimethylaminoethyl) ether, morpholine compounds such as ethyl morpholine, and 2,2'-dimorpholinodiethyl ether, 1,4-diazabicyclo[2.2.2]octane (DABCO, Aldrich Chemical Co., Milwaukee, Wis.), and 1,8-diazabicyclo[5.4.0.]undec-7-ene (DBU, Aldrich Chemical Co., Milwaukee, Wis.). Tin compounds are preferred. If an acid catalyst is used, it is preferably removed from the oligomer or neutralized after the oligomerization. It has been found that the presence of the catalyst may deleteriously affect the contact angle performance.

A mixture of polyols and/or a mixture of monoalcohols can be used instead of a single polyol and/or a single monoalcohol, provided the average functionality is greater than 1, preferably 2 to 3. For example, a polyol mixture comprising a polyol with a water-solubilizing or a polymerizable group and a polyol with an $R_f$ group can be used. Similarly, higher polyols such as triols or tetrols may constitute part of the polyol mixture. As well, a monoalcohol mixture comprising a monoalcohol with a water-solubilizing or polymerizable group and a fluorine-containing monoalcohol can be used.

The fluorochemical compositions of the present invention comprising a mixture of urethane molecules can also be made following a step-wise synthesis, in addition to a batch method. In the synthesis, the polyisocyanate and the polyol are dissolved together under dry conditions, preferably in a solvent, and then the resulting solution is heated at approximately 40 to 80° C., preferably approximately 60 to 70° C., with mixing in the presence of a catalyst for one-half to two hours, preferably one hour.

The resulting isocyanate functional urethane oligomers and compounds are then further reacted with one or more of the fluorochemical monofunctional compounds described above. The fluorochemical monofunctional compound(s) is (are) added to the above reaction mixture, and react(s) with the remaining or a substantial portion of the remaining —NCO or —OH groups. The above temperatures, dry conditions, and mixing are continued one-half to two hours, preferably one hour. Terminal fluorine-containing groups are thereby bonded to the isocyanate functional urethane oligomers and compounds. These oligomers and compounds can be optionally further functionalized with water-solublizing or polymerizable groups described above by reacting any of the remaining —NCO groups in the resulting mixture with one or more of the reactive hydrogen-containing water-solubilizing or polymerizable group-containing compounds described above. Thus, the water-solubilizing or polymerizable compound(s) is (are) added to the reaction mixture, using the same conditions as with the previous additions.

Water-solubilizing or polymerizable group-containing compounds can be added and reacted with —NCO or —OH groups under the conditions described above in any of the steps described above. For example, as mentioned above, the water-solubilizing or polymerizable group-containing compound can be added as a mixture with the polyol. Alternatively, the water-solubilizing or polymerizable group-containing compound can be added (a) after reaction of the polyol with the polyfunctional isocyanate, (b) as a mixture with the monoalcohol(s), and (c) after reaction of the polyol and monoalcohol with the polyfunctional isocyanate. When the water-solubilizing or polymerizable group-containing compound is a monoalcohol, it is preferably added as a mixture with the fluorine-containing monoalcohol. When the water-solubilizing or polymerizable group-containing compound is a diol, it is preferably added as a mixture with the polyol.

When the composition of the present invention contains a urethane oligomer having one or more water-solubilizing carboxylic acid groups, solubility or dispersability of the composition in water can be further increased by forming a salt of the carboxylic acid group(s). Basic salt-forming compounds, such as tertiary amines, quaternary ammonium hydroxides, and inorganic bases, including, but not limited to, those selected from the group consisting of sodium hydroxide, potassium hydroxide, cesium hydroxide, lithium hydroxide, calcium hydroxide, magnesium hydroxide, zinc hydroxide, and barium hydroxide, may be used in a sufficient amount (i.e., in an amount to maintain a pH of greater than about 6). These basic salt-forming compounds preferably can be added in the water phase, but optionally in the preparation of the urethane oligomers, to form salts with the incorporated, pendant and/or terminal carboxylic acid groups on the urethane oligomer. Examples of useful amine salt-forming compounds include, but are not limited to, those selected from the group consisting of ammonia, trimethylamine, triethylamine, tripropylamine, triisopropylamine, tributylamine, triethanolamine, diethanolamine, methyldiethanolamine, morpholine, N-methylmorpholine, dimethylethanolamine, and mixtures thereof. Preferred salt forming compounds include those selected from the group consisting of ammonia, trimethylamine, dimethylethanolamine, methyldiethanolamine, triethylamine, tripropylamine, and triisopropylamine, since the chemical compositions prepared therefrom are not excessively hydrophilic upon coating and curing. Since certain salts formed by the reaction of salt forming compounds, such as potassium hydroxide in combination with a carboxylic acid group, could result in undesired reaction with NCO groups, it is preferred to add the salt forming compound in a water phase after all of the diols, alcohol, and silane compounds have been reacted with the NCO groups of the polyfunctional isocyanate compound.

If desired for particular applications, small amounts of one or more polymeric or non-polymeric chain extenders (for example, diamines) can be utilized, in addition to the above-described reactants, in preparing the fluorochemical composition.

The coating compositions of the present invention comprise aqueous suspensions, emulsions, or solutions, or organic solvent (or organic solvent/water) solutions, suspensions, or emulsions of the fluorochemical oligomers of the present invention. When applied as coatings, the fluorochemical compositions of the present invention impart oil- and water-repellency properties, and/or stain-release and stain-resistance characteristics to any of a wide variety of substrates.

The fluorochemical oligomers can be dissolved, suspended, or dispersed in a variety of solvents to form coating compositions suitable for use in coating onto a substrate. Generally, the solvent solutions can contain from about 0.1 to about 50 percent, or even up to about 90 percent, by weight non-volatile solids (based on the total weight of the components). Aqueous suspensions, emulsions, or solutions are generally preferred and generally can contain a non-volatile solids content of about 0.1 to about 50 percent, preferably, about 1 to about 10 percent, by weight (based on the total weight of the components). Coating compositions preferably contain from about 0.1 to about 10 percent fluorochemical oligomers, based on the weight of the coating composition. Preferably the amount of fluorochemical oligomers used in the coating is about 1 to about 5 weight percent, most preferably from about 2 to about 3 weight percent, of the solution. Suitable solvents include water, alcohols, esters, glycol ethers, amides, ketones, hydrocarbons, hydrofluorocarbons, hydrofluoroethers, chlorohydrocarbons, chlorocarbons, and mixtures thereof. Depending upon the substrate to which the composition is being applied, water is the preferred solvent because it does not raise any environmental concerns and is accepted as safe and non-toxic.

Another embodiment of the present invention is an article having a cured coating derived from the chemical composition of the present invention and optionally a solvent. After application and curing of the coating composition, the article displays high water and hexadecane dynamic receding contact angles, oil- and water-repellency, and/or stain-release and stain-resistance properties.

The coating compositions of the present invention can be applied to a wide variety of substrates, including, but not limited to, fibrous substrates and hard substrates. Fibrous substrates include woven, knit, and nonwoven fabrics, textiles, carpets, leather, and paper. Hard substrates include, but are not limited to, glass, ceramic, masonry, concrete, natural stone, man-made stone, grout, metals, wood, plastics, and painted surfaces. Substrates can have flat or curved surfaces and may be particulate and fibrous in nature, as well. Preferred substrates are fibrous or are capable of imbibing a liquid and are therefore porous. Such substrates are particularly subject to staining and soiling, but also benefit greatly from the fluorochemical compositions of the present invention because the coating composition can penetrate into the fibrous or porous substrate surface and spread over the internal surfaces of the substrate.

Representative examples of substrates that can be coated with the coating composition include lenses used in ophthalmic spectacles, sunglasses, optical instruments, illuminators, watch crystals, and the like; plastic window glazing; signs; decorative surfaces such as wallpaper and vinyl flooring; composite or laminated substrates such as FORMICA brand sheeting or laminated flooring (e.g., PERGO brand flooring); ceramic tile and fixtures (sinks, showers, toilets); natural and man-made stones; decorative and paving stones; cement and stone sidewalks and driveways; articles that comprise grout or the finished surface of applied grout; wood furniture surface (desktops, tabletops); cabinet surfaces; wood flooring, decking, and fencing; leather; paper; fiber glass fabric and other fiber-containing fabrics; textiles; carpeting; drapery material, upholstery, clothing, and the like.

Since coatings prepared from the coating compositions can render metal surfaces resistant to soils, the optical properties of metal surfaces like those on decorative metal strips and mirrors can be preserved longer. The coating compositions can make wood surfaces more resistant to food and beverage stains while helping to maintain a lustrous appearance. In addition, the coating compositions can be applied as a protective coating on aircraft wings, boat hulls, fishing line, medical surfaces, and siding, and can be used in food release, mold release, adhesive release applications, and the like. Decorative stones include, for example, marble, granite, limestone, slate, and the like.

Preferred substrate that can be coated with the coating composition of the present invention are fibrous substrates, such as nonwoven, knits, and woven fabrics, carpet, drapery material, upholstery, clothing and essentially any textile. To impart repellency and/or stain-resistance characteristics to a substrate, having one or more surfaces, (a) the coating composition is applied onto one or more surfaces of the substrate and (b) the coating composition is cured (e.g. dried or polymerized) at ambient temperature or preferably at elevated temperatures. The use of elevated temperatures is particularly advantageous for curing fibrous substrates, since best repellency properties are then achieved. Elevated temperatures of 50 to 150° C. are preferred with 100 to 130° C. more preferred.

Other preferred substrates that can be coated with the coating composition of the present invention are porous, hard substrates such as ceramics, grout, masonry, concrete, natural stone, man-made stone, and wood. For these substrates, aqueous solutions of the composition are preferred, and, because it is often difficult to heat large substrates such as concrete substrates, it is preferred that the compositions cure without the application of heat, i.e. room temperature curable. Aqueous compositions avoid VOC emissions and flammability concerns. Other aqueous formulations, such as dispersions or suspensions, are not preferred because of the difficulty in obtaining a uniform coating, without the application of heat.

The coating compositions comprising the fluorochemical composition can be applied to a treatable substrate by standard methods such as, for example, spraying, padding, dipping, roll coating, brushing, or exhaustion (optionally followed by the drying of the treated substrate to remove any remaining water or solvent). The treatable substrate can be in the form of molded or blown articles, sheets, fibers (as such or in aggregated form, for example, yarn, toe, web, or roving, or in the form of fabricated textiles such as carpets), woven and nonwoven fabrics, films, etc. When coating flat substrates of appropriate size, knife-coating or bar-coating may be used to ensure uniform coatings of the substrate. If desired, the fluorochemical composition can be co-applied with conventional fiber treating agents, for example, spin finishes or fiber lubricants. Such a topical treatment process can involve the use of the neat fluorochemical composition, without added solvent, and is thus preferred from an environmental perspective over the use of organic solvent solutions of the fluorochemical composition.

The coating compositions can be applied in an amount sufficient to achieve the desired repellency properties for a particular application. This amount can be determined empirically and can be adjusted as necessary or desired to achieve the repellency properties without compromising the properties of the treatable substrate.

The coating compositions can be applied to a substrate in any desired thickness. Coatings as thin as a few microns can offer excellent low surface energy, stain-resistance, and stain-release. However, thicker coatings (e.g., up to about 20 microns or more) can also be used. Thicker coatings can be obtained by applying to the substrate a single thicker layer of a coating composition that contains a relatively high concentration of the chemical composition of the present invention. Thicker coatings can also be obtained by applying successive layers to the substrate of a coating composition that contains a relatively low concentration of the fluorochemical composition of the present invention. The latter can be done by applying a layer of the coating composition to the substrate and then drying prior to application of a successive layer. Successive layers of the coating can then be applied to dried layers. This procedure can be repeated until the desired coating thickness is achieved.

Another embodiment of the present invention is a water- and oil-repellent composition prepared by (a) combining the fluorochemical composition and at least one thermoplastic polymer (optionally, along with other additives) and then melt processing the resulting combination; or (b) combining the fluorochemical composition and at least one thermosetting polymer or ceramer or the reactive precursors thereof (optionally, along with other additives) and then curing, optionally with the application of heat or actinic radiation. Alternative processes for preparing the water- and oil-repellent composition of the invention include, for example, (c) dissolving the fluorochemical composition and a polymer in at least one solvent and then casting or coating (for example, on a substrate such as plastic sheet or film, fabric, wood, ceramic, or stone) the resulting solution and allowing evaporation of the solvent, optionally with the application of heat; and (d) combining the fluorochemical composition and at least one monomer (optionally, along with other additives) and then polymerizing the monomer, optionally in the presence of at least one solvent and optionally with the application of heat or actinic radiation.

To form a polymer melt blend by melt processing, the fluorochemical composition can be, for example, intimately mixed with pelletized or powdered polymer and then melt processed by known methods such as, for example, molding, melt blowing, melt spinning, or melt extrusion. The fluorochemical composition can be mixed directly with the polymer or it can be mixed with the polymer in the form of a "master batch" (concentrate) of the fluorochemical composition in the polymer. If desired, an organic solution of the fluorochemical composition can be mixed with powdered or pelletized polymer, followed by drying (to remove solvent) and then by melt processing. Alternatively, the fluorochemical composition can be injected into a molten polymer stream to form a blend immediately prior to, for example, extrusion into fibers or films or molding into articles.

After melt processing, an annealing step can be carried out to enhance the development of repellent characteristics. In addition to, or in lieu of, such an annealing step, the melt processed combination (for example, in the form of a film or a fiber) can also be embossed between two heated rolls, one or both of which can be patterned. An annealing step typically is conducted below the melt temperature of the polymer (for example, in the case of polyamide, at about 150–220° C. for a period of about 30 seconds to about 5 minutes).

The fluorochemical composition can be added to thermoplastic or thermosetting polymer (or, alternatively, to other treatable substrate materials) in amounts sufficient to achieve the desired repellency properties for a particular application. The amounts can be determined empirically and can be adjusted as necessary or desired to achieve the repellency properties without compromising the properties of the polymer (or other treatable substrate material). Generally, the fluorochemical composition can be added in amounts ranging from about 0.1 to about 10 percent by weight (preferably, from about 0.5 to about 4 percent; more preferably, from about 0.75 to about 2.5 percent) based on the weight of polymer (or other treatable substrate material).

Any of a wide variety of constructions can be made from the water- and oil-repellent composition of the invention, and such constructions will find utility in any application where some level of repellency characteristics is required. For example, the composition of the invention can be used to prepare films and molded or blown articles, as well as fibers (for example, melt-blown or melt-spun fibers, including microfibers and sheath-core fibers) that can be used to make woven, knit, and nonwoven fabrics. Such films, molded or blown articles, fibers, and fabrics exhibit water and oil repellency (and soil resistance) characteristics under a variety of environmental conditions and can be used in a variety of applications.

For example, molded articles comprising the polymer composition of the invention can be prepared by standard methods (for example, by high temperature injection molding) and are particularly useful as, for example, headlamp covers for automobiles, lenses (including eyeglass lenses), casings or circuit boards for electronic devices (for example, computers), screens for display devices, windows (for example, aircraft windows), and the like. Films comprising the polymer composition can be made by any of the film making methods commonly employed in the art. Such films can be nonporous or porous (the latter including films that are mechanically perforated), with the presence and degree of porosity being selected according to the desired performance characteristics. The films can be used as, for example, photographic films, transparency films for use with overhead projectors, tape backings, substrates for coating, and the like.

Fibers comprising the polymer composition of the invention can be used to make woven, knit, or nonwoven fabrics that can be used, for example, in making medical fabrics, medical and industrial apparel, fabrics for use in making clothing, home furnishings such as rugs or carpets, paper machine clothing, and filter media such as chemical process filters or respirators. Nonwoven webs or fabrics can be prepared by processes used in the manufacture of either melt-blown or spunbonded webs. For example, a process similar to that described by Wente in "Superfine Thermoplastic Fibers," Indus. Eng'g Chem. 48, 1342 (1956) or by Wente et al. in "Manufacture of Superfine Organic Fibers," Naval Research Laboratories Report No. 4364 (1954) can be used. Multi-layer constructions made from nonwoven fabrics enjoy wide industrial and commercial utility, for example, as medical fabrics. The makeup of the constituent layers of such multi-layer constructions can be varied according to the desired end-use characteristics, and the constructions can comprise two or more layers of melt-blown and spunbonded webs in many useful combinations such as those described in U.S. Pat. No. 5,145,727 (Potts et al.) and U.S. Pat. No. 5,149,576 (Potts et al.), the descriptions of which are incorporated herein by reference. In multi-layer constructions, the fluorochemical polymer composition can be used alone in one or more layers or can be used in combination with other additive(s) in one or more layers. Alternatively, the fluorochemical polymer composition and the other additive(s) can each be independently segregated in one or more layers. For example, in a spunbonded/melt-blown/spunbonded ("SMS") three-layer construction, the other additive(s) (for example, antistats) can be used in one or both spunbonded layers, and the fluorochemical composition can be used in the melt-blown layer, to impart both antistatic and repellency characteristics to the overall construction.

The repellency-imparting, fluorochemical polymer composition can also find utility as an additive to coatings. Such coatings can be water- and oil-repellent, and scratch-resistant (as well as soil-resistant) and can be used in the photographic industry or as protective coatings for optical or magnetic recording media.

If desired, the polymer composition can further contain one or more additives, including those commonly used in the art, for example, dyes, pigments, antioxidants, ultraviolet stabilizers, flame retardants, surfactants, plasticizers, tackifiers, fillers, and mixtures thereof. In particular, performance enhancers (for example, polymers such as polybutylene) can be utilized to improve the repellency characteristics in, for example, melt additive polyolefin applications.

Objects and advantages of this invention are further illustrated by the following examples, but the particular materials and amounts thereof recited in these examples, as well as other conditions and details, should not be construed to unduly limit this invention. In the examples, where weight percent or parts by weight are indicated, these are based on the weight of the entire composition unless indicated otherwise.

EXAMPLES

Glossary

POSF—$C_8F_{17}SO_2F$, perfluorooctanesulfonyl fluoride, available as FLUORAD™ FX-8 fluorochemical intermediate from 3M Company, St. Paul, Minn.

PHSF—$C_6F_{13}SO_2F$, perfluorooctanesulfonyl fluoride, available as a fluorochemical intermediate from 3M Company, St. Paul, Minn.

PBSF—$C_4F_9SO_2F$, perfluorobutanesulfonyl fluoride, available from Sigma-Aldrich, Milwaukee, Wis.

$C_8F_{17}SO_2NH_2$—a fluorochemical sulfonamide, can be prepared by reacting POSF with an equimolar amount of $NH_3$.

$C_6F_{13}SO_2NH_2$—a fluorochemical sulfonamide, can be prepared by reacting PHSF with an equimolar amount of $NH_3$.

$C_4F_9SO_2NH_2$—a fluorochemical sulfonamide, can be prepared by reacting PBSF with an equimolar amount of $NH_3$.

$CF_3CH_2OH$—2,2,2-trifluoroethanol, a fluorochemical alcohol, available from Sigma-Aldrich.

$C_3F_7CONHC_2H_4OH$—a fluorochemical alcohol, can be prepared by reacting $C_3F_7COOCH_3$ with $H_2NC_2H_4OH$ as described in Hauptschein et al, JACS, 77, 4930 (1955).

MeFOSE—$C_8F_{17}SO_2N(CH_3)CH_2CH_2OH$, a fluorochemical alcohol having an equivalent weight of 557, can be made in two stages by reacting POSF with methylamine and ethylenechlorohydrin, using a procedure essentially as described in Example 1 of U.S. Pat. No. 2,803,656 (Ahlbrecht et al.), or alternatively by reacting N-methylperfluorooctylsulfonamide with ethylene glycol carbonate, using the procedure essentially as described in Example 7 of U.S. Pat. No. 3,734,962 (Niederprum et at.).

MeFBSE—$C_4F_9SO_2N(CH_3)CH_2CH_2OH$, a fluorochemical alcohol having an equivalent weight of 357, can be made in two stages by reacting PBSF with methylamine and ethylenechlorohydrin, using a procedure essentially as described in Example 1 of U.S. Pat. No. 2,803,656 (Ahlbrecht, et al.).

$C_4F_9SO_2NHC_2H_4OCH_3$—Into a 2L flask equipped with stirrer, heating mantle, thermometer, condenser and nitrogen purge were charged 90 g (1.2 mol) of $CH_3OCH_2CH_2NH_2$ (2-methoxyethylamine, available from Sigma-Aldrich), 119 g (1.5 mol) of pyridine and 200 g of diisopropyl ether solvent. 299 g (1 mol) $C_4F_9SO_2F$ was then added at room temperature over a 5 hour period. An exothermic reaction started, and the reactor temperature went up to 65° C., causing refluxing of the solvent. After addition, the mixture was heated to reflux for 8 hours. GC analysis of the reaction product showed no more $C_4F_9SO_2F$ present. The reaction mixture was washed twice with an aqueous 5% HCl solution, then washed once each in sequence with water, 5% aqueous $NaHCO_3$ and water. After drying over anhydrous $MgSO_4$, filtration and distillation at 87–92° C./1.5 at 2 torr gave 304 g of product. Yield was 84%, and analysis by GC showed the purity to be 93.7%. The structure of the product, $C_4F_9SO_2NHC_2H_4OCH_3$, was confirmed by GC/MS and NMR analysis.

Then 85 g (0.2391 mol) of the $C_4F_9SO_2NHC_2H_4OCH_3$ product was reacted with 100 g of MeSiI (0.5 mol) in 200 g of $CHCl_3$ by stirring the reaction mixture for 2 days at room temperature. GC analysis showed a conversion of 91.5%. The mixture was hydrolyzed, and the isolated organic layer was washed in sequence with water, aqueous $NaHCO_3$ and water. After drying over anhydrous $MgSO_4$, filtering and evaporating the solvent from the filtrate using rotary evaporation, 83 g of solid product was recovered with GC purity of 90%.

H-FBSE—$C_4F_9SO_2NHCH_2CH_2OH$—a fluorochemical alcohol, made by the following procedure. 85 g (0.2391 mol) of the aforementioned $C_4F_9SO_2NHC_2H_4OCH_3$ product was reacted with 100 g of $(CH_3)_3SiI$ (0.5 mol) (iodotrimethylsilane, available from Sigma-Aldrich) in 200 g of $CHCl_3$ by stirring the reaction mixture for 2 days at room temperature. GC analysis showed a conversion of 91.5%. The mixture was hydrolyzed, and the isolated organic layer was washed in sequence with water, aqueous NaHCO3 and water. After drying over anhydrous $MgSO_4$, filtering and evaporating the solvent from the filtrate using rotary evaporation, 83 g of solid product, $C_4F_9SO_2NHCH_2CH_2OH$, was obtained with purity by GC analysis of 90%.

MeFBSB—$C_4F_9SO_2N(CH_3)CH_2CH_2CH_2CH_2OH$—a fluorochemical alcohol, made according to the following procedure. Into a reaction flask was charged 127.9 g (0.408 mole) of $C_4F_9SO_2NHCH_3$ (can be prepared by reacting $C_4F_9SO_2F$ with methylamine, for example, by the procedure described in Example 1 of U.S. Pat. No. 2,803,615), 56.47 g (0.408 mole) of $K_2CO_3$, 61.5 g (0.408 mole) of 4-chlorobutyl acetate ($Cl(CH_2)_4OCOCH_3$, available from Sigma-Aldrich), 1 g of KI and 150 mL of diglyme (diethylene glycol dimethyl ether, available from Sigma-Aldrich). The above materials were stirred for two hours at ambient temperature and then heated to 125° C. for 16 hours. At this time, glc analysis of the reaction mixture showed that the ratio of product ester to starting material sulfonamide was 99/1, indicating nearly complete conversion to the fluorochemical ester. The reaction was cooled to 101° C. and 27 g of potassium hydroxide (0.408 mole) was added directly to the reaction mixture to hydrolyze the ester to the alcohol. The reaction temperature was increased to about 119° C. After 1.5 hours glc analysis showed that the ratio of ester to final product alcohol was 42/58. An additional 27 g potassium hydroxide was added and the mixture held at 101° C. for about 16 hours. The reaction mixture was cooled to 75° C., water was added, and the resulting two-phase system was mixed. After allowing the phases to separate, the upper product phase was removed and the remaining aqueous phase extracted 2 times with diethyl ether. The ether extracts were combined with the product phase and the resulting mixture was washed with dilute aqueous HCl followed by a final wash with saturated aqueous sodium chloride to yield, after removal of the ether, 119 g of crude product alcohol. The crude product alcohol was distilled (boiled at 122–3° C./0.8 torr) to give the final purified alcohol product in 99% purity.

MeFBSE(PCL)$_{4.4}$—$C_4F_9SO_2N(CH_3)C_2H_4O[(C(O)(CH_2)_5O]_{4.4}H$, a fluorochemical alcohol that is a 4.4 mole polyvalerolactone adduct to $C_4F_9SO_2N(CH_3)C_2H_4OH$, prepared as described below.

To a reaction flask was added a mixture of 100 g (0.28 mol) of MeFBSE, 1.0 g of pTSA, and 15 g (0.132 mol) of epsilon-caprolactone (available from Sigma-Aldrich). The resulting mixture was heated to 130° C., treated with an additional 15 g of epsilon-caprolactone, heated for 2 hours and treated with yet another additional 15 g of epsilon-caprolactone. After 2 additional hours, the heat was turned off. The mixture was treated with a final 15 g of epsilon-caprolactone and was reheated for an additional 4 hours. The reaction product was dissolved in ether, the resulting ether solution was washed well with water, then ether was removed from the washed ether solution by vacuum distillation to yield 141.2 g of reddish brown oil. 30.4 g of the oil was subject to one-plate distillation to produce 9.6 g of recovered MeFBSE at 100° C./0.35 torr and a residue of 20.1 g of tan solid. C,H-nmr indicated the majority of the product was $C_4F_9SO_2N(CH_3)C_2H_4O[(C(O)(CH_2)_5O]_{4.4}H$. Confirmation of this analysis came from the nmr of the acrylate ester.

FOSEE—$C_8F_{17}SO_2N(C_2H_4OH)_2$, a fluorochemical diol, can be prepared by reacting $C_8F_{17}SO_2NH_2$ with ethylene chlorohydrin as described in Example 8 of U.S. Pat. No. 3,787,351 (Olson).

FHSEE—$C_6F_{13}SO_2N(C_2H_4OH)_2$, a fluorochemical diol, can be prepared as described in Example 8 of U.S. Pat. No. 3,787,351 (Olson), except that an equimolar amount of $C_6F_{13}SO_2NH_2$ is substituted for $C_8F_{17}SO_2NH_2$.

FBSEE—$C_4F_9SO_2N(C_2H_4OH)_2$, a fluorochemical diol, can be prepared as described in Example 8 of U.S. Pat. No. 3,787,351 (Olson), except that an equimolar amount of $C_4F_9SO_2NH_2$ is substituted for $C_8F_{17}SO_2NH_2$.

$(CF_3)_2C(C_6H_4OH)_2$—4,4'-(hexafluoroisopropylidene) diphenol, a fluorochemical diol available from Sigma-Aldrich.

$HOCH_2(CF_2)_3CH_2OH$—a fluorochemical diol, can be prepared as described by McBee et al., *J. Am. Chem. Soc.*, vol. 74, p. 444 (1952).

$(HOCH_2CF_2CF_2OCF_2CF_2)_2CF_2$—a fluorochemical diol prepared as described below. Acid fluoride-terminated di(perfluorotetramethylene oxide) $(FCO(CF_2)_2O(CF_2)_4O(CF_2)_2COF)$ (1100 g, 22% purity by glc) was added dropwise to well-stirred methanol (250 mL), and the resulting mixture was stirred for one hour at room temperature and then poured over 1 L of cracked ice. The oily layer that separated was extracted with 200 mL of diethyl ether, and the resulting ether extract was washed three times with water and dried with magnesium sulfate. After removal of the ether by rotary evaporation, the resulting material was subjected to distillation at 10 torr until the temperature of distilling material reached 85° C. The remaining undistilled, crude dimethyl ester (667 g) was reduced to the dialcohol with sodium borohydride. Thus, sodium borohydride (54.5 g) was slurried in 400 mL of THF and brought to reflux, and maintained at reflux while the dimethyl ester (333.5 g) was added, followed by three hours of refluxing. The resulting mixture was cautiously poured over 2 L of cracked ice containing 125 mL concentrated sulfuric acid, forming an oily layer. This reduction procedure was repeated on the remaining dimethyl ester, and the resulting oily layers were combined, washed with aqueous sodium carbonate solution, dried over anhydrous calcium sulfate and distilled. The fraction which distilled at 77–120° C. (1–3.7 torr) crystallized at room temperature. Recrystallization of the resulting crystals from benzene containing a small amount of methylene chloride yielded 167.4 g of the expected diol.

The acid fluoride-terminated di(perfluorotetramethylene oxide was prepared by photolysis of perfluorooxydipropionyl fluoride as described in Zollinger, J. L. et al, *J. Macromol. Sci.-Chem.*, A3(7), pp. 1443–1464 (1969). The perfluorooxydipropionyl fluoride was made by electrochemical fluorination of oxydipropionyl fluoride as described in U.S. Pat. No. 858,671.

EG—ethylene glycol, $HO(CH_2)_2OH$, available from Sigma-Aldrich.

DEG—diethylene glycol, $HO(CH_2)_2O(CH_2)_2OH$, available from Sigma-Aldrich.

BDO—butanediol, $HO(CH_2)_4OH$, available from Sigma-Aldrich.

HDO—hexanediol, $HO(CH_2)_6OH$, available from Sigma-Aldrich.

75-H-450—a diol having an average molecular weight of 980, made by randomly copolymerizing ethylene oxide and propylene oxide, available as UCON™ 75-H-1400 fluid from Union Carbide Corp., S. Charleston, W. Va.

75-H-1400—a diol having an average molecular weight of 2470, made by randomly copolymerizing ethylene oxide and propylene oxide, available as UCON™ 75-H-1400 fluid from Union Carbide Corp., S. Charleston, W. Va. $(CH_3)_2C(C_6H_{40}H)_2$—4,4'-isopropylidenediphenol, a diol available from Sigma-Aldrich.

MDEOA—N-methyldiethanolamine, $(HOCH_2CH_2)_2N(CH_3)$, available from Sigma-Aldrich.

Eth C25—ETHOMEEN# C/25 polyoxyethylene (15) cocamine, available from Akzo Nobel Chemicals, Chicago, Ill.

ARQUAD™ T-50—tallow trimethylammonium chloride, 50% solution, available from Akzo Nobel Chemicals.

EDA—ethylenediamine, $H_2NCH_2CH_2NH_2$, available from Sigma-Aldrich.

GA—glycolic acid, $HOCH_2COOH$, available from Sigma-Aldrich.

Bicine—$(HOCH_2CH_2)_2NCH_2COOH$, available from Sigma-Aldrich.

2-BTO—2-butanone oxime, $(CH_3)(C_2H_5)C=NOH$, available from Sigma-Aldrich.

BDI—tetramethylene 1,4-diisocyanate, $O=C=N—(CH_2)_4—N=C=O$, available from Sigma-Aldrich.

HDI—hexamethylene 1,6-diisocyanate, $O=C=N—(CH_2)_6—N=C=O$, available from Sigma-Aldrich.

ODI—octamethylene 1,8-diisocyanate, $O=C=N—(CH_2)_8—N=C=O$, available from Sigma-Aldrich.

DDI—dodecane 1,12-diisocyanate, $O=C=N—(CH_2)_{12}—N=C=O$, available from Sigma-Aldrich.

MDI—diphenylmethane 4,4'-diisocyanate, available as Mondur™ M from Bayer Corporation, Pittsburgh, Pa.

$H_{12}$MDI—dicyclohexylmethane diisocyanate, available as Desmodur™ W from Bayer Corp.

IPDI—isophorone diisocyanate, [5-isocyanato-1-(isocyanatomethyl)-1,3,3-trimethylcyclohexane], available from Sigma-Aldrich.

TMXDI—m-tetramethyl xylylene diisocyanate, available from available from Sigma-Aldrich.

N-100—a triisocyanate that is the biuret of HDI, available as Desmodur™ N-100 from Bayer Corp.

N-3300—a triisocyanate that is the isocyanurate of HDI, available as Desmodur™ N-3300 from Bayer Corp.

N-3400—a diisocyanate that is the uretdione of HDI, available as Desmodur™ N-3400 from Bayer Corp.

AA—acrylic acid, $CH_2=CHCOOH$, available from Sigma-Aldrich.

HEA—2-hydroxyethylacrylate, $HOCH_2CH_2OC(O)CH=CH_2$, available from Sigma-Aldrich.

HEMA—2-hydroxyethylmethacrylate, $HOCH_2CH_2OC(O)C(CH_3)=CH_2$, available from Sigma-Aldrich.

MeFBSEMA—$C_4F_9SO_2N(CH_3)C_2H_4OC(O)C(CH_3)=CH_2$, can be prepared using the general procedure described in U.S. Pat. No. 2,803,615.

VAZO™ 64—2,2'-azobis(isobutyronitrile) initiator, available from E. I. duPont de Nemours, Wilmington, Del.

pTSA—p-toluenesulfonic acid monohydrate, available from Sigma-Aldrich.

$CF_3SO_3H$—trifluoromethanesulfonic acid, available from Sigma-Aldrich.

LUDOX™ AS-40—a 40% solids colloidal dispersion of silica in water, available from W. R. Grace & Co., Columbia, Md. or from Sigma-Aldrich.

EtOAc—ethyl acetate, available from Sigma-Aldrich.

MEK—methyl ethyl ketone (2-butanone), available from Sigma-Aldrich.

NMP—N-methylpyrrolidone, available from Sigma-Aldrich.

MG—monoglyme (ethylene glycol dimethyl ether), available from Sigma-Aldrich.

THF—tetrahydrofuran, available from Sigma-Aldrich.

HFE-7100—NOVEC™ HFE-7100 Engineering Fluid, primarily $C_4F_9OCH_3$, available from 3M Company, St. Paul, Minn.

DS-10—SIPONATE™ DS-10 surfactant (sodium dodecylbenzenesulfonate), available from Rhone-Poulenc, Princeton, N.J.

MO-678—nylon 6 carpet, off-white color, having a face weight of 38–40 oz/yd$^2$ (1.3–1.4 kg/m$^2$), available from Shaw Industries, Dalton, Ga.

QUEEN—QUEEN™ commercial nylon 6,6 carpet, having a face weight of 40 oz/yd$^2$ (1.4 kg/m$^2$), available from Queen Co., Dalton, Ga.

UPBEAT—UPBEAT™ nylon 6 carpet, light cream color, color no. 45101, style 51445, having a face weight of 26 oz/yd (0.93 kg/M$^2$), available from Shaw Industries.

Test Methods

Water Repellency (WR) Test

The water repellency of a treated substrate is measured using the following test. In this test, samples are challenged to penetrations by blends of deionized water and isopropyl alcohol (IPA). Each blend is assigned a rating number as shown below:

| Water Repellency Rating Number | Blend (% by volume) |
|---|---|
| 0 | 100% water |
| 1 | 90/10 water/IPA |
| 2 | 80/20 water/IPA |
| 3 | 70/30 water/IPA |
| 4 | 60/40 water/IPA |
| 5 | 50/50 water/IPA |
| 6 | 40/60 water/IPA |
| 7 | 30/70 water/IPA |
| 8 | 20/80 water/IPA |
| 9 | 10/90 water/IPA |
| 10 | 100% IPA |

In running the Water Repellency Test, a nonwoven web sample is placed on a flat, horizontal surface. Five small drops of water or a water/IPA mixture are gently placed at angle, four or five drops are visible as a sphere or a hemisphere, the nonwoven web sample is deemed to pass the test. The reported water repellency rating corresponds to the highest numbered water or water/IPA mixture for which the nonwoven sample passes the described test.

It is desirable to have a water repellency rating of at least 3.

Oil Repellency (OR) Test

The oil repellency of a treated substrate is measured using the following test. In this test, samples are challenged to penetration by oil or oil mixtures of varying surface tensions. Oils and oil mixtures are given a rating corresponding to the following:

| Oil Repellency Rating Number | Oil Composition |
|---|---|
| 0 | (fails Kaydol ™ mineral oil) |
| 1 | Kaydol ™ mineral oil |
| 2 | 65/35 (vol) mineral oil/n-hexadecane |
| 3 | n-hexadecane |
| 4 | n-tetradecane |
| 5 | n-dodecane |
| 6 | n-decane |
| 7 | n-octane |
| 8 | n-heptane |

The Oil Repellency Test is run in the same manner as is the Water Repellency Test, with the reported oil repellency rating corresponding to the highest oil or oil mixture for which the nonwoven web sample passes the test.

It is desirable to have an oil repellency rating of at least 1, preferably a rating of at least 3.

Stain Test

Zanger Blue limestone tiles (available from Color Tile, Maplewood, Minn.) (30.5 cm by 30.5 cm by 1.0 cm thick) were divided into 6 sections (10.2 cm by 15.2 cm) and washed with water thoroughly and allowed to dry at room temperature overnight. A 3% aqueous solution of the chemical composition to be evaluated was coated onto the surface by wiping twice with a paper towel saturated with the chemical composition. Each of the resulting treated tile sections was then allowed to dry at ambient laboratory temperature for at least 12 hours before testing. Slate and marble tile, concrete brick, and clear pine were similarly treated and tested.

A spot test was used to visually rate the ability of the treated tile sections to prevent a test fluid drop from staining the tile after a given exposure period. The following test fluids were used:

(1) Grape juice (GJ)

(2) Pennzoil™ ATF Automatic transmission fluid (TF)

(3) Used 10W30 motor oil (MO)

(4) Paul Masson™ Burgundy wine (WIN)

(5) Water saturated with Taster's Choice coffee (COF)

(6) STP™ heavy duty brake fluid (BF)

(7) MazolaTm corn oil (CO)

A drop of each of the test fluids was place on each of the treated tile sections. After 20–24 hours, the drops were removed by wiping with a clean, dry, paper towel, and the tile was washed and scrubbed with Dawn™ liquid dishwashing soap mixed at 6 weight percent with tap water and rinsed with tap water. The visual appearance of the spot where each drop of test fluid had been place was rated on a scale of 0–5 as shown below. A rating of 0 represented the best stain-release performance of a chemical composition treatment of the tile surface.

0=no visible stain

1=trace of stain visible

2=outline of drop barely visible

3=outline of drop visible

4=dark outline of drop

5=dark stain which has spread

A total rating summing the seven stain tests was also calculated to provide an overall stain resistance rating for the treated substrate. A smaller total rating indicates a more effective treatment.

Spray Rating (SR)

The spray rating of a treated substrate is a value indicative of the dynamic repellency of the treated substrate to water that impinges on the treated substrate. The repellency is measured by Standard Test Number 22, published in the 1985 Technical Manual and Yearbook of the American Association of Textile Chemists and Colorists (AATCC), and is expressed in terms of "spray rating" of the tested substrate. The spray rating is obtained by spraying 250 mL water on the substrate from a distance of 15 cm. The wetting pattern is visually rated, using a 0 to 100 scale, where 0 means complete wetting and 100 means no wetting at all.

Bundesmann Test

The impregnating effect of rain on treated substrates was determined using the Bundesmann Test Method (DIM 53888). In this test, the treated substrates were subjected to a simulated rainfall while the back of the substrate was being rubbed. The appearance of the upper exposed surface was checked visually after 1, 5 and 10 minutes and was given a rating between 1 (complete surface wetting) and 5 (no water remained on the surface).

Advancing and Receding Contact Angle Test

The Advancing and Receding Contact Angle Test provides a quick and precise prediction of the surface properties of a coating material. Advancing and Receding contact angle values measured with water and n-hexadecane using this test have correlated well with fluid repellency values measured on fabrics and carpets.

To run this test, a solution, emulsion, or suspension (typically at about 3% solids) is applied to nylon film by dip-coating. The nylon film is prepared as follows. Nylon film is cut into 85 mm×13 mm rectangular strips. Each strip is cleaned by dipping into methyl alcohol, wiping with a KIMWIPE™ wiper (commercially available from Kimberly-Clark Corp., Neenah, Wis.), taking care not to touch the strip's surface, and allowing the strip to dry for 15 minutes. Then, using a small binder clip to hold one end of the strip, the strip is immersed in the treating solution, and the strip is then withdrawn slowly and smoothly from the solution. The coated film strip is tilted to allow any solution run-off to accumulate at the corner of the strip, and a KIMWIPE™ wiper is touched to the corner to pull away the solution buildup. The coated film strip is allowed to air dry in a protected location for a minimum of 30 minutes and then is cured for 10 minutes at 121° C.

After the treatment is dry and cured, the advancing and receding contact angles are measured using a CAHN Dynamic Contact Angle Analyzer, Model DCA 322 (a Wilhelmy balance apparatus equipped with a computer for control and data processing, commercially available from ATI, Madison, Wis.). The CAHN Dynamic Contact Angle Analyzer is calibrated using a 500 mg weight. An alligator clip is fastened to a piece of coated film strip about 30 mm long, and the clip and film piece are hung from the stirrup of the balance. A 30 mL glass beaker containing approximately 25 mL of water or n-hexadecane is placed under the balance stirrup, and the beaker is positioned so that the coated film strip is centered over the beaker and its contents but not touching the walls of the beaker. Using the lever on the left side of the apparatus, the platform supporting the beaker is carefully raised until the surface of water or n-hexadecane is 2–3 mm from the lower edge of the film strip. The door to the apparatus is closed, the "Configure" option is chosen from the "Initialize" menu of the computer, the "Automatic" option is chosen from the "Experiment" menu, and the computer program then calculates the time for a scan. The apparatus then raises and lowers the liquid so that the scan is taken (the advancing angle is measured as the liquid moves up and over the surface, while the receding angle is determined as the liquid moves down and away from the surface of the plastic film). The "Least Squares" option is then selected from the "Analysis" menu, and the average receding contact angle is calculated from the scan of the film sample. Three separate films are prepared for each material to be tested as previously described. The 95% confidence interval for the average of the 3 scans is typically about 1.2°. This procedure is repeated for water and n-hexadecane.

"Walk-On" Soiling Test

The relative soiling potential of each treatment was determined by challenging both treated and untreated (control) carpet samples under defined "walk-on" soiling test conditions and comparing their relative soiling levels. The test is conducted by mounting treated and untreated carpet squares on particle board, placing the samples on the floor of one of two chosen commercial locations, and allowing the samples to be soiled by normal foot traffic. The amount of foot traffic in each of these areas is monitored, and the position of each sample within a given location is changed daily using a pattern designed to minimize the effects of position and orientation upon soiling.

Following a specific soil challenge period, measured in number of cycles where one cycles equals approximately 10,000 foot-traffics, the treated samples are removed and the amount of soil present on a given sample is determined using colorometric measurements, making the assumption that the amount of soil on a given sample is directly proportional to the difference in color between the unsoiled sample and the corresponding sample after soiling. The three CIE L*a*b* color coordinates of the unsoiled and subsequently soiled samples are measured using a 310 CHROMA METER™ color analyzer with a D65 illumination source. The color difference value, $\Delta E$, is calculated using the equation shown below:

$$\Delta E = [(\Delta L^*)^2 + (\Delta a^*)^2 + (\Delta b^*)^2]1/2$$

where $\Delta L^* = L^* \text{soiled} - L^* \text{unsoiled}$ $\Delta a^* = a^* \text{soiled} - a^* \text{unsoiled}$ $\Delta b^* = b^* \text{soiled} - b^* \text{unsoiled}$ $\Delta E$ values calculated from these colorometric measurements have been shown to be qualitatively in agreement with values from older, visual evaluations such as the soiling evaluation suggested by the AATCC, and have the additional advantages of higher precision, being unaffected by evaluation environment or subjective operator differences. The reported $\Delta E$ value for each carpet sample is calculated as an average of between five and seven replicates, showing the difference between soiled and unsoiled treated carpet.

Kit Test

The Kit Test was used to evaluate the repellency of paper to grease, oil and waxes. Mixtures (each 200 mL) for this test are prepared as follows:

| Kit Number | Volume of Castor Oil (mL) | Volume of Toluene (mL) | Volume of Heptane (mL) |
|---|---|---|---|
| 1 | 200 | 0 | 0 |
| 2 | 180 | 10 | 10 |

-continued

| Kit Number | Volume of Castor Oil (mL) | Volume of Toluene (mL) | Volume of Heptane (mL) |
|---|---|---|---|
| 3 | 160 | 20 | 20 |
| 4 | 140 | 30 | 30 |
| 5 | 120 | 40 | 40 |
| 6 | 100 | 50 | 50 |
| 7 | 80 | 60 | 60 |
| 8 | 60 | 70 | 70 |
| 9 | 40 | 80 | 80 |
| 10 | 20 | 90 | 90 |
| 11 | 0 | 100 | 100 |
| 12 | 0 | 90 | 110 |

A paper test specimen is placed on a clean, flat surface and a drop of test solution is released from a height of 25 mm (1 in) after 15 seconds, excess fluid is removed with a clean tissue or cotton swatch and the wetted area is examined. A pronounced darkening of the test specimen denotes a failure. The Kit Rating is the highest numbered solution that stands on the test surface for 15 seconds without causing failure. A "+" after the number rating indicates a value slightly higher than the number rating but not sufficiently high to be given the next highest number rating.

Ralston Crease Test

The Ralston Crease Test is used to determine the amount of oil penetration through a sample of paper. The sample is conditioned for at least 24 hours at 22.8±0.8° C. and 50±2% relative humidity. A 10 cm×10 cm conditioned sample is placed on a smooth glass plate and folded through the center parallel to an edge to provide a preliminary light crease. A creasing roller weighing 2040±45 g and being 9.5 cm in diameter and 4.5 cm wide with a rubber cover approximately 0.6 cm thick and having a Shore A Durometer hardness of 75±5 is rolled once over the crease without additional pressure. The paper is unfolded and the crease line is again rolled. The paper is folded at 90° to the first fold with the side on the outside for the first fold now on the inside, rolled, unfolded and again rolled.

The sample is placed on a grid sheet having squares 1 cm×1 cm, which is on an unprinted sheet, which is on a backup plate. A metal ring, 7.5 cm diameter, 1.25 cm high, wall thickness of 15.9 mm, is placed on the sample. A 2.5 cm high tube having a 2.5 cm inside diameter is placed in the center of the ring and 5 g of sand are poured into the tube and the tube is then removed. 100 g of synthetic oil is dyed by mixing with 0.1 g red dye. 1.3 cc of the red dyed synthetic oil is delivered to the sand pile. The samples with oiled sand are place in an oven at 60±1.1° C. for 24±0.25 hours, removed from the oven and examined for stains. Each square on the grid represents 1%. The Crease Rating is the number of squares that are stained. All equipment and materials for this Crease Test are available from Ralston Purina Company.

Examples 1–9 and Comparative Examples C1–C3

This series of experiments was run to show the overall improvement in advancing contact angles (ACA) and receding contact angles (RCA) against water and n-hexadecane demonstrated by hexamethylene diisocyanate (HDI)-derived polyurethanes when both pendant and terminal $R_f$— groups were present, as compared when only pendant $R_f$— groups or only terminal $R_f$— groups were present.

In Comparative Example C1, contact angles were measured for 1/1 FHSEE/HDI, which contained pendant $C_6F_{13}$— groups only.

In Comparative Example C2, contact angles were measured for 1/1 FHSEE/HDI, which contained pendant $C_4F_9$— groups only.

In Comparative Example C3, contact angles were measured for 2/1 MeFBSE/HDI, which contained terminal $C_4F_9$— groups only.

In Examples 1–7, contact angles were measured for linear polyurethanes made by reacting FBSEE diol, MeFBSE alcohol and HDI at various molar ratios to give polyurethanes containing two terminal $C_4F_9$— groups and from two to four pendant $C_4F_9$-groups. The polyurethanes designated by (I) were made in a one-step process, while the polyurethanes designated by (II) were made by first reacting the HDI with the FBSEE diol, followed by reaction in a second step with MeFBSE alcohol.

In Examples 8 and 9, contact angles were measured for polyurethanes made by reacting FOSEE diol, MeFOSE alcohol and HDI at molar ratios to give polyurethanes containing two terminal $C_8F_{17}$— groups and two or three pendant $C_8F_{17}$— groups, respectively.

Results from the contact angle measurements are shown in TABLE 1.

TABLE 1

| | | Water: | | n-hexadecane: | |
|---|---|---|---|---|---|
| Ex. | Polyurethane Composition | ACA, ° | RCA, ° | ACA, ° | RCA, ° |
| C1 | 1/1 FHSEE/HDI | 122 | 77 | 77 | 58 |
| C2 | 1/1 FBSEE/HDI | 120 | 50 | 70 | 53 |
| C3 | 2/1 MeFBSE/HDI | 91 | 49 | 77 | 16 |
| 1 | 2/1/2 MeFBSE/FBSEE/HDI (I) | 137 | 90 | 82 | 63 |
| 2 | 2/1/2 MeFBSE/FBSEE/HDI (II) | 122 | 97 | 79 | 73 |
| 3 | 2/2/3 MeFBSE/FBSEE/HDI (I) | 121 | 98 | 80 | 72 |
| 4 | 2/2/3 MeFBSE/FBSEE/HDI (II) | 116 | 88 | 79 | 74 |
| 5 | 2/3/4 MeFBSE/FBSEE/HDI | 122 | 96 | 78 | 72 |
| 6 | 2/4/5 MeFBSE/FBSEE/HDI (I) | 122 | 97 | 78 | 71 |
| 7 | 2/4/5 MeFBSE/FBSEE/HDI (II) | 118 | 51 | 74 | 57 |
| 8 | 2/1/2 MeFOSE/FOSEE/HDI | 121 | 59 | 65 | 53 |
| 9 | 2/2/3 MeFOSE/FOSEE/HDI | 122 | 73 | 74 | 62 |

The data in TABLE 1 show that HDI-based polyurethanes containing both pendant and terminal $C_4F_9$— groups (Examples 1–7) demonstrated overall higher contact angles compared to the polyurethanes containing only pendant or only terminal $C_4F_9$— groups (Comparative Examples C2 and C3, respectively). The difference was especially notable with the receding contact angle values, which are a predictor of soil and stain release. Also, the polyurethanes containing both pendant and terminal $C_4F_9$— groups outperformed the polyurethanes containing longer chain —$C_6F_{13}$ groups but only in the terminal position (see Comparative Example C1).

Results from Examples 8 and 9 show that useful polyurethanes can also be made containing both pendant and terminal $C_8F_{17}$— groups, though the performance using longer chain $C_8F_{17}$— groups is essentially equivalent to the performance using shorter chain pendant and terminal $C_4F_9$— groups.

Table 1—Polyurethane Preparations

1/1 FHSEE/HDI—Into a 3-necked flask equipped with heating mantle, thermometer, condenser and nitrogen purge were added 14.5 g (29.8 mmol) of FHSEE, 5 g (29.8 mmol) of HDI and 30 g of EtOAc containing 2 drops of dibutyltin dilaurate. The mixture was heated to 70° C. and stirrer for 4 hours, after which the reaction showed the hydroxyl and isocyanate groups were consumed as monitored by FTIR analysis.

1/1 FBSEE/HDI—In a 100 mL flask equipped with stirrer, heating mantle, thermometer, condenser and nitrogen purge were added 5.0 g (13.4 mmol) of FBSEE, 2.25 g (13.4 mmol) of HDI and 30 g of EtOAc. After all the solids were dissolved, 2 drops of dibutyltin dilaurate catalyst were added. An exothermic reaction started. Then the mixture was reacted at 60° C. and stirred for 4 hours under $N_2$. FTIR analysis showed no more —NCO and —OH signals. The peaks at 3341 $cm^{-1}$ and 1726 $cm^{-1}$ corresponded to N-H (strong) and C=O bonds (very strong), indicating complete conversion to polyurethane.

2/1 MeFBSE/HDI—Into a 50 mL flask equipped with stirrer, heating mantle, thermometer, condenser and nitrogen purge were added 7.14 g (20 mmol) of MeFBSE, 1.68 g (10 mmol) of HDI and of 15 g of EtOAc. After all the solids were dissolved, 2 drops of dibutyltin dilaurate catalyst were added. An exothermic reaction started. The mixture was heated at 60° C. with stirring, and the reaction as monitored by FTIR analysis showed the hydroxyl and isocyanate groups were consumed after 4 hours.

2/1/2 MeFBSE/FBSEE/HDI (I) (One-step Procedure)—Into a 50 mL flask equipped with stirrer, heating mantle, thermometer, condenser and nitrogen purge were added 1.84 g (4.9 mmol) of FBSEE, 3.52 g (9.9 mmol) of MeFBSE, 1.66 g (9.9 mmol) of HDI and 10 g of EtOAc. After all the solids were dissolved, 2 drops of dibutyltin dilaurate catalyst were added. An exothermic reaction started. The mixture was heated at 65° C. with stirring, and the reaction as monitored by FTIR analysis showed the hydroxyl and isocyanate groups were consumed after 4 hours.

2/1/2 MeFBSE/FBSEE/2HDI (II) (Two-step Procedure)—Into a 50 mL flask equipped with stirrer, heating mantle, thermometer, condenser and nitrogen purge were added 1.84 g (4.88 mmol) of FBSEE, 1.669 g (9.93 mmol) of HDI and 20 g of EtOAc. Two drops of dibutyltin dilaurate catalyst was added, and the mixture was heated to 65° C. and stirred for 2 hours. Then, 3.526 g (9.9 mmol) of MeFBSE was added. The resulting mixture was stirred for an additional two hours, after which complete conversion to polyurethane was detected as monitored by FTIR analysis.

2/2/3 MeFBSE/FBSEE/HDI) (I) (One-step Procedure)—Into a 100 mL flask equipped with stirrer, heating mantle, thermometer, condenser and nitrogen purge were added 1.646 g (9.8 mmol) of HDI, 2.436 g (6.5 mmol) of FBSEE, 2.332 g (6.5 mmol) of MeFBSE and 15 g of EtOAc. After all the solids were dissolved, 2 drops of dibutyltin dilaurate catalyst were added. The resulting mixture was reacted at 60° C. for 4 hours with stirring. The solution turned slight cloudy and more precipitation occurred after cooling to room temperature. From FTIR analysis, no more —NCO signal was observed. By GPA analysis, number average molecular weight ($M_n$) was 1340 and weight average molecular weight ($M_w$) was 1630.

2/2/3 MeFBSE/2FBSEE/3HDI (II) (Two-step Procedure)—Into a 50 mL flask equipped with stirrer, heating mantle, thermometer, condenser and nitrogen purge were added 15.08 g (40 mmol) of FBSEE, 10.08 g (60 mmol) of HDI and 60 g of EtOAc. After addition of 0.062 g dibutyltin dilaurate catalyst at room temperature, the mixture was reacted at 65° C. for two hours with stirring. Then, 14.16 g (40 mmol) of MeFBSE was added. The resulting mixture was reacted for another two hours at 65° C. with stirring, after which the reaction was found to have run to completion as monitored by FTIR analysis.

2/3/4 MeFBSE/FBSEE/HDI—Into a 100 mL flask equipped with stirrer, heating mantle, thermometer, condenser and nitrogen purge were added 1.677 g (10 mmol) of HDI, 2.792 g (7.5 mmol) of FBSEE, 1.782 g (5 mmol) of MeFBSE and 15 g of EtOAc. After all the solids were dissolved, 2 drops of dibutyltin dilaurate catalyst were added. Then the mixture was reacted at 60° C. for 4 hours with stirring, after which the solution turned slightly cloudy and more precipitation occurred at room temperature. The reaction was found to have run to completion as monitored by FTIR analysis.

2/4/5 MeFBSE/FBSEE/HDI (I) (One-step Procedure)—Into a 100 mL flask equipped with stirrer, heating mantle, thermometer, condenser and nitrogen purge were added 1.05 g (6.25 mmol) of HDI, 1.865 g (5 mmol) FBSEE, 0.8925 g (2.5 mmol) of MeFBSE, 15 g of EtOAc and 2 drops of dibutyltin dilaurate. The resulting mixture was heated at 60° C. for two hours with stirring, after which the reaction was found to have run to completion as monitored by FTIR analysis. By GPA analysis, $M_n$=1810 and $M_w$=2780.

2/4/5 MeFBSE/FBSEE/HDI (II) (Two-step Procedure)—Into a 50 mL flask equipped with stirrer, heating mantle, thermometer, condenser and nitrogen purge were added 1.865 g (5 mmol) of FBSEE, 1.05 g (6.25 mmol) of HDI and 20 g of EtOAc containing two drops of dibutyltin dilaurate. The mixture was heated at 65° C. for two hours with stirring, whereupon a clear solution was obtained. Then 0.893 g (2.5 mmol) of MeFBSE was added and the resulting mixture was reacted for additional two hours at 65° C. with stirring, after which the reaction was found to have run to completion as monitored by FTIR analysis.

2/1/2 MeFOSE/FOSEE/HDI—Into a 100 mL flask equipped with stirrer, heating mantle, thermometer, condenser and nitrogen purge were added 5.57 g of MeFOSE, 2.95 g of FOSEE, 1.68 g of HDI and 40 g of ethyl acetate containing 2 drops of dibutyltin dilaurate. The reaction mixture was heated at 60° C. for four hours with stirring. Upon cooling, a precipitate of the desired product formed. The precipitate was removed by filtration, washed and dried.

2/2/3 MeFOSE/FOSEE/HDI—Into a 100 mL flask equipped with stirrer, heating mantle, thermometer, condenser and nitrogen purge were added 2.80 g of MeFOSE, 2.95 g of FOSEE, 1.26 g of HDI and 40 g of ethyl acetate containing 2 drops of dibutyltin dilaurate. The reaction mixture was heated at 60° C. for four hours with stirring. Upon cooling, a precipitate of the desired product formed. The precipitate was removed by filtration, washed and dried.

Example 10–12 and Comparative Examples C4–C5

This series of experiments was run to show the overall improvement in advancing contact angles (ACA) and receding contact angles (RCA) against water and n-hexadecane demonstrated by a dodecane 1,12-diisocyanate (DDI)- derived linear polyurethane containing both pendant and terminal $C_4F_9$— groups were present, as compared when only pendant $C_4F_9$— groups or only terminal $C_4F_9$— groups were present. Also, the performance of linear polyurethanes of this invention made from 1,4-diisocyanate (BDI) and octane 1,8-diisocyanate (ODI) was determined.

In Comparative Example C4, contact angles were measured for 1/1 FBSEE/DDI, which contained pendant $C_4F_9$— groups only.

In Comparative Example C5, contact angles were measured for 2/1 MeFBSE/DDI, which contained terminal $C_4F_9$— groups only.

In Example 10, contact angles were measured for the reaction product of FBSEE diol, MeFBSE alcohol and DDI at a molar ratio of 2/2/3 to give a polyurethane containing two terminal $C_4F_9$— groups two pendant $C_4F_9$— groups.

In Example 11, contact angles were measured for the reaction product of FBSEE diol, MeEBSE alcohol and BDI at a molar ratio of 2/2/3 to give a polyurethane containing two terminal $C_4F_9$— groups two pendant $C_4F_9$— groups.

In Example 12, contact angles were measured for the reaction product of FBSEE diol, MeFBSE alcohol and ODI at a molar ratio of 2/2/3 to give a polyurethane containing two terminal $C_4F_9$— groups two pendant $C_4F_9$— groups.

Results from the contact angle measurements are shown in TABLE 2.

TABLE 2

| Ex. | Polyurethane Composition | Water: ACA, ° | Water: RCA, ° | n-hexadecane: ACA, ° | n-hexadecane: RCA, ° |
|---|---|---|---|---|---|
| C4 | 1/1 FBSEE/DDI | 108 | 75 | 73 | 62 |
| C5 | 2/1 MeFBSE/DDI | 147 | 105 | 97 | 15 |
| 10 | 2/2/3 MeFBSE/FBSEE/DDI | 123 | 110 | 78 | 74 |
| 11 | 2/2/3 MeFBSE/FBSEE/BDI | 108 | 82 | 79 | 71 |
| 12 | 2/2/3 MeFBSE/FBSEE/ODI | 119 | 99 | 79 | 71 |

The data in TABLE 2 show that the DDI-based polyurethanes containing both terminal and pendant $C_4F_9$— groups exhibited improved receding contact angles compared to when only terminal $C_4F_9$— groups or only pendant $C_4F_9$— groups were present. The BDI- and ODI-derived polyurethanes demonstrated slightly lower contact angles when compared to the DDI-derived polyurethane.

Table 2—Polyurethane Preparations

1/1 FBSEE/DDI—Into a 50 mL flask equipped with stirrer, heating mantle, thermometer, condenser and nitrogen purge were added 0.252 g (1 mmol) of dodecane diisocyanate (DDI), 0.373 g (1 mmol) of FBSEE, 10 g of EtOAc and 2 drops of dibutyltin dilaurate. The mixture was heated to 60° C. and stirred for 4 hours, after which the reaction was found to have gone to completion according to FTIR analysis.

2MeFBSE/DDI—Into a 50 mL flask equipped with stirrer, heating mantle, thermometer, condenser and nitrogen purge were added 1.26 g (5 mmol) of dodecane diisocyanate (DDI), 3.57 g (10 mmol) of MeFBSE and 20 g EtOAc containing 2 drops of dibutyltin dilaurate. The mixture was heated to 65° C. and stirred for 2 hours, after which the reaction was found to have run to completion as monitored by FTIR analysis.

2/2/3 MeFBSE/FBSEE/DDI—Into a 50 mL flask equipped with stirrer, heating mantle, thermometer, condenser and nitrogen purge were added 1.512 g (6 mmol) of (DDI), 1.431 g (4 mmol) of MeFBSE, 1.493 g (4 mmol) of FBSEE, 25 g of EtOAc and 2 drops of dibutyltin dilaurate. The mixture was stirred at 65° C. for 4 hours, after which the reaction was found to have run to completion as monitored by FTIR analysis. By GPA analysis, $M_n$=2050 and $M_w$=2950.

2/2/3 FBSEE/MeFBSE/BDI—Into a 50 mL flask equipped with stirrer, heating mantle, thermometer, condenser and nitrogen purge were added 0.846 g (6 mmol) of BDI, 1.495 g (4 mmol) of FBSEE, 1.428 g (4 mmol) of MeFBSE, 15 g of EtOAc and 2 drops of dibutyltin dilaurate. The mixture was heated to 70° C. and stirred for 4 hours, after which the reaction was found to have run to completion as monitored by FTIR analysis.

2/2/3 FBSEE/MeFBSE/ODI—Into a 50 mL flask equipped with stirrer, heating mantle, thermometer, condenser and nitrogen purge were added 1.179 g (6 mmol) of octane diisocyanate (ODI), 1.493 g (4 mmol) of FBSEE, 1.431 g (4 mmol) of MeFBSE, 15 g of EtOAc and 2 drops of dibutyltin dilaurate. The mixture was heated to 70° C. and stirred for 4 hours, after which the reaction was found to have run to completion as monitored by FTIR analysis. By GPA analysis, $M_n$=1760 and $M_w$=2370.

Example 13–16

This series of experiments was run to show the effect of polymerization solvent in affecting the advancing contact angles (ACA) and receding contact angles (RCA) against water and n-hexadecane demonstrated by a 2/2/3 MeFBSE/FBSEE/HDI linear polyurethane containing two pendant and two terminal $C_4F_9$— groups. All solvents chosen were aprotic solvents not capable of reacting with isocyanate groups.

In Example 13, ethyl acetate (EtOAc) was used as the polymerization solvent.

In Example 14, N-methylpyrrolidone (NMP) was used as the polymerization solvent.

In Example 15, methyl ethyl ketone (MEK) was used as the polymerization solvent.

In Example 16, monoglyme (MG) was used as the polymerization solvent.

Results from the contact angle measurements are shown in TABLE 3.

TABLE 3

| Ex. | Solvent | Water: ACA, ° | Water: RCA, ° | n-hexadecane: ACA, ° | n-hexadecane: RCA, ° |
|---|---|---|---|---|---|
| 13 | Ethyl acetate (EtOAc) | 121 | 95 | 79 | 66 |
| 14 | N-methylpyrrolidone (NMP) | 118 | 74 | 79 | 66 |
| 15 | Methyl ethyl ketone (MEK) | 122 | 97 | 79 | 72 |
| 16 | Monoglyme (MG) | 122 | 84 | 79 | 63 |

The data in TABLE 3 show that the contact angles do not significantly vary when the solvent is varied to make the 2/2/3 MeFBSE/FBSEE/HDI polyurethane, indicating a relatively solvent-insensitive reaction.

Table 3—Polyurethane Preparations

2/2/3 FBSEE/MeFBSE/HDI in EtOAc—Into a 50 mL flask equipped with stirrer, heating mantle, thermometer, condenser and nitrogen purge were added 1.885 g (5 mmol) of FBSEE, 1.785 g (5 mmol) of MeFBSE, 1.26 g (7.5 mmol) of HDI and 15 g of EtOAc. After all the solids were dissolved, 2 drops of dibutyltin dilaurate catalyst was added. An exothermic reaction started. The mixture was reacted at 65° C. with stirring for 4 hours, after which, by FTIR analysis, the reaction was found to be completed. Some solid was precipitated from the solution while standing at room temperature. By GPA analysis, $M_n=1650$ and $M_w=2180$.

2/2/3 FBSEE/MeFBSE/HDI in NMP—Into a 50 mL flask equipped with stirrer, heating mantle, thermometer, condenser and nitrogen purge were added 1.898 g (5 mmol) of FBSEE, 1.7905 g (5 mmol) of MeFBSE, 1.264 g (7.5 mmol) of HDI, 15 g of NMP and 2 drops of dibutyltin dilaurate. The mixture was reacted at 65° C. with stirring for 4 hours, after which, by FTIR analysis, the reaction was found to be completed.

2FBSEE/2MeFBSE/3HDI in MEK—Into a 50 mL flask equipped with stirrer, heating mantle, thermometer, condenser and nitrogen purge were added 1.890 g (5 mmol) of FBSEE, 1.786 g (5 mmol) of MeFBSE, 1.263 g (7.5 mmol) of HDI, 15 g of MEK and 2 drops of dibutyltin dilaurate. The mixture was heated at 65° C. for 4 hours with stirring, after which, by FTIR analysis, the reaction was found to be completed.

2/2/3 FBSEE/MeFBSE/HDI in MG—Into a 50 mL flask equipped with stirrer, heating mantle, thermometer, condenser and nitrogen purge were added 1.889 g (5 mmol) of FBSEE, 1.788 g (5 mmol) of MeFBSE, 1.261 g (7.5 mmol) of HDI, 15 g of MG and 2 drops of dibutyltin dilaurate. The mixture was heated to 65° C. and stirred for 4 hours under $N_2$. A small amount of solid precipitated from the solution upon cooling to room temperature. The reaction was found to be complete by FTIR analysis.

Examples 17–32 and Comparative Examples C6–C10

This series of experiments was run to show the effect on contact angle performance when linear polyurethanes of this invention additionally contained non-fluorine-containing repeatable units along with fluorine-containing terminal groups and fluorine-containing repeatable units. All polyurethanes were derived from HDI.

In Comparative Examples C6–C10, the polyurethane contained fluorine-containing terminal groups and non-fluorine-containing repeatable units but did not contain fluorine-containing repeatable units.

In Examples 17–28, MeFBSE provided the fluorine-containing terminal groups, FBSEE provided the fluorine-containing repeatable units and fluorine-free diols EG, BDO, DEG, 75-H-1400 or 75-H-450 provided the non-fluorine-containing repeatable unit. In Examples 22 and 23, the same theoretical polyurethane was made using a one-step and two-step synthetic procedure, respectively.

In Examples 29–30, MeFBSE provided the fluorine-containing terminal groups and fluorinated polyether diols $HOCH_2(CF_2)_3CH_2OH$ and $(HOCH_2CF_2OCF_2CF_2)_2CF_2$ provided the fluorine-containing, non-pendant repeatable units. These examples contained no fluorine-free repeatable units.

In Examples 31–32, MeFBSE provided the fluorine-containing terminal groups, MeFBSEE provided fluorine-containing pendant repeatable units, and $(CH_3)N(C_2H_4OH)_2$ provided water-soluble groups.

Advancing contact angle (ACA) and receding contact angle (RCA) measurements against water and n-hexadecane are presented in TABLE 4.

TABLE 4

| Ex. | Polyurethane Composition | Water: ACA, ° | Water: RCA, ° | n-hexadecane: ACA, ° | n-hexadecane: RCA, ° |
|---|---|---|---|---|---|
| 17 | 2/1/1/3 MeFBSE/FBSEE/EG/HDI | 121 | 86 | 79 | 73 |
| 18 | 2/2/1/4 MeFBSE/FBSEE/EG/HDI | 117 | 70 | 79 | 69 |
| 19 | 2/2/1/4 MeFBSE/FBSEE/EG/HDI | 120 | 95 | 79 | 73 |
| 20 | 2/1.5/0.5/3 MeFBSE/FBSEE/EG/HDI | 119 | 59 | 79 | 72 |
| C6 | 2/1/2 MeFBSE/EG/HDI | 125 | 81 | 80 | 70 |
| 21 | 2/1/1/3 MeFBSE/FBSEE/BDO/HDI | 119 | 100 | 78 | 75 |
| 22 | 2/1.5/0.5/3 MeFBSE/FBSEE/BDO/HDI | 104 | 67 | 80 | 75 |
| C7 | 2/1/2 MeFBSE/BDO/HDI | 151 | 94 | 90 | 34 |
| C8 | 2/2/3 MeFBSE/BDO/HDI | 138 | 87 | 84 | 54 |
| C9 | 2/1/2 MeFBSE/HDO/HDI | 129 | 98 | 81 | 64 |
| 23 | 2/1.5/0.5/3 MeFBSE/FBSEE/DEG/HDI (I) | 122 | 101 | 78 | 75 |
| 24 | 2/1.5/0.5/3 MeFBSE/FBSEE/DEG/HDI (II) | 119 | 88 | 79 | 76 |
| C10 | 2/1/2 MeFBSE/DEG/HDI | 127 | 39 | 83 | 70 |
| 25 | 2/1.9/0.1/3 MeFBSE/FBSEE/75-H-1400/HDI | 120 | 84 | 79 | 75 |
| 26 | 2/1.96/0.04/3 MeFBSE/FBSEE/75-H-1400/HDI | 121 | 93 | 79 | 72 |
| 27 | 2/1.98/0.02/3 MeFBSE/FBSEE/75-H-1400/HDI | 121 | 93 | 79 | 70 |
| 28 | 2/1.98/0.02/3 MeFBSE/FBSEE/75-H-450/HDI | 109 | 89 | 79 | 71 |
| 29 | 2/1/2 MeFBSE/$HOCH_2(CF_2)_3CH_2OH$/HDI | 129 | 60 | 79 | 66 |
| 30 | 2/1/2 MeFBSE/$(HOCH_2CF_2OCF_2CF_2)_2CF_2$/HDI | 121 | 101 | 79 | 70 |
| 31 | 2/1/1/3 MeFBSE/FBSEE/$(CH_3)N(C_2H_4OH)_2$/HDI | 123 | 60 | 80 | 71 |
| 32 | 2/1.6/0.4/3 MeFBSE/FBSEE/$(CH_3)N(C_2H_4OH)_2$/HDI | 120 | 100 | 79 | 76 |

The data in TABLE 4 show that a portion of the repeatable units of the polyurethane can be non-fluorine-containing and still provide good advancing and receding contact angles.

Table 4—Polyurethane Preparations

2/1/2 MeFBSE/EG/HDI—Into a 50 mL flask equipped with stirrer, heating thermometer, condenser and nitrogen purge were added 3.574 g (5 mmol) of MeFBSE, 0.312 g (5 mmol) of ethylene glycol, 1.688 g (10 mmol) of HDI and 15 g of EtOAc. After all the solids were dissolved, 2 drops of dibutyltin dilaurate was added. The mixture was heated to 60° C. and reacted for 2 hours with stirring. Solid precipitated during the reaction, so an additional 15 g of EtOAc was added, and the reaction was conducted for another 2 hours at 70° C. From FTIR analysis, the reaction was completed. The reaction was found to be complete by FTIR analysis.

2/1/2 MeFBSE/BDO/HDI—Into a 50 mL flask equipped with stirrer, heating mantle, thermometer, condenser and nitrogen purge were added 0.45 g (5 mmol) of BDO, 3.57 g (10 mmol) of MeFBSE, 1.68 g (10 mmol) of HDI, 20 g of EtOAc and 2 drops of dibutyltin dilaurate catalyst. The mixture was heated to 70° C. and stirred for 2 hours. Some solid was precipitated during the reaction. From FTIR analysis, no NCO signal was observed.

2/2/3 MeFBSE/BDO/HDI—Into a 50 mL flask equipped with stirrer, heating mantle, thermometer, condenser and nitrogen purge were added 0.90 g (10 mmol) of BDO, 2.52 g (15 mmol) of HDI, 20 g of EtOAc and 2 drops of dibutyltin dilaurate. The mixture was heated to 65° C. and stirred for 1 hour Solid was precipitated during the course of the reaction. Then, 3.57 g (10 mmol) of MeFBSE was added, and the resulting mixture was reacted at 70° C. with stirring for an additional 2 hours. After the reaction, no NCO signal was observed using FTIR analysis.

2/1/2 MeFBSE/HDO/HDI—Into a 50 mL flask equipped with stirrer, heating mantle, thermometer, condenser and nitrogen purge were added 0.596 g (5 mmol) of HDO, 3.574 g (10 mmol) of MeFBSE, 1.687 g (10 mmol) of HDI, 15 g of EtOAc and 2 drops of dibutyltin dilaurate. The mixture was heated at 60° C. for 2 hours with stirring. Solid precipitated during the reaction. From FTIR analysis, no NCO signal was observed.

2/1/2 MeFBSE/DEG/HDI—Into a 50 mL flask equipped with stirrer, heating mantle, thermometer, condenser and nitrogen purge were added 0.53 g (5 mmol) of DEG, 3.572 g of MeFBSE (10 mmol), 1.69 g (10 mmol) of HDI, 30 g of EtOAc and 2 drops of dibutyltin dilaurate. The mixture was heated to 60° C. with stirring for 4 hours. The solution turned into cloudy during the reaction and precipitated solid upon cooling to room temperature. From FTIR analysis, no NCO signal was observed.

2/1/1/3 MeFBSE/FBSEE/EG/3HDI—Into a 50 mL flask equipped with stirrer, heating mantle, thermometer, condenser and nitrogen purge were added 1.245 g (3.3 mmol) of FBSEE, 2.385 g (6.7 mmol) of MeFBSE, 0.213 g of EG (3.4 mmol), 1.387 g (8.3 mmol) of HDI, 15 g of EtOAc and 2 drops of dibutyltin dilaurate. The mixture was heated to 60° C. and stirred for 2 hours; a cloudy solution was obtained during the reaction, which turned into clear solution when acetone was added. From FTIR analysis, no unreacted NCO remained.

2/2/1/4 MeFBSE/FBSEE/EG/HDI—Into a 50 mL flask equipped with stirrer, heating mantle, thermometer, condenser and nitrogen purge were added 1.865 g (5 mmol) of FBSEE, 1.790 g (5 mmol) of MeFBSE, 0.157 g (2.4 mmol) of EG, 1.690 g (10.4 mmol) of HDI, 15 g of EtOAc and 2 drops of dibutyltin dilaurate. The mixture was heated to 50° C. and stirred for 2 hours; a clear solution was obtained with some solid precipitate forming upon cooling to room temperature. From FTIR analysis, no NCO was unreacted.

2/1.5/0.5/3 MeFBSE/FBSEE/EG/HDI—Into a 50 mL flask equipped with stirrer, heating mantle, thermometer, condenser and nitrogen purge were added 2.240 g (6 mmol) of FBSEE, 2.857 g (8 mmol) of MeFBSE, 0.125 g (2 mmol) of EG, 2.016 g (12 mmol) of HDI, 20 g of EtOAc and 2 drops of dibutyltin dilaurate. The mixture was heated to 50° C. and stirred for 2 hours; a clear solution (26.6% solids) was obtained with some solid precipitating upon cooling to room temperature. From FTIR analysis, no NCO was unreacted.

2/11/13 MeFBSE/FBSEE/BDO/HDI—Into a 50 mL flask equipped with stirrer, heating mantle, thermometer, condenser and nitrogen purge were added 0.458 g (5 mmol) of BDO, 1.888 g (5 mmol) of FBSEE, 2.53 g (15 mmol) of HDI, 20 g of EtOAc and 2 drops of dibutyltin dilaurate. The mixture was heated to 65° C. and stirred for 1 hour Solid was precipitated during the reaction. Then 3.57 g (10 mmol) of MeFBSE was added, and the mixture was reacted at 65° C. for 4 hours with stirring. From FTIR analysis, no NCO signal was observed.

2/1.5/0.5/3 MeFBSE/FBSEE/BDO/HDI (I) (One-step Procedure)—Into a 50 mL flask equipped with stirrer, heating mantle, thermometer, condenser and nitrogen purge were added 0.187 g (2.1 mmol) of BDO, 2.239 g (6 mmol) of FBSEE, 2.861 g (8 mmol) of MeFBSE, 2.016 g (12 mmol) HDI, 20 g of EtOAc and 2 drops of dibutyltin dilaurate. The mixture was heated at 65° C. with stirring for 2 hours. No solid precipitated during the reaction, but slight precipitation occurred upon cooling to room temperature. From FTIR analysis, no NCO signal was observed.

2/1.5/0.5/3 MeFBSE/FBSEE/BDO/HDI (II) (Two-step Procedure)—Into a 50 mL flask equipped with stirrer, heating mantle, thermometer, condenser and nitrogen purge were added 0.904 g (10.03 mmol) of BDO, 11.191 g (29.684 mmol) of FBSEE, 10.085 g (60.03 mmol) of HDI, 60 g EtOAc and 2 drops of dibutyltin dilaurate. The mixture was heated to 60° C. and stirred for 2 hours A clear solution was obtained. Then 14.281 g (40 mmol) of MeFBSE was added, and the resulting mixture was reacted at 65° C. for an additional 2 hours. From FTIR analysis, no NCO signal was observed. A precipitate formed from the clear solution upon cooling to room temperature.

2/1.5/0.5/3 MeFBSE/FBSEE/DEG/HDI (I) (One-step Procedure)—Into a 50 mL flask equipped with stirrer, heating mantle, thermometer, condenser and nitrogen purge were added 0.2122 g (2 mmol) of DEG, 2.238 g (6 mmol) of FBSEE, 2.856 g (8 mmol) of MeFBSE, 2.016 g (12 mmol) of HDI, 30 g of EtOAc and 2 drops of dibutyltin dilaurate. The mixture was heated to 55° C. for 4 hours with stirring A clear solution was obtained, which remained upon cooling to room temperature. From FTIR analysis, no NCO signal was observed.

2/1.5/0.5/3 MeFBSE/FBSEE/DEG/HDI (II) (Two-step Procedure)—Into a 50 mL flask equipped with stirrer, heating mantle, thermometer, condenser and nitrogen purge were added 11.31 g (30 mmol) of FBSEE, 1.06 g (10 mmol) of DEG, 10.08 g (60 mmol) of HDI 90 g of EtOAc and 2 drops of dibutyltin dilaurate. The mixture was heated to 65° C. for one hour, then 14.28 g (40 mmol) of MeFBSE was added. A clear solution was obtained during the reaction, which precipitated some solid upon cooling to room temperature. From FTIR analysis, no NCO signal was observed.

2/1.8/0.2/3 MeFBSE/FBSEE/75-H-1400/HDI—Into a 50 mL flask equipped with stirrer, heating mantle, thermometer, condenser and nitrogen purge were added 1.235 g (0.2 mmol) of 75-H-1400, 3.582 g (9.5 mmol) of FBSEE, 3.57 g (10 mmol) of MeFBSE, 2.52 g (15 mmol) of HDI, 30 g of EtOAc and 2 drops of dibutyltin dilaurate. The mixture was heated to 60° C. with stirring for 4 hours A clear solution was obtained during the reaction, and only slight precipitation occurred upon cooling to room temperature. From FTIR analysis, no NCO signal was observed.

2/1.98/0.02/3 MeFBSE/FBSEE/75-H-1400/HDI—Into a 50 mL flask equipped with stirrer, heating mantle, thermometer, condenser and nitrogen purge were added 0.247 g (0.1 mmol) of 75-H-1400, 3.732 g (9.89 mmol) of FBSEE, 3.571 g (10 mmol) of MeFBSE, 2.525 g (15 mmol) of HDI, 15 g of EtOAc and 2 drops of dibutyltin dilaurate. The mixture was heated to 65° C. for 2 hours with stirring. From FTIR analysis, no NCO signal was observed.

2/1.96/0.04/3 MeFBSE/FBSEE/75-H-1400/HDI—Into a 50 mL flask equipped with stirrer, heating mantle, thermometer, condenser and nitrogen purge were added 1.505 g (0.609 mmol) of 75-H-1400), 11.193 g (29.688 mmol) of FBSEE, 2.525 g (15 mmol) of HDI, 50 g of EtOAc and 2 drops of dibutyltin dilaurate. The mixture was heated to 60° C. for 1 hour with stirring. Then 10.713 g (30.01 mmol) of MeFBSE was added, and the resulting mixture was further reacted at 60° C. for 4 hours with stirring. From FTIR analysis, no NCO signal was observed.

2/1.98/0.02/3 MeFBSE/FBSEE/75-H-450/HDI—Into a 100 mL flask equipped with stirrer, heating mantle, thermometer, condenser and nitrogen purge were added 1.47 g (1.5 mmol) of 75-H-450, 10.744 g (28.5 mmol) of FBSEE, 10.71 g (30 mmol) of MeFBSE, 7.56 g (45 mmol) of HDI, 50 g of EtOAc and 2 drops of dibutyltin dilaurate. The mixture was heat to 65° C. for 4 hours with stirring. A clear solution (30% solids) was obtained. From FTIR analysis, no NCO signal was observed.

2/1/2 MeFBSE/HOCH$_2$(CF$_2$)$_3$CH$_2$OH/HDI—Into a 50 mL flask equipped with stirrer, heating mantle, thermometer, condenser and nitrogen purge were added 1.06 g (5 mmol) of HOCH$_2$(CF$_2$)$_3$CH$_2$OH, 3.57 g (10 mmol) of FBSEE, 1.68 g (10 mmol) of HDI, 20 g of EtOAc and 2 drops of dibutyltin dilaurate. The mixture was heated to 60° C. for 4 hours with stirring. From FTIR analysis, no NCO signal was observed.

2/1/2 MeFBSE/(HOCH$_2$CF$_2$OCF$_2$CF$_2$)$_2$CF$_2$/HDI—Into a 50 mL flask equipped with stirrer, heating mantle, thermometer, condenser and nitrogen purge were added 1.235 g (2.5 mmol) of (HOCH$_2$CF$_2$OCF$_2$CF$_2$)$_2$CF$_2$, 1.785 g (5 mmol) of MeFBSE, 0.84 g (5 mmol) of HDI, 15 g of EtOAc and 2 drops of dibutyltin dilaurate. The mixture was heated to 60° C. for 4 hours with stirring. From FTIR analysis, no NCO signal was observed.

2/1.6/0.4/3 MeFBSE/FBSEE/(CH$_3$)N(C$_2$H$_4$OH)$_2$/HDI—Into a 50 mL flask equipped with stirrer, heating mantle, thermometer, condenser and nitrogen purge were added 0.119 g (1 mmol) of (CH$_3$)N(C$_2$H$_4$OH)$_2$, 1.492 g (4 mmol) of FBSEE, 1.785 g (5 mmol) of MeFBSE, 1.26 g (7.6 mmol) of HDI, 20 g of EtOAc and 2 drops of dibutyltin dilaurate. The mixture was heated to 60° C. for 4 hours with stirring. From FTIR analysis, no NCO signal was observed.

2/1/1/3 2MeFBSE/FBSEE/(CH$_3$)N(C$_2$H40H)$_2$/3HDI—Into a 50 mL flask equipped with stirrer, heating mantle, thermometer, condenser and nitrogen purge were added 0.598 g (5 mmol) of (CH$_3$)N(C$_2$H$_4$OH)$_2$, 1.890 g (5 mmol) of FBSEE, 3.573 g (10 mmol) of MeFBSE, 2.522 g (15 mmol) of HDI, 26 g of EtOAc and 2 drops of dibutyltin dilaurate. The mixture was heated to 60° C. for 4 hours with stirring. From FTIR analysis, no NCO signal was observed.

Examples 33–39 and Comparative Example C11

This series of experiments was run to show the effect on contact angle performance when the fluorochemical alcohol contributing the fluorine-containing terminal groups was varied. All polyurethanes were linear and were derived from HDI.

For Examples 33–36, polyurethanes were made using $C_4F_9$—terminated fluorochemical alcohols having higher molecular weight than MeFBSE to form all or a portion of the fluorine-containing terminal groups and FBSEE diol to form the fluorine-containing pendant groups.

For Comparative Example C11, the fluorine-containing diol was omitted so that no fluorine-containing pendant groups were incorporated.

For Examples 37–39, polyurethanes were made using $C_4F_9$—terminated fluorochemical alcohols having lower molecular weight than MeFBSE to form all or a portion of the fluorine-containing terminal groups and FBSEE diol to form the fluorine-containing pendant groups.

Advancing contact angle (ACA) and receding contact angle (RCA) measurements against water and n-hexadecane are presented in TABLE 5.

TABLE 5

| Ex. | Polyurethane Composition | Water: | | n-hexadecane: | |
| | | ACA, ° | RCA, ° | ACA, ° | RCA, ° |
| --- | --- | --- | --- | --- | --- |
| 33 | 1.8/0.2/1/2 MeFBSE/MeFBSE(PCL)$_{44}$/FBSEE/HDI | 121 | 101 | 77 | 71 |
| 34 | 2/2/3 MeFBSE(PCL)$_{44}$/FBSEE/HDI | 108 | 59 | 85 | 30 |
| C11 | 2/1 MeFBSE(PCL)$_{4.4}$/HDI | 108 | 62 | 82 | 32 |
| 35 | 2/2/3 FBSEE/MeFBSB/MeFBSE/HDI | 105 | 67 | 79 | 66 |
| 36 | 2/1/1/3 FBSEE/MeFBSB/MeFBSE/HDI | 121 | 79 | 81 | 63 |
| 37 | 2/2/3 CF$_3$CH$_2$OH/FBSEE/HDI | 114 | 47 | 65 | 33 |
| 38 | 2/2/3 C$_3$F$_7$CONHC$_2$H$_4$OH/FBSEE/HDI | 112 | 48 | 65 | 31 |
| 39 | 2/2/3 H-FBSE/FBSEE/HDI | 115 | 54 | 74 | 46 |

MeFBSE = C$_4$F$_9$SO$_2$N(CH$_3$)CH$_2$CH$_2$OH
MeFBSE(PCL)$_{4.4}$ = C$_4$F$_9$SO$_2$N(CH$_3$)C$_2$H$_4$O[(C(O)(CH$_2$)$_5$O]$_{4.4}$H
MeFBSB = C$_4$F$_9$SO$_2$N(CH$_3$)CH$_2$CH$_2$CH$_2$CH$_2$OH
H-FBSE = C$_4$F$_9$SO$_2$NHCH$_2$CH$_2$OH
FBSEE = C$_4$F$_9$SO$_2$N(C$_2$H$_4$OH)$_2$

The data in TABLE 5 show that all of the fluorochemical alcohols reacted to form $C_4F_9$—terminated polyurethanes provided good advancing and receding contact angles.

Table 5—Polyurethane Preparations 1.8/0.2/1/2 MeFBSE/MeFBSE(PCL)$_{4.4}$/FBSEE/HDI—Into a 100 mL flask equipped with stirrer, heating mantle, thermometer, condenser and nitrogen purge were added 3.73 g (9.9 mmol) of FBSEE, 6.426 g (18 mmol) of MeFBSE, 1.696 g (2 mmol) of MeFBSE (PCL)$_{4.4}$, 1.68 g (10 mmol) of HDI, 60 g of EtOAc and 2 drops of dibutyltin dilaurate. The mixture was heated to 60° C. for 4 hours with stirring. From FTIR analysis, no NCO signal was observed.

2/2/3 MeFBSE(PCL)$_{4.4}$FBSEE/HDI—Into a 50 mL flask equipped with stirrer, heating mantle, thermometer, condenser and nitrogen purge were added 1.885 g (5 mmol) of FBSEE, 4.24 g (5 mmol) of MeFBSE(PCL)$_{4.4}$, 1.271 g (7.56 mmol) of HDI, 20 g of EtOAc and 2 drops of dibutyltin dilaurate. The mixture was heated to 60° C. for 4 hours with stirring From FTIR analysis, no NCO signal was observed.

2/1 MeFBSE(PCL)$_{4.4}$/HDI—Into a 50 mL flask equipped with stirrer, heating mantle, thermometer, condenser and nitrogen purge were added 4.24 g (5 mmol) of MeFBSE(PCL)$_{4.4}$, 0.42 g (2.5 mmol) of HDI, 15 g of EtOAc and 2 drops of dibutyltin dilaurate. The mixture was heated to 60° C. for 4 hours with stirring. A clear solution was obtained. From FTIR analysis, no NCO signal was observed.

2/2/3 MeFBSB/FBSEE/HDI—Into a 50 mL flask equipped with stirrer, heating mantle, thermometer, condenser and nitrogen purge were added 0.78 g (2 mmol) of MeFBSB, 0.75 g (2 mmol) of FBSEE, 0.508 g (3 mmol) of HDI, 15 g of EtOAc and 2 drops of dibutyltin dilaurate. The mixture was heated to 60° C. for 4 hours with stirring. A clear solution was obtained. From FTIR analysis, no NCO signal was observed.

2/1/1/3 FBSEE/MeFBSB/MeFBSE/HDI—Into a 50 mL flask equipped with stirrer, heating mantle, thermometer, condenser and nitrogen purge were added 0.385 g (1 mmol) of MeFBSB, 0.746 g (2 mmol) of FBSEE, 0.357 g (1 mmol) of MeFBSE, 0.504 g (3 mmol) of HDI, 15 g of EtOAc and 2 drops of dibutyltin dilaurate. The mixture was heated to 60° C. for 4 hours with stirring. A clear solution was obtained. From FTIR analysis, no NCO signal was observed.

2/2/3 CF$_3$CH$_2$OH/FBSEE/HDI—Into a 50 mL flask equipped with stirrer, heating mantle, thermometer, condenser and nitrogen purge were added 1.885 g (5 mmol) of FBSEE, 1.26 g (7.5 mmol) of HDI, 10 g of EtOAc and 2 drops of dibutyltin dilaurate. The mixture was heated to 65° C. for 2 hours with stirring Then 0.5 g (5 mmol) of CF$_3$CH$_2$OH was added, and the mixture was reacted for another two hours. A clear solution was obtained. From FTIR analysis, no NCO signal was observed.

2/2/3 C$_3$F$_7$CONHC$_2$H$_4$OH/FBSEE/HDI—Into a 50 mL flask equipped with stirrer, heating mantle, thermometer, condenser and nitrogen purge were added 1.885 g (5 mmol) FBSEE, 1.26 g (7.5 mmol) of HDI, 10 g of EtOAc and 2 drops of dibutyltin dilaurate. The mixture was heated to 65° C. for 2 hours with stirring. Then 1.287 g (5 mmol) of C$_3$F$_7$CONHC$_2$H$_4$OH was added, and the resulting mixture was reacted for another two hours. A clear solution was obtained. From FTIR analysis, no NCO signal was observed.

2/2/3 H-FBSE/FBSEE/HDI—Into a 50 mL flask equipped with stirrer, heating mantle, thermometer, condenser and nitrogen purge were added 1.885 g (5 mmol) of FBSEE, 1.26 g (7.5 mmol) of HDI, 10 g of EtOAc and 2 drops of dibutyltin dilaurate. The mixture was heated to 65° C. for 2 hours with stirring. Then 1.718 g (5 mmol) of H-FBSE was added, and the mixture was reacted for another two hours. A clear solution was obtained. From FTIR analysis, no NCO signal was observed.

Examples 40–44 and Comparative Example C12

This series of experiments was run to show the effect on contact angle performance when reactive or polymerizable groups were incorporated into the polyurethane structure.

In Example 40, one of the terminal groups was formed by reacting 2-butanone oxime (2-BTO) with one isocyanate group of hexamethylene diisocyanate (HDI), while a C$_4$F$_9$—-containing terminal group was formed at the other end of the polyurethane by reaction with MeFBSE alcohol. Also, incorporating FBSEE diol into the polyurethane reaction formed C$_4$F9-containing pendant groups. In this way, a polyurethane having a blocked isocyanate group and also having pendant and terminal C$_4$F$_9$—-containing groups was formed.

In Examples 41–44, acrylate polymers were made by homopolymerizing and copolymerizing polyurethane acrylate monomers containing both terminal and pendant C$_4$F$_9$— groups. In Comparative Example C12, a polyurethane acrylate monomer containing terminal C$_4$F$_9$— groups but no pendant C$_4$F$_9$— groups were homopolymerized.

Advancing contact angle (ACA) and receding contact angle (RCA) measurements against water and n-hexadecane are presented in TABLE 6.

TABLE 6

| | | Water: | | n-hexadecane: | |
| Ex. | Polyurethane Composition | ACA, ° | RCA, ° | ACA, ° | RCA, ° |
| --- | --- | --- | --- | --- | --- |
| 40 | 1.5/2/0.5/3 MeFBSE/FBSEE/2-BTO/HDI | 123 | 85 | 80 | 68 |
| 41 | Poly-(1/3/1/4 MeFBSE/FBSEE/HEA/HDI) | 120 | 75 | 78 | 59 |
| 42 | Poly-(1/2/1/3 MeFBSE/FBSEE/HEMA/HDI) | 117 | 51 | 78 | 68 |
| 43 | Co-poly (MeFBSE/HDI/HEMA) and MeFBSEMA | 114 | 84 | 80 | 67 |
| 44 | Poly-(1/2/1/3 MeFOSE/FOSEE/1HEA/HDI) | 122 | 88 | 77 | 72 |
| C12 | Poly-(1/1/1 MeFBSE/HEMA/HDI) | 122 | 99 | 78 | 59 |

The data in TABLE 6 show that the fluorochemical blocked isocyanate and all of the fluorochemical polyurethane acrylate polymers exhibited good advancing and receding contact angles.

Table 6—Polyurethane Preparations 1.5/2/0.5/3 MeFBSE/FBSEE/2-BTO/HDI—Into a 50 mL flask equipped with stirrer, heating mantle, thermometer, condenser and nitrogen purge were added 1.885 g (5 mmol) of FBSEE, 1.339 g (3.75 mmol) of MeFBSE, 0.1088 g of 2-BTO, 1.26 g (7.5 mmol) of HDI, 15 g of EtOAc and 2 drops of dibutyltin dilaurate. The mixture was heated to 65° C. for 2 hours with stirring. A clear solution was obtained. From FTIR analysis, no NCO signal was observed.

Poly-(1/1/1 MeFBSE/HEMA/HDI)—Into a 50 mL flask equipped with stirrer, heating mantle, thermometer, condenser and nitrogen purge were added 3.57 g (10 mmol) of MeFBSE, 1.30 g (10 mmol) of HEMA, 1.68 g (10 mmol) of HDI, 25 g of EtOAc and 2 drops of dibutyltin dilaurate. The mixture was heated to 65° C.

for 4 hours with stirring. Then, 0.015 g of Vazo™ 65 initiator was added, and the mixture was polymerized at 65° C. overnight. A clear solution was obtained. From FTIR, no NCO and C=C signals were observed.

1/3/1/4 MeFBSE/FBSEE/HEA/HDI—Into a 50 mL flask equipped with stirrer, heating mantle, thermometer, condenser and nitrogen purge were added 1.147 g (3.075 mmol) of FBSEE, 0.366 g (1.025 mmol) of MeFBSE, 1.19 g (1.025 mmol) of HEA, 0.689 g (4.103 mmol) of HDI, 15 g of EtOAc and 2 drops of dibutyltin dilaurate. The mixture was heated to 65° C. for 4 hours with stirring. Then 0.0046 g of Vazo™ 65 was added, and the mixture was polymerized at 65° C. overnight. A clear solution was obtained. From FTIR analysis, no NCO and C=C signals were observed.

Poly-(1/2/1/3 MeFBSE/FBSEE/HEMA/HDI)—Into a 50 mL flask equipped with stirrer, heating mantle, thermometer, condenser and nitrogen purge were added 1.19 g (3.3 mmol) of FBSEE, 2.48 g (6.6 mmol) of MeFBSE, 0.433 g (3.3 mmol) of HEMA, 1.68 g (10 mmol) of HDI, 20 g of EtOAc and 2 drops of dibutyltin dilaurate. The mixture was heated to 65° C. for 4 hours with stirring. Then 0.005 g Vazo™ 65 initiator was added, and the mixture was polymerized at 65° C. overnight. A clear solution was obtained. From FTIR analysis, no NCO and C=C signals were observed.

Co-poly MeFBSEMA and (MeFBSE/HDI/HEMA)—Into a 100 mL flask equipped with stirrer, heating mantle, thermometer, condenser and nitrogen purge were added 4.25 g (10 mmol) of MeFBSEMA, 3.57 g (10 mmol) of MeFBSE, 1.30 g (10 mmol) of HEMA, and 1.68 g (10 mmol) of HDI, 45 g of EtOAc and 2 drops of dibutyltin dilaurate. The mixture was heated to 60° C. for 2 hours with stirring. Then 0.005 g of Vazo™ 65 was added, and the resulting mixture was polymerized at 60° C. overnight. A clear solution was obtained during the reaction; however, solids precipitated upon cooling to room temperature. From FTIR analysis, no NCO and C=C signals were observed.

Poly-(1/2/1/3 MeFOSE/FOSEE/1HEA/HDI)—Into a 100 mL flask equipped with stirrer, heating mantle, thermometer, condenser and nitrogen purge were added 2.52 g (15 mmol) of HDI, 5.87 g (10 mmol) of FOSEE, 2.785 g (5 mmol) of MeFOSE and 0.58 g (5 mmol) of HEA, 25 g of EtOAc and 2 drops of dibutyltin dilau-rate. The mixture was heated to 60° C. for 2 hours with stirring. Then 0.005 g of Vazo™ 65 was added, and the resulting mixture was polymerized at 60° C. for 10 hours. A clear solution was obtained during the reaction; however, solids precipitated upon cooling to room temperature. From FTIR analysis, no NCO and C=C signals were observed.

Examples 45–56 and Comparative Examples C13–C15

This series of experiments was run to show the effect on contact angle performance when the polyurethanes of this invention are non-linear.

For Examples 45–47 and Comparative Example C13, the polyurethanes were derived from a biuret triisocyanate, Desmodur™ N-100. The polyurethanes in Examples 45–47 contain both terminal and pendant $C_4F_9$— groups, while the polyurethane in Comparative Example C13 contains only terminal $C_4F_9$— groups. The polyurethanes of Examples 45 and 46 were theoretically the same, except the polyurethanes were made using a one-step and a two-step procedure, respectively. In Example 47, HDI was also incorporated into the polyurethane.

For Examples 48–54, the polyurethanes were derived from a isocyanurate triisocyanate, Desmodur™ N-3300. The polyurethanes of Examples 48–51 and 53 contain both terminal and pendant $C_4F_9$— groups. For Comparative Example C14, the polyurethane contained only pendant $C_4F_9$— groups. For Example 53, TMXDI was also incorporated. The polyurethane of Example 52 contains terminal $C_4F_9$— groups and pendant $C_6F_{13}$— groups. The polyurethane of Example 54 terminal $C_4F_9$— groups and pendant $(CF_3)_2C$— groups. The polyurethane of Comparative Example C15 was analogous to the polyurethane of Example 54 except that the pendant $(CF_3)_2C$— groups were replaced by non-fluorinated $(CH_3)_2C$— pendant groups.

For Examples 55 and 56, the polyurethanes were derived from a uretdione diisocyanate, Desmodur™ N-3400. For Example 56, MDI was also incorporated.

Advancing contact angle (ACA) and receding contact angle (RCA) measurements against water and n-hexadecane are presented in TABLE 7.

TABLE 7

| | | Water: | | n-hexadecane: | |
|---|---|---|---|---|---|
| Ex. | Polyurethane Composition | ACA, ° | RCA, ° | ACA, ° | RCA, ° |
| 45 | 4/1/2 MeFBSE/FBSEE/N-100 (I) | 122 | 43 | 77 | 69 |
| 46 | 4/1/2 MeFBSE/FBSEE/N-100 (II) | 123 | 51 | 78 | 65 |
| 47 | 3/1/1/1 MeFBSE/FBSEE/N-100/HDI | 121 | 39 | 79 | 65 |
| C13 | 3/1 MeFBSE/N-100 | 124 | 54 | 80 | 73 |
| 48 | 3/1.5/2 MeFBSE/FBSEE/N-3300 | 122 | 57 | 76 | 62 |
| 49 | 4/1/2 MeFBSE/FBSEE/N-3300 | 123 | 57 | 80 | 72 |
| 50 | 2.4/0.3/1 MeFBSE/0.3FBSEE/N-3300 | 121 | 56 | 77 | 61 |
| 51 | 1.7/0.65/1 MeFBSE/FBSEE/N-3300 | 123 | 62 | 78 | 67 |
| C14 | 1/1 FBSEE/N-3300 | 116 | 55 | 67 | 31 |
| 52 | 4/1/2 MeFBSE/FHSEE/N-3300 | 114 | 72 | 79 | 62 |
| 53 | 3/1.5/1/1.5 MeFBSE/FBSEE/N-3300/TMXDI | 118 | 48 | 73 | 24 |
| 54 | 4/1/2 MeFBSE/(CF$_3$)$_2$C(C$_6$H$_4$OH)$_2$/N-3300 | 121 | 52 | 78 | 70 |
| C15 | 4/1/2 MeFBSE/(CH$_3$)$_2$C(C$_6$H$_4$OH)$_2$/N-3300 | 122 | 53 | 77 | 59 |
| 55 | 4/1/2 MeFBSE/FBSEE/N-3400 | 121 | 58 | 82 | 70 |
| 56 | 4/1/1/2 MeFBSE/FBSEE/N-3400/MDI | 120 | 55 | 81 | 40 |

The data in TABLE 7 show that non-linear polyurethanes having terminal and pendant $R_f$— groups exhibited good contact angles, but overall the contact angles were somewhat lower than when the polyurethanes were derived from hexamethylene diisocyanate (HDI) and thus were linear (e.g., compare results from TABLE 7 to the results from TABLE 10).

Table 7—Polyurethane Preparations

3/1 MeFBSE/N-100—Into a 100 mL flask equipped with stirrer, heating mantle, thermometer, condenser and nitrogen purge were added 10.71 g of MeFBSE (30 mmol), 5.73 g (30 NCO eq.) of N-100, 30 g of EtOAc and 3 drops of dibutyltin dilaurate catalyst. The mixture was heated to 60° C. for 4 hours with stirring. The reaction was complete as monitored by FTIR analysis.

4/1/2 MeFBSE/FBSEE/N-100 (I) (One-step Procedure)—Into a 50 mL flask equipped with stirrer, heating mantle, thermometer, condenser and nitrogen purge were added 1.91 g (10 NCO eq.) of N-100, 0.62 g (1.6 mmol) of FBSEE, 2.38 g (6.7 mmol) of MeFBSE, 15 g of EtOAc and 2 drops of dibutyltin dilaurate catalyst. The mixture was heated to 60° C. for 4 hours with stirring. The reaction was complete as monitored by FTIR analysis.

4/1/2 MeFBSE/FBSEE/N-100 (II) (Two-step Procedure)—Into a 50 mL flask equipped with stirrer, heating mantle, thermometer, condenser and nitrogen purge were added 1.91 g (10 NCO eq.) of N-100, 0.62 g (1.6 mmol) of FBSEE, 15 g of EtOAc and 2 drops of dibutyltin dilaurate catalyst. The mixture was heated to 50° C. for 0.5 hour with stirring. Then 2.38 g (6.7 mmol) of MeFBSE was added, and the resulting mixture was stirred at 50° C. for 4 hours. The reaction was monitored by FTIR analysis, and no NCO signal was observed.

3/1/1/1 MeFBSE/FBSEE/N-100/HDI—Into a 50 mL flask equipped with stirrer, heating mantle, thermometer, condenser and nitrogen purge were added 1.646 g (9.8 mmol) of HDI, 5.70 g (29.4 eq. NCO) of N-100, 3.654 g (9.8 mmol) of FBSEE, 10.489 g (29.4 mmol) of MeFBSE, 30 g of EtOAc and 2 drops of dibutyltin dilaurate catalyst. The mixture was heated to 65° C. for 4 hour with stirring. No NCO signal was observed at the end of the reaction as monitored by FTIR analysis.

3/1.5/2 MeFBSE/FBSEE/N-3300—Into a 50 mL flask equipped with stirrer, heating mantle, thermometer, condenser and nitrogen purge were added 3.88 g (20 NCO eq.) of N-3300, 1.85 g (5 mmol) of FBSEE, 3.57 g (10 mmol) of MeFBSE, 20 g of EtOAc and 2 drops of dibutyltin dilaurate catalyst. The mixture was heated to 70° C. for 4 hours with stirring. No NCO signal was observed at the end of the reaction as monitored by FTIR analysis.

4/1/2 MeFBSE/FBSEE/N-3300—Into a 50 mL flask equipped with stirrer, heating mantle, thermometer, condenser and nitrogen purge were added 5.82 g (30 eq. NCO) of N-3300, 1.865 g (5 mmol) of FBSEE, 20 g of EtOAc and 2 drops of dibutyltin dilaurate catalyst. The reaction mixture was heated to 65° C. for 0.5 hour with stirring. Then 7.14 g (20 mmol) of MeFBSE and 10 g of EtOAc were added. The mixture was continued reaction at 70° C. for 4 hours. No NCO signal was observed at the end of the reaction as monitored by FTIR analysis.

2.4/0.3/1 MeFBSE/0.3FBSEE/N-3300—Into a 50 mL flask equipped with stirrer, heating mantle, thermometer, condenser and nitrogen purge were added 3.88 g (20 NCO eq.) of N-3300, 0.75 g (2 mmol) of FBSEE, 5.71 g (16 mmol) of MeFBSE, 20 g of EtOAc and 2 drops of dibutyltin dilaurate catalyst. The mixture was heated to 70° C. for 4 hours with stirring. No NCO signal was observed at the end of the reaction as monitored by FTIR analysis.

1.7/0.65/1 MeFBSE/FBSEE/N-3300—Into a 50 mL flask equipped with stirrer, heating mantle, thermometer, condenser and nitrogen purge were added 1.616 g (8.3 eq. NCO) of N-3300, 0.686 g (1.8 mmol) of FBSEE, 1.662 g (4.7 mmol) of MeFBSE, 10 g of EtOAc and 2 drops of dibutyltin dilaurate catalyst. The mixture was heated to 60° C. for 4 hours with stirring. No NCO signal was observed at the end of the reaction as monitored by FTIR analysis.

4/1/2 MeFBSE/FHSEE/N-3300—Into a 50 mL flask equipped with stirrer, heating mantle, thermometer, condenser and nitrogen purge were added 3.88 g (20 NCO eq.) of N-3300, 1.575 g (3.34 mmol) of FHSEE, 4.76 g (13.3 mmol) of MeFBSE, 15 g of EtOAc and 2 drops of dibutyltin dilaurate catalyst. The mixture was heated to 60° C. for 4 hour with stirring. No NCO signal was observed at the end of the reaction as monitored by FTIR analysis.

4/1/2 MeFBSE/FBSEE/N-3400—Into a 50 mL flask equipped with stirrer, heating mantle, thermometer, condenser and nitrogen purge were added 3.86 g (20 NCO eq.) of N-3400, 1.24 g (3.34 mmol) of FBSEE, 4.76 g (13.3 mmol) of MeFBSE, 15 g of EtOAc and 2 drops of dibutyltin dilaurate catalyst. The mixture was heated to 60° C. for 4 hour with stirring. No NCO signal was observed at the end of the reaction as monitored by FTIR analysis.

4/1/1/2 MeFBSE/FBSEE/N-3400/MDI—Into a 50 mL flask equipped with stirrer, heating mantle, thermometer, condenser and nitrogen purge were added 3.0 g (15.5 NCO eq.) of N-3400, 0.56 g (2.25 mmol) of MDI, 1.24 g (3.334 mmol) of FBSEE, 4.76 g (13.3 mmol) of MeFBSE, 15 g of EtOAc and 2 drops of dibutyltin dilaurate catalyst. The mixture was heated to 65° C. for 4 hours with stirring. No NCO signal was observed at the end of the reaction as monitored by FTIR analysis.

3/1.5/1/1.5 MeFBSE/FBSEE/N-3300/TMXDI—Into a 50 mL flask equipped with stirrer, heating mantle, thermometer, condenser and nitrogen purge were added 3.88 g (20 NCO eq.) of N-3300, 2.44 g (10 mmol) of TMXDI, 3.73 g (10 mmol) of FBSEE, 30 g of EtOAc and 2 drops of dibutyltin dilaurate catalyst. The mixture was heated to 70° C. for 0.5 hour with stirring. Then 7.14 g (20 mmol) of MeFBSE was added, and the mixture was reacted for another 4 hours. No NCO signal was observed at the end of the reaction as monitored by FTIR analysis.

1/1 FBSEE/N-3300—Into a 50 mL flask equipped with stirrer, heating mantle, thermometer, condenser and nitrogen purge were added 3.73 g of FBSEE (10.0 mmol), 3.88 g of N-3300, 15 g of EtOAc and 2 drops of dibutyltin dilaurate. The mixture was heated to 65° C. for 4 hours with stirring. No NCO signal was observed at the end of the reaction as monitored by FTIR analysis.

4/1/2 MeFBSE/$(CF_3)_2C(C_6H_4OH)2$/N-3300—Into a 50 mL flask equipped with stirrer, heating mantle, thermometer, condenser and nitrogen purge were added 11.64 g (60 NCO eq.) of N-3300, 3.36 g (10 mmol) of $(CF_3)_2C(C_6H_4OH)_2$/N-3300 14.28 g (40 mmol) of MeFBSE, 30 g of EtOAc and 2 drops of dibutyltin dilaurate catalyst. The mixture was heated to 70° C. for 5 hour with stirring. No NCO signal was observed at the end of the reaction as monitored by FTIR analysis.

4/1/2 MeFBSE/$(CH_3)_2C(C_6H_4OH)$2/N-3300—Into a 50 mL flask equipped with stirrer, heating mantle, thermometer, condenser and nitrogen purge were added 5.82 g (30 NCO eq.) of N-3300, 1.14 g (5 mmol) of $(CH_3)_2C(C_6H_4OH)_2$, 20 g of EtOAc and 2 drops of dibutyltin dilaurate catalyst. The mixture was heated to 70° C. for 0.5 hour with stirring. Then 7.14 g (20 mmol) of MeFBSE was added, and the mixture was reacted for another 5 hours. No NCO signal was observed at the end of the reaction as monitored by FTIR analysis.

Examples 57–60 and Comparative Examples C16–C20

This series of experiments was run to illustrate that the polyurethanes of this invention containing self-emulsifying water-soluble groups are effective in imparting repellency to limestone, a hard porous substrate.

For Comparative Example C16, no polyurethane was evaluated (i.e., an untreated tile was evaluated for stain resistance).

For Comparative Example C17, Tile Lab Grout and Tile Sealer (another commercial masonry and stone treatment, available from Custom Building Products, Seal Beach, Calif.) was evaluated.

For Comparative Example C18, FC-759 (available from 3M Company, St. Paul, Minn.), which contains a fluoropolymer having pendant $C_8F_{17}$— groups but having no terminal $R_f$— groups, was evaluated.

For Comparative Example C19, the polyurethane evaluated was prepared by reacting N-3300 triisocyanate with FBSE alcohol to provide terminal $C_4F_9$— groups and with glycolic acid, $HOCH_2COOH$ (GA), to provide terminal carboxylate water-solubilizing groups. No fluorine-containing repeating units were incorporated into the polymer backbone. For Comparative Example C20, LUDOX™ AS-40, a colloidal dispersion of silica in water, was mixed with the polyurethane of Comparative Example C19.

For Example 57, the polyurethane evaluated was prepared by reacting N-3300 triisocyanate with FBSEE diol and FBSE alcohol to provide both terminal and pendant $C_4F_9$— groups, with glycolic acid to provide terminal carboxylate water-solubilizing groups, and with bicine, $(HOCH_2CH_2)_2NCH_2COOH$, to provide both ammonium and carboxylate water-solubilizing groups. For Example 58, LUDOX™ AS-40 silica dispersion was mixed with the polyurethane of Example 57.

For Example 59, the polyurethane evaluated was prepared by reacting N-3300 triisocyanate with FBSEE diol and FBSE alcohol to provide both terminal and pendant $C_4F_9$— groups, with 75-H-1400 diol to provide fluorine-free repeating units in the backbone, and with glycolic acid to provide terminal carboxylate water-solubilizing groups.

For Example 60, the polyurethane evaluated was prepared by reacting N-3300 triisocyanate with FBSEE diol and FBSE alcohol to provide both terminal and pendant $C_4F_9$— groups, with glycolic acid to provide terminal carboxylate water-solubilizing groups and with ETHOMEEN™ C/25 ethoxylated cocamine (Eth C25) to form terminal polyoxyethylene water-solubilizing groups.

Using the earlier-described Staining Test, the polyurethanes were evaluated as stain-resistant treatments for limestone tiles. Staining agents employed were: grape juice (GJ), Pennzoil™ ATF Automatic transmission fluid (TF), used 10W30 motor oil (MO), Paul Masson™ Burgundy wine (WIN), water saturated with Taster's Choice coffee (COF), STP™ heavy duty brake fluid (BF) and Mazola™ corn oil (CO). For this test, a 5-point rating scale was used, with a rating of "0" indicates essentially no stain remaining and a rating of "5" indicating very poor stain resistance. A total is also presented, with a lower total indicating better overall stain resistance.

Results from these evaluations are presented in TABLE 8.

TABLE 8

| | | | Stain Resistance Rating To: | | | | | | |
|---|---|---|---|---|---|---|---|---|---|
| Ex. | Polyurethane Composition | Total | GJ | TF | MO | WIN | COF | BF | CO |
| C16 | No treatment | 35 | 5 | 5 | 5 | 5 | 5 | 5 | 5 |
| C17 | Tile Lab Grout and Tile Sealer | 16 | 4 | 4 | 2 | 3 | 3 | 0 | 0 |
| C18 | FC-759 | 10 | 4 | 0 | 0 | 4 | 2 | 0 | 0 |
| C19 | 1.4/1/1 MeFBSE/GA/N-3300 | 9 | 0 | 0 | 1 | 2 | 3 | 3 | 0 |
| C20 | C. Ex. C22 + colloidal silica | 10 | 0 | 0 | 1 | 2 | 3 | 3 | 1 |
| 57 | 2.8/0.5/2/0.5/2 MeFBSE/FBSEE/GA/Bicine/N-3300 | 3 | 1 | 0 | 1 | 0 | 1 | 0 | 0 |
| 58 | Ex. 59 + colloidal silica | 3 | 0 | 0 | 1 | 1 | 1 | 0 | 0 |
| 59 | 2.8/0.8/2/1/2 MeFBSE/FBSEE/GA/75-H-1400/N-3300 | 6 | 1 | 0 | 1 | 2 | 2 | 0 | 0 |
| 60 | 2.8/0.8/2/0.2/2 MeFBSE/FBSEE/GA/Eth C25/N-3300 | 2 | 1 | 0 | 0 | 1 | 0 | 0 | 0 |

The data in TABLE 8 show that the polyurethanes containing both terminal and pendant $R_f$— groups imparted the best stain resistance to the limestone tiles. Addition of the colloidal silica dispersion did not significantly improve stain resistance.

TABLE 8—Polyurethane Preparations 1.4/2/1 MeFBSE/GA/N-3300—Into a 100 mL flask equipped with stirrer, heating mantle, thermometer, condenser and nitrogen purge were added 5.06 g (14.2 mmol) of MeFBSE, 1.56 g (20.5 mmol) of GA, 6.87 g (0.0354 eq NCO) of N-3300, 50 g of THF and 2 drops of dibutyltin dilaurate catalyst. The resulting mixture was heated for 5 hours at 65° C. The reaction product was hydrolyzed with 0.82 g of NaOH in 40 g of deionized water, and the THF was removed by rotary evaporation. Sufficient water was added to the resulting aqueous solution to produce 86 g of polyurethane solution (15% solids). A 3% polyurethane solution was obtained by diluting 10 g of 15% polyurethane solution with 40 g of water A dispersion containing 3% polyurethane and 3% silica was prepared by mixing together 10 g of 15% polyurethane solution, 3.6 g of LUDOX™ AS-40 and 36 g of water.

2.8/0.5/2/0.5/2 MeFBSE/FBSEE/GA/Bicine/N-3300— Into a 100 mL flask equipped with stirrer, heating mantle, thermometer, condenser and nitrogen purge were added 0.9425 g (2.5 mmol) of FBSEE, 0.4075 g (2.5 mmol) of Bicine, 6.596 g (0.034 eq NCO) of N-3300, 50 g THF and 2 drops of dibutyltin dilaurate catalyst. The resulting mixture was heated under nitrogen at 65° C. for 0.5 hour. Then 4.998 g (14 mmol) of MeFBSE and 0.76 g (10 mm) of GA were added, and the resulting mixture was heated for an additional 10 hours to give a clear solution. From FTIR analysis, no —NCO signal was found. The reaction mixture was hydrolyzed with 1 g of EDA in 36 g of water, and THF was removed by rotary evaporation. To the resulting aqueous solution was added more water to give a total of 71 g of polyurethane solution (19.6% solids). A 3.8% solution was obtained from 10 g solution and 40 g water was prepared from 10 g solution, 3.4 g LUDOX™ AS-40 and 36.6 g water (3.8% urethane, 2.7% silica). Both samples were evaluated on limestone tile.

2.810.8/2/0.2/2 MeFBSE/FBSEE/GA/75-H-1400/N-3300—Into a 100 mL flask equipped with stirrer, heating mantle, thermometer, condenser and nitrogen purge were placed 1.508 g (4 mmol) of FBSEE, 2.47 g (1 mmol) of 75-H-1400, 50 g of THF and 2 drops of dibutyltin dilaurate catalyst. The resulting mixture was heated at 65° C. for 0.5 hour. Then 4.998 g (14 mmol) of MeFBSE and 0.76 g (10 mmol) of GA were added, and the reaction was allowed to continue for an additional 10 hours. From FTIR analysis, no —NCO signal was found. The reaction mixture was then hydrolyzed with 2.4 g of EDA in 50 g of deionized water, and THF was removed by rotary evaporation. To the resulting aqueous solution was added more water to produce 94 g of polyurethane solution (15% solids). A 3% polyurethane solution was prepared by diluting 10 g of the above-mentioned solution with 40 g of water.

2.8/0.8/2/0.2/2 MeFBSE/FBSEE/GA/Eth C25/N-3300— Into a 100 mL flask equipped with stirrer, heating mantle, thermometer, condenser and nitrogen purge were placed 3.01 g (8 mmol) of FBSEE,1.71 g (2 mmol) of ETHOMEEN™ C-25, 13.50 g (0.0692 eq NCO) OF N-3300, 30 g of NMP and 2 drops of dibutyltin dilaurate catalyst. The resulting mixture was heated at 60° C. for 1 hour, then 10.71 g (30 mmol) of MeFBSE was added and the contents were allowed to further react at 60° C. for 1.5 hours. Finally, 1.37 g (18 mmol) of GA was added, and the reaction mixture was allowed to continue reacting for an additional 2 hours. The reaction mixture was neutralized with 1.90 g of MDEOA to produce a 50% polyurethane solution. A 3% polyurethane solution was obtained from the 50% solution by dilution with water.

Examples 61–69 and Comparative Examples C21–C23

This series of experiments was run to illustrate that the polyurethanes of this invention are effective in imparting repellency and soil resistance to various styles of nylon carpet, illustrating performance on fibrous substrates. Two of the polyurethanes to be evaluated were prepared by reacting HDI diisocyanate with FBSE alcohol, FBSEE diol and with fluorine-free diols 75-H-450 or DEG to provide both terminal and pendant $C_4F_9$— groups. Another polyurethane was prepared by reacting DDI diisocyanate with FBSE alcohol, FBSEE diol but with no fluorine-free diol to provide both terminal and pendant $C_4F_9$— groups. A commercial carpet treatment containing only terminal $C_8F_{17}$— groups, FC-1395, was also evaluated in comparative examples.

For Examples 61–63 and Comparative Example C21, carpet treatments were applied to MO-678 nylon 6 carpet samples using spray application at about 15% by weight wet pickup. Each treatment was applied at a sufficient concentration to produce a fluorine level of about 300–600 ppm on the carpet sample. Wet carpets were then cured for 25 minutes in a forced air oven set at 121° C. Treated carpets were then evaluated for water repellency (WR) using the Water Repellency Test, for oil repellency (OR) using the Oil Repellency Test and for color difference after one ($\alpha E\ 1$) and two ($\alpha E2$) cycles of the "Walk-On" Soiling Test.

For Examples 64–66 and Comparative Example C22, essentially the same application and testing procedures were used as employed with MO-678 nylon 6 carpet, except that the carpet was changed to QUEEN™ nylon 6,6 carpet.

For Examples 67–69 and Comparative Example C23, essentially the same application and testing procedures were used as employed with MO-678 nylon 6 carpet, except that the carpet was changed to UPBEAT™ nylon 6 carpet.

Results are presented in TABLE 9, along with the corresponding fluorine level applied to the carpet sample (targeted for comparable fluorine levels for each carpet series).

TABLE 9

| Ex. | Carpet | Polyurethane Composition | ppm F | WR | OR | ΔE1 | ΔE2 |
|---|---|---|---|---|---|---|---|
| 61 | MO-676 | 2/1.5/0.5/3 MeFBSE/FBSEE/75-H-450/HDI | 435 | 1 | F | 7.1 | 7 |
| 62 | MO-676 | 2/1.5/0.5/3 MeFBSE/FBSEE/DEG/HDI | 456 | 1 | F | 7.6 | 7.3 |
| 63 | MO-676 | 2/2/3 MeFBSE/FBSEE/DDI | 515 | 1 | 1 | 5.7 | 7 |
| C21 | MO-676 | FC-1395 | 514 | 1 | F | 5.8 | 6 |
| 64 | QUEEN | 2/9.5/0.5/3 MeFBSE/FBSEE/75-H-450/HDI | 341 | 1 | F | 5.7 | 6.2 |
| 65 | QUEEN | 2/1.5/0.5/3 MeFBSE/FBSEE/DEG/HDI | 454 | 1 | F | 6.4 | 6.6 |
| 66 | QUEEN | 2/2/3 MeFBSE/FBSEE/DDI | 598 | 1 | F | 4.8 | 5.7 |
| C22 | QUEEN | FC-1395 | 453 | 1 | F | 5.9 | 6.5 |
| 67 | UPBEAT | 2/9.5/0.5/3 MeFBSE/FBSEE/75-H-450/HDI | 276 | 2 | 2 | 5.7 | 5.9 |
| 68 | UPBEAT | 2/1.5/0.5/3 MeFBSE/FBSEE/DEG/HDI | 319 | 1 | 2 | 6.8 | 5.5 |
| 69 | UPBEAT | 2/2/3 MeFBSE/FBSEE/DDI | 289 | 1 | 2 | 3.6 | 4.2 |
| C23 | UPBEAT | FC-1395 | 271 | 2 | 3 | 4.3 | 5.1 |

The data in TABLE 9 show that carpets treated with polyurethanes of this on containing both terminal and pendant C4F9— groups demonstrated comparable performance to the commercial treatment containing only $C_8F_{17}$— terminal groups.

Table 9—Polyurethane Preparations

2/9.5/0.5/3 MeFBSE/FBSEE/75-H-450/HDI—Into a 100 mL flask equipped with stirrer, heating mantle, thermometer, condenser and nitrogen purge were placed 7.597 g (45.2 mmol) of HDI, 1.509 g (1.5 mmol) of 75-H-450, 10.77 g (28.6 mmol) of FBSEE, 10.718 g (30 mmol) of MeFBSE, 50 g of EtOAc and 5 drops of dibutyl tin dilaurate catalyst. The mixture was heated at 65° C. for 5 hours. Then 29 g of the resulting solution was emulsified with 0.58 g of DS-10 (2%) surfactant in 260 g water using a BRANSON 450 SONIFIER™ (available from VWR Scientific). The EtOAc was used by rotary evaporation to yield 285 g of emulsion (approximately 10% solids).

2/1.5/0.5/3 MeFBSE/FBSEE/DEG/HDI—Into a 100 mL flask equipped with stirrer, heating mantle, thermometer, condenser and nitrogen purge were placed 10.151 g (60.4 mmol) of HDI, 1.067 g (10.1 mmol) of DEG, 11.351 g (30.1 mmol) of FBSEE, 14.214 g (39.8 mmol) of MeFBSE, 80 g of EtOAc and 4 drops of dibutyltin dilaurate. The mixture was allowed to react at 65° C. for 5 hours. 36 g of the reaction mixture (30% solid) was then emulsified with 0.79 g of DS-10 (2%) in 320 g of water using a BRANSON 450 SONIFIER™. The EtOAc was removed by rotary evaporation to yield 330 g of emulsion (approximately 10% solids).

2/2/3 MeFBSE/FBSEE/DDI—Into a 100 mL flask equipped with stirrer, heating mantle, thermometer, condenser and nitrogen purge were placed 7.603 g (30.2 mmol) of DDI, 7.545 g (20 mmol) of FBSEE, 7.166 g (20.1 mmol) of MeFBSE, 80 g of EtOAc and 4 drops of dibutyltin dilaurate catalyst. The mixture was heated at 60° C. for 2 hours to produce a 21.8% solid solution of the reaction product. 22 g of this solution was emulsified with 0.44 g of DS-10 (2%) in 200 g water using a BRANSON 450 SONIFIER™. The EtOAc was removed by rotary evaporation to yield 212 g of emulsion (approximately 10% solids).

Examples 70–72

This series of experiments was run to illustrate that polyurethanes of this invention are effective in imparting dynamic and static repellency to plain weave, fine denier, tightly woven, 3.75 oz/yd$^2$ (0.13 kg/m$^2$) blue nylon fabric (available from Burlington Industries, Greensboro, N.C.). The polyurethane to be evaluated (2/2/3 MeFBSE/FBSEE/DDI) was prepared by reacting DDI diisocyanate with FBSE alcohol and FBSEE diol to provide both terminal and pendant C4F9— groups. The polyurethane was applied to the rainwear samples as a water dispersion at 0.25% solids with and without 0.25% NaCl. In Example 70, no NaCl was used and application was done at room temperature. In Example 71, the polyurethane emulsion with NaCl was applied at room temperature while in Example 72, the polyurethane emulsion with NaCl was applied at 80° C. All treated samples were immersed for 5 minutes and rinsed in deionized water. The treated and rinsed rainwear samples were cured in a forced air oven for 5 minutes at 150° C., then were evaluated for water repellency (WR), oil repellency (OR), spray rating (SR) and Bundesmann Test rating.

Results are presented in TABLE 10, along with the parts per million of fluorine by weight present on the rainwear sample.

TABLE 10

| | | | Repellency: | | | Bundesmann Test Rating: | | |
|---|---|---|---|---|---|---|---|---|
| Ex. | % NaCl | ppm F | WR | OR | SR | 1 min. | 5 min. | 10 min. |
| 70 | None | 480 | 1 | 2 | 50 | N/R* | N/R* | N/R* |
| 71 | 0.25 | 1105 | 5 | 7 | 95 | 3 | 1 | 1 |
| 72 | 0.25 | 2654 | 7 | 9 | 100 | 5 | 4 | 3 |

*N/R = not run

The data in TABLE 10 show that rainwear treated with the polyurethane demonstrated good repellencies and a good Bundesmann Test rating (i.e., all the ratings were high numbers). Addition of salt boosted the repellencies, possibly by improving the exhaustion of the treatment onto the fabric. Overall results were best with the emulsion applied at 80° C. in the presence of salt, which resulted in a higher level of fluorine (in ppm) applied to the fabric.

Table 10—Polyurethane Preparation

2/2/3 MeFBSE/FBSEE/DDI—Into a 100 mL flask equipped with stirrer, heating mantle, thermometer, condenser and nitrogen purge were added 17.389 g (69.0397 mmol) of DDI, 17.378 g (46.0955 mmol) of FBSEE, 16.413 g (45.9748 mmol) of MeFBSE, 100 g of EtOAc and 5 drops of dibutyltin dilaurate catalyst. The mixture was reacted for 2 hours at 70° C. to produce a 34% solid polyurethane solution. The resulting solution was emulsified with a solution consisting of 2.5 g of ARQUAD™ T-50 in 450 g water. After removing the EtOAc by rotary evaporation, a 10% solids emulsion was obtained.

Examples 73–76

A polyurethane of this invention, 4/1/2 MeFBSE/FBSEE/N-3300 (previously prepared for Example 51 of TABLE 7), was applied to paper from a solvent solution from either EtOAc or HFE-7100 to give add-on levels on the paper of approximately 0.125, 0.25, 0.50 and 1.0% SOF (percent solids based on the weight of the paper fiber). For each example, the treated paper was cured in a forced air oven for 5 minutes at 120° C. Each treated paper was then tested for oil repellency using the Kit Test and the Ralston Crease Test. Results from these tests are given in TABLE 11.

TABLE 11

| Example | % SOF | PPMF | Kit Rating | Crease Rating |
|---|---|---|---|---|
| 73 | 0.125 | 523 | 2+ to 3 | 100 |
| 74 | 0.25 | 723 | 4+ | 25 |
| 75 | 0.50 | 1315 | 6 | 1.15 |
| 76 | 1.0 | 2987 | 8 to 9 | 0 |

The data from TABLE 11 show that the polyurethanes of this invention impart good oil resistance to paper. The paper used was 36 pound pet food stock, no water leaf, no calendering, no starch and no clay, available from Crown Vantage, Cincinnati, Ohio.

We claim:

1. Fluorochemical urethane composition comprising:
  one or more oligomers comprising (i) at least one fluorine-containing repeatable unit and (ii) at least one fluorine-containing terminal group, and wherein said oligomers comprise the condition reaction product of:
  (a) one or more fluorinated polyols;

(b) one or more polyisocyanates; and (c) one or more monofunctional fluorine-containing compounds having one functional group that is reactive with the hydroxyl group of said polyol (a) or with the isocyanate group of the polyisocyanate (b).

2. The fluorochemical urethane composition of claim 1 further comprising the reaction product of one or more water-solubilizing compounds having one or more water solubilizing groups and at least one electrophilic or nucleophilic moiety, said solubilizing groups independently pendant from the repeatable unit, or the terminal group.

3. The fluorochemical urethane composition of claim 2 wherein said water-solubilizing group is selected from the group consisting of carboxylate, sulfate, sulfonate, phosphonate, ammonium, and quaternary ammonium groups.

4. The fluorochemical urethane composition of claim 1 further comprising the reaction product of one or more polymerizable compounds having one or more polymerizable groups and at least one electrophilic or nucleophilic moiety, said polymerizable groups independently pendant from the repeatable unit, or the terminal group.

5. The fluorochemical urethane composition of claim 4, wherein said polymerizable groups are selected from the group consisting of acrylate, methacrylate, vinyl, allyl, and glycidyl groups.

6. The fluorochemical urethane composition of claim 1 having the formula $$R_fQ(OR^2O)_o(-CONH-R^1-NHCO-OR^2O)_n(CONH-R^1-NHCO)_m-Z \quad I$$

wherein:

n is a number from 1 to 10, inclusive, o is a number from 0 to 1, inclusive;

m is a number from 0 to 1, inclusive $R_f$ is selected from the group consisting of perfluoroalkyl groups having 1 to 12 carbon atoms, and perfluroheteroalkyl groups having 3 to about 50 carbon atoms;

Q is a divalent linking group;

$R^1$ is divalent organic group which is the residue of a polyisocyanate;

$R^2$ is divalent organic group which is a residue of the polyol, at least a portion of which is substituted with one or more perfluoroalkyl groups, perfluoroheteroalkyl groups, perfluoroheteroalkylene groups, or mixtures thereof;

Z is $R_fQ$—, a water-solubilizing group or a polymerizable group.

7. The fluorochemical urethane composition of claim 6, wherein Q is selected from the following structures, wherein each k is independently an integer from 0 to about 20, $R_1'$ is hydrogen, phenyl, or alkyl of 1 to about 4 carbon atoms, an $R_2'$ is alkyl of 1 to about 20 carbon atoms:

—$SO_2NR_1'(CH_2)_kO(O)C$—, —$CONH_1'(CH_2)_kO(O)C$—, —$(CH_2)_kO(O)C$—,
—$CH_2CH(OR_2')CH_2O(O)C$—, —$(CH_2)_kC(O)O$—, —$(CH_2)_kSC(O)$—,
—$(CH_2)_kO(CH_2)_kO(O)C$—, —$(CH_2)_kS(CH_2)_kO(O)C$—, —$(CH_2)_kSO_2(CH_2)_kO(O)C$—,
—$(CH_2)_kS(CH_2)_kOC(O)$—, —$(CH_2)_kSO_2NR_1'(CH_2)_kO(O)C$—, —$(CH_2)_kSO_2$—,
—$SO_2NR_1')CH_2)_kO$—, —$SO_2NR_1'(CH_2)_k$—, —$(CH_2)_kO(CH_2)_kC(O)O$—,
—$(CH_2)_kSO_2NR_1'(CH_2)_kC(O)O$—, —, $(CH_2)_kSO_2(CH_2)_kC(O)O$—, —$CONR_1'(CH_2)_kC(O)$—

—$(CH_2)_kS(CH_2)_kC(O)O$—, —$CH_2CH(OR_2')CH_2C(O)O$—, —$SO_2NR_1'(CH_2)_kC(O)O$—,
—$(CH_2)_kO$—, —$C_kH_{2k}$—$OC(O)NH$—, —$C_kH_{2k}$—$NR_1'C(O)NH$—, —$OC(O)NR'(CH_2)_k$—,
—$(CH_2)_kNR_1'$— and —$(CH_2)_kNR_1'C(O)O$—, 8. The fluorochemical urethane composition of claim 1 comprising oligomers of the Formula:

$$R_fQ(-CONH-R^1-NHCO-OR^2O-)_n(CONH-R^1-NH-CO)_m-QR_f$$

wherein:

n is a number from 1 to 10 inclusive;

m is 1;

$R_f$ is a perfluoroalkyl group having 1 to 12 carbon atoms, or a perfluoroheteroalkyl group having 3 to about 50 carbon atoms with all perfluorocarbon chains present having 1 to 6;

Q is —$C_kH_{2k}$—$OC(O)NH$— or —$C_kH_{2k}$—$NR_1'C(O)NH$—, wherein $R_1'$ is H or lower alkyl, and k is an integer from 0 to about 20;

$R^1$ is a straight chain alkylene, of 1 to 14 carbon atoms;

$R^2$ is a polyvalent organic group which is a residue of the polyol; is a straight or branched chain alkylene, cycloalkylene, arylene or heteroalkylene group of 1 to 14 carbon atoms;

and at least a portion of the $R^2$ groups are substituted with or contain one perfluoroalkyl group, perfluoroheteroalkyl group, perfluoroheteroalkylene group, or mixtures thereof.

9. The fluorochemical urethane composition of claim 1 wherein the oligomer comprises the condensation reaction product of one or more fluorinated polyols, one or more non-fluorinated polyols, one or more polyisocyanates and one or more monofunctional fluorine-containing compounds.

10. The fluorochemical urethane composition of claim 1 wherein the oligomer comprises the condensation reaction product of one or more fluorinated polyols, an excess amount (relative to the polyol) of one or more linear alkylene diisocyanates, and sufficient fluorinated monoalcohols to react with the terminal isocyanate groups.

11. The fluorochemical urethane composition of claim 1 wherein the fluorine containing group of said fluorinated polyol is a perfluoroalkyl group of 1 to 12 carbon atoms.

12. The fluorochemical urethane composition of claim 1 wherein the fluorine containing group of said fluorinated polyol is a perfluoroalkyl group of 3 to 5 carbon atoms.

13. The fluorochemical urethane composition of claim 1 wherein the fluorine containing group of said fluorinated polyol is a perfluorobutyl group.

14. The fluorochemical urethane composition of claim 1 wherein the monofunctional fluorine-containing compound is a compound of the following formula:

$$R_f-Q'$$

wherein:

$R_f$ is selected from the group consisting of perfluoroalkyl groups having 1 to 12 carbon atoms, and perfluoroheteroalkyl groups having 3 to about 50 carbon atoms with all perfluorocarbon chains present having 6 or fewer carbon atoms;

Q' is a functional group that is reactive with the terminal isocyanate of the polyisocyanate or terminal hydroxy group of the fluorinated polyol.

15. The fluorochemical urethane composition of claim 14 wherein Q' of said monofunctional fluorine-containing compound is select from hydroxyl, secondary amino, oxazolinyl, oxazolonyl, acetyl, acetonyl, carboxyl, isocyanato, epoxy, aziridinyl, thio, and acyl halide groups.

16. The fluorochemical urethane composition of claim 1 wherein said fluorochemical oligomer further comprises the reaction product of one or more non-fluorinated polyols.

17. A coating composition comprising a mixture comprising:
 (a) a solvent; and
 (b) the fluorochemical urethane composition of claim 1.

18. The coating composition of claim 17 wherein the fluorochemical urethane composition further comprises one or more water-solubilizing groups.

19. The coating composition of claim 18 wherein said mixture comprises an aqueous solution, dispersion or suspension.

20. An article comprising:
 (a) a substrate having one or more surfaces; and
 the fluorochemical urethane composition of claim 1 coated on one or more surfaces of said substrate.

21. The article of claim 20 wherein the fluorochemical urethane composition further comprises one or more water-solubilizing groups.

22. The article of claim 20 wherein the fluorochemical urethane composition further comprises one more polymerizable groups.

23. The article of claim 20 wherein the substrate is selected from the group consisting of hard substrates and fibrous substrates.

24. A method of imparting repellency to a substrate, having one or more surfaces, comprising the steps of:
 applying the coating composition of claim 17 onto one or more surfaces of said substrate; and
 curing the coating composition at ambient or elevated temperature.

25. A polymer composition comprising:
 (a) the fluorochemical composition of claim 1; and
 (b) at least one thermoplastic or thermoset polymer.

26. The composition of claim 25 wherein said thermoplastic polymer is selected from the group consisting of polypropylene, polyethylene, polyacrylates, polymethacrylates, copolymers of ethylene and one or more alpha-olefins, polyesters, polyurethanes, polycarbonates, polyetherimides, polyimides, polyetherketones, polysulfones, polystyrenes, ABS copolymers, polyamides, fluoroplastics, and blends thereof; and said thermoset polymer is selected from the group consisting of polyurethanes, epoxy resins, fluoroelastomers, polyacrylates, polymethacrylates, and unsaturated polyesters, and blends thereof.

27. The composition of claim 25 wherein said composition is prepared by melt blending the fluorochemical composition and the thermoplastic polymer.

28. A shaped article comprising the polymer composition of claim 25, wherein said shaped article is selected from fibers, films, and molded articles.

29. A process for preparing shaped article comprising the steps of:
 (a) combining the fluorochemical urethane composition of claim 1 and at least one thermoplastic polymer, and
 (b) melt processing the resulting combination.

* * * * *

UNITED STATES PATENT AND TRADEMARK OFFICE
CERTIFICATE OF CORRECTION

PATENT NO. : 6,803,109 B2
APPLICATION NO. : 09/803702
DATED : October 12, 2004
INVENTOR(S) : Zai-ming Qiu It is certified that error appears in the above-identified patent and that said Letters Patent is hereby corrected as shown below:

First Page, Column 2
Under "(Foreign Patent Documents)", line 1, above "DE 3611302 A1" insert
-- FR 2749309 12/1997-- as a new Entry.
Under "(Foreign Patent Documents)", line 3, below "GB 858671"
insert -- GB 999,795 7/1965 -- as a new Entry.

Second Page, Column 2
Under "(U. S. Patent Documents)", line 2, below "5,451,622"
insert -- 5,543,200 A 8/1996 Hargis et al. -- as a new Entry.
Under "(U. S. Patent Documents)", line 5, below "5,725,789"
insert -- 6,001,923 A 12/1999 Moncur et al. -- as a new Entry.

Column 4
Line 56, after "like." delete "like."

Column 5
Line 24, after "$C_3F_7O$" insert -- (CF --.
Line 31, after "$CF_2$—," insert -- and the like. --.

Column 10
Line 4, delete "$CH_2O$" and insert -- $CH_2$OH; --, therefor.
Line 6, delete "$CH_2$" and insert -- $CH_2$OH; --, therefor.
Line 22, delete "butan" and insert -- butane --, therefor.

Column 17
Line 51, delete "$_{(C3}$" and insert -- ($C_3$ --, therefor.
Line 60, delete "50triol" and insert -- 50, triol --, therefor.
Line 62, delete "$(CH_2CH_2O)_2$" and insert -- $(CH_2CH_2O)_Z$ --, therefor.

Column 27
Line 20, delete "$CH_{2O}H$" and insert -- $CH_2$OH --, therefor.

Column 28
Line 11, delete "$(CH_3)_2C(C_6H_{4O}H)_2$ - 4,4'-isopropylidenediphenol, a diol available from Sigma-Aldrich." and insert -- $(CH_3)_2C(C_6H_4$OH$)_2$ - 4,4'-isopropylidenediphenol, a diol available from Sigma-Aldrich. --
as a new paragraph on Line 12.

UNITED STATES PATENT AND TRADEMARK OFFICE
CERTIFICATE OF CORRECTION

PATENT NO. : 6,803,109 B2
APPLICATION NO. : 09/803702
DATED : October 12, 2004
INVENTOR(S) : Zai-ming Qiu It is certified that error appears in the above-identified patent and that said Letters Patent is hereby corrected as shown below:

Column 29
Line 32, delete "26 oz/yd" and insert --26 oz/yd$^2$ --, therefor.
Line 57, after "placed at" insert -- points at least two inches apart on the sample. If, after observing for 15 seconds at a 45° --.
Line 58, delete "or" and insert -- of the --, therefor, Column 30
Line 35, after "pine" insert -- wood --.

Column 37
Line 19, delete "MeEBSE" and insert -- MeFBSE --, therefor.

Column 39
Line 56, after "$N_2$" insert -- . --.

Column 40
Line 59, after "heating" insert -- mantle, --.

Column 42
Line 31, after "2 hours" insert -- . --.
Line 43, after "stirring" insert -- . --.
Line 51, after "HDI" insert -- , --.
Line 64, after "4 hours" insert -- . --.

Column 44
In (Table 5), Ex. 33, delete "$(PCL)_{44}$" and insert -- $(PCL)_{4.4}$ --, therefor.
In (Table 5), Ex. 34, delete "$(PCL)_{44}$" and insert -- $(PCL)_{4.4}$ --, therefor.

Column 45
Line 3, delete "$_{4.4}$FBSEE" and insert -- $_{4.4}$/FBSEE --, therefor.
Line 9, after "stirring" insert -- . --.
Line 14, delete "$(PCL)_{44}$" and insert -- $(PCL)_{4.4}$ --, therefor.

Column 53
Line 26, delete "2.810.8/2/0.2/2" and insert -- 2.8/0.8/2/0.2/2 --, therefor.

Column 54
Line 35, delete "($\alpha$E1)" and insert -- ($\Delta$E1) --, therefor.
Line 36, delete "($\alpha$E2)" and insert -- ($\Delta$E2) --, therefor.

UNITED STATES PATENT AND TRADEMARK OFFICE
CERTIFICATE OF CORRECTION

PATENT NO. : 6,803,109 B2
APPLICATION NO. : 09/803702
DATED : October 12, 2004
INVENTOR(S) : Zai-ming Qiu It is certified that error appears in the above-identified patent and that said Letters Patent is hereby corrected as shown below:

Column 55
Line 2, delete "on" and insert -- invention --, therefor.
Line 3, after "comparable" insert -- overall --.

Column 56
Line 66, in Claim 1, delete "condition" and insert -- condensation --, therefor.

Column 57
Line 30, in Claim 6, delete "(—CONH-$R^1$-NHCO-$OR^2$O)" and insert
-- (—CONH-$R^1$-NHCO-$OR^2$O—) --, therefor.
Line 36, in Claim 6, delete "$R_r$" and insert -- $R_f$ --, therefor.
Lines 37-38, in Claim 6, delete "perfluroheteroalkyl" and insert
-- perfluoroheteroalkyl --, therefor.
Line 41, in Claim 6, insert -- a -- before "divalent".
Line 43, in Claim 6, insert -- a -- before "divalent".
Line 54, in Claim 7, delete "an" and insert -- and --, therefor.
Line 56, in Claim 7, delete "-$CONH_1$" and insert -- -$CONR_1$' --, therefor.
Line 62, in Claim 7, delete "$CH_2)_k$" and insert -- $(CH_2)_k$ --, therefor.
Line 64, in Claim 7, delete ")$CH_2)_k$" and insert -- $(CH_2)_k$ --, therefor.
Line 66, in Claim 7, delete "," before "$(CH_2)_kSO_2(CH_2)_kC$".
Line 67, in Claim 7, delete "C(O)-" and insert -- C(O)O- --, therefor.

Column 58
Line 9, in Claim 8, delete "$R_1Q$" and insert -- $R_fQ$ --, therefor.
Line 9, in Claim 8, delete "$QR_r$" and insert -- $QR_f$ --, therefor.
Line 15, in Claim 8, delete "$R_r$" and insert -- $R_f$ --, therefor.
Line 28, in Claim 8, delete "and" before "at least".
Line 55, in Claim 14, delete "$R_r$" and insert -- $R_f$ --, therefor.
Line 58, in Claim 14, delete "$R_r$" and insert -- $R_f$ --, therefor.

Column 59
Line 1, in Claim 15, delete "select" and insert -- selected --, therefor.
Line 25, in Claim 22, after "one" insert -- or --.

UNITED STATES PATENT AND TRADEMARK OFFICE
CERTIFICATE OF CORRECTION

PATENT NO. : 6,803,109 B2
APPLICATION NO. : 09/803702
DATED : October 12, 2004
INVENTOR(S) : Zai-ming Qiu It is certified that error appears in the above-identified patent and that said Letters Patent is hereby corrected as shown below:

<u>Column 60</u>
Line 5, in Claim 25, after "fluorochemical" insert -- urethane--.
Line 31, in Claim 29, after "polymer" delete "," and insert -- ; --.

Signed and Sealed this

Twenty-fourth Day of April, 2007

JON W. DUDAS
*Director of the United States Patent and Trademark Office*